United States Patent
Attar et al.

(10) Patent No.: US 8,331,377 B2
(45) Date of Patent: Dec. 11, 2012

(54) DISTRIBUTED FORWARD LINK SCHEDULERS FOR MULTI-CARRIER COMMUNICATION SYSTEMS

(75) Inventors: Rashid A. Attar, San Diego, CA (US);
Peter J. Black, San Diego, CA (US);
Mehmet Gurelli, San Diego, CA (US);
Mehmet Yavuz, San Diego, CA (US);
Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 961 days.

(21) Appl. No.: 11/364,384

(22) Filed: Feb. 27, 2006

(65) Prior Publication Data

US 2006/0146721 A1    Jul. 6, 2006

Related U.S. Application Data

(63) Continuation-in-part of application No. 11/123,479, filed on May 5, 2005.

(60) Provisional application No. 60/568,650, filed on May 5, 2004, provisional application No. 60/625,660, filed on Nov. 4, 2004.

(51) Int. Cl.
*H04L 12/28* (2006.01)
*H04L 12/56* (2006.01)

(52) U.S. Cl. ............... 370/395.42; 370/310; 370/395.4; 370/415; 370/416; 370/422; 370/428

(58) Field of Classification Search ............... 370/395.4, 370/310, 395.42 415 416 422 428
See application file for complete search history.

(56) References Cited

U.S. PATENT DOCUMENTS

| | | | | |
|---|---|---|---|---|
| 5,278,828 | A * | 1/1994 | Chao | 370/394 |
| 5,859,835 | A * | 1/1999 | Varma et al. | 370/229 |
| 5,999,931 | A * | 12/1999 | Breitbart et al. | 707/10 |
| 6,126,463 | A * | 10/2000 | Okazaki et al. | 439/188 |
| 6,205,150 | B1 * | 3/2001 | Ruszczyk | 370/412 |
| 6,338,078 | B1 * | 1/2002 | Chang et al. | 718/102 |
| 6,493,331 | B1 * | 12/2002 | Walton et al. | 370/341 |
| 6,590,890 | B1 | 7/2003 | Stolyar et al. | |
| 6,611,522 | B1 | 8/2003 | Zheng et al. | |

(Continued)

FOREIGN PATENT DOCUMENTS

JP    2000204575    7/2000

(Continued)

OTHER PUBLICATIONS

International Search Report, PCT/US2005/015812, International Search Authority-European Patent Office, Sep. 16, 2005.

(Continued)

*Primary Examiner* — Ayaz Sheikh
*Assistant Examiner* — Peter Chau
(74) *Attorney, Agent, or Firm* — Charles E. Eggers

(57) ABSTRACT

Embodiments disclosed here relate to scheduling packet transmission in a multi-carrier communication system. In an embodiment, a master scheduler having at least one processor and at least one memory operably connected to the at least one processor is adapted to execute instructions stored in the at least one memory, the instructions comprising selecting a packet with a highest packet metric from among candidate packets from one carrier of a plurality of carriers, whereby expedited forwarding flows do not have a higher metric on another carrier.

41 Claims, 19 Drawing Sheets

U.S. PATENT DOCUMENTS

| | | | |
|---|---|---|---|
| 6,788,687 B2 | 9/2004 | Bao et al. | |
| 6,807,426 B2 | 10/2004 | Pankaj | |
| 6,820,128 B1 | 11/2004 | Firoiu | |
| 6,990,113 B1* | 1/2006 | Wang et al. | 370/412 |
| 7,006,472 B1 | 2/2006 | Immonen et al. | |
| 7,027,392 B2 | 4/2006 | Holtzman et al. | |
| 7,054,293 B2 | 5/2006 | Tiedemann et al. | |
| 7,085,847 B2* | 8/2006 | Darnell et al. | 709/232 |
| 7,110,411 B2 | 9/2006 | Saidi et al. | |
| 7,164,919 B2 | 1/2007 | Chen | |
| 7,280,473 B2 | 10/2007 | Wu et al. | |
| 7,283,814 B2 | 10/2007 | Klein et al. | |
| 7,327,729 B2* | 2/2008 | Kawaguchi et al. | 370/389 |
| 7,330,433 B2 | 2/2008 | Shao et al. | |
| 7,453,801 B2 | 11/2008 | Taneja et al. | |
| 2002/0036984 A1 | 3/2002 | Chiussi et al. | |
| 2002/0040381 A1* | 4/2002 | Steiger et al. | 709/102 |
| 2002/0083195 A1* | 6/2002 | Beshai et al. | 709/238 |
| 2002/0085567 A1 | 7/2002 | Ku et al. | |
| 2002/0141362 A1 | 10/2002 | Hsu et al. | |
| 2003/0016628 A1* | 1/2003 | Kadambi et al. | 370/235 |
| 2003/0096597 A1 | 5/2003 | Kar-Kin au et al. | |
| 2003/0099256 A1* | 5/2003 | Feinberg | 370/473 |
| 2003/0103525 A1* | 6/2003 | Wahl | 370/465 |
| 2003/0198204 A1 | 10/2003 | Taneja et al. | |
| 2003/0223429 A1 | 12/2003 | Bi et al. | |
| 2004/0156380 A1* | 8/2004 | Silverman et al. | 370/428 |
| 2004/0160971 A1* | 8/2004 | Krause et al. | 370/412 |
| 2004/0177087 A1* | 9/2004 | Wu et al. | 707/102 |
| 2005/0177644 A1* | 8/2005 | Basso et al. | 709/232 |
| 2005/0207441 A1* | 9/2005 | Onggosanusi et al. | 370/464 |
| 2005/0281278 A1 | 12/2005 | Black et al. | |

FOREIGN PATENT DOCUMENTS

| | | |
|---|---|---|
| JP | 2002135329 A | 5/2002 |
| JP | 2003229894 | 8/2003 |
| JP | 2003258807 A | 9/2003 |
| JP | 2007536827 T | 12/2007 |
| TW | 546957 | 8/2003 |
| TW | 560135 | 11/2003 |
| WO | WO2004017650 | 2/2004 |
| WO | 20040045087 | 5/2004 |

OTHER PUBLICATIONS

International Search Report, PCT/US2007/062897, International Search Authority-European Patent Office, Aug. 10, 2007.

3GPP2 C.S0024-A, "cdma2000 High Rate Packet Data Air Interface Specification," Version 1.0 Mar. 2004.

3GPP2 C.S0024-A, "cdma2000 High Rate Packet Data Air Interface Specification," Version 4.0, Oct. 2002.

ETSI TS 125.211 V3.5.0 (Dec. 2000), Universal Mobile Telecommunications System (UMTS); Physical Channels and Mapping of Transport Channels onto Physical Channels (FDD) (3GPP TS 25.211 version 3.5.0. Release 1999).

ETSI TS 125.212 V3.5.0 (Dec. 2000), Universal Mobile Telecommunications System (UMTS); Multiplexing and channel coding (FDD), (3GPP TS 25.212 version 3.5.0 Release 1999).

3GPP TS 125.213 V5.0.0 (Mar. 2002), 3rd Generation Partnership Project;Technical Specification Group Radio Access Network; Spreading and modulation (FDD), (3GPP TS 25.213 version 5.0.0 Release 5).

3GPP TS 125.214 V5.0.0 (Mar. 2002), 3rd Generation Partnership Project; Technical Specification Group Radio Access Network; Physical layer procedures (FDD), (3GPP TS 25.214 version 5.0.0 Release 5).

3GPP TS 125.302 V4.4.0 (Mar. 2002), 3rd Generation Partnership Project; Technical Specification Group Physical Layer (UMTS), (3GPP TS 25.302 version 4.4.0 Release 4).

Phirke, "Traffic Sensitive Active Queue Management for Improved Quality of Service," May 2002, Worcester Polytechnic Institute.

Written Opinion—PCT/US05/015812, International Searching Authority—European Patent Office, Sep. 16, 2005.

International Preliminary Report on Patentability—PCT/US05/015812—IPEA/US, Apr. 28, 2006.

Written Opinion—PCT/US07/062897—International Searching Authority—European Patent Office, Aug. 10, 2007.

TIA/EIA/IS-95-B Mobile Station-Base Station Compatibility Standard for Dual-Mode Wideband Spread Spectrum Cellular System (IS-95 Standard), Feb. 3, 1999.

Taiwanese Search report—096106884—TIPO—Aug. 10, 2010.

Anelli et al., "Differentiated Services over Shared Media," IwQOS'01 International Workshop on Quality of Service, Karlsruhe, Germany, Jun. 6-8, 2001, pp. 288-293.

Wang et al., "Adaptive-weighted packet scheduling for premium service," Communications, 2001. ICC 2001. IEEE International Conference on vol. 6, Jun. 11-14, 2001, pp. 1846-1850.

* cited by examiner

DISTRIBUTED FORWARD LINK SCHEDULERS FOR MULTI-CARRIER COMMUNICATION SYSTEMS

CLAIM OF PRIORITY UNDER 35 U.S.C. §119 AND §120

This Application for Patent is a continuation-in-part (CIP) of U.S. patent application Ser. No. 11/123,479, filed on May 5, 2005 and entitled "METHOD AND APPARATUS FOR ADAPTIVE DELAY MANAGEMENT," which claims priority to Provisional Application No. 60/568,650 entitled "ADAPTIVE DELAY MANAGEMENT," filed May 5, 2004, and to Provisional Application No. 60/625,660 entitled "ADAPTIVE DELAY MANAGEMENT," filed Nov. 4, 2004.

BACKGROUND

Field

The present invention relates generally to communications, and more specifically, to scheduling transmissions in a wireless communication system using adaptive delay management. Wireless communication systems include systems processing communications using a circuit-switched (or fixed resource allocation) type technology and systems processing communications using a packet-switched (or dynamic resource allocation) type technology. Circuit switching and packet switching both may be used in networks capable of high capacity. In a circuit-switched communication system, a dedicated communication path is established between a sender and a receiver, and network resources between the transmitter and the receiver are considered static before the start of the transfer, thus creating a "circuit." The resources remain dedicated to the circuit during the entire transfer and the entire message follows the same path. In a packet-switched communication system, the message is broken into packets, each of which may take a different route to the destination where the packets are intended to arrive. Upon receipt, the packets are recompiled to retrieve the original message. In a packet-switched system, packets representing messages or fragments of messages are individually routed between nodes. Packets are routed to a destination through an expedient route. In other words, packets traveling between the same two hosts may not follow the same route, even when such packets are part of a single message.

In a packet-switched system (or shared packet data system), a Voice over Internet Protocol (VoIP) service may be used to emulate circuit-switched voice communications. VoIP is typically a delay-sensitive application or service, and therefore, Quality of Service (QoS) mechanisms are used to meet delay constraints on packet delivery. Other services and types of transmissions also have various delay requirements or targets to ensure QoS. Accordingly, there is a need for adaptive delay management for scheduling transmissions in a communication system. Effective scheduling allows for efficient use of resources in communication systems.

SUMMARY OF THE INVENTION

Embodiments disclose herein relate to scheduling packet transmission in multi-carrier communication systems.

In an embodiment, a forward link scheduler comprises: at least one candidate packet generator having at least one input and at least one output; a master scheduler having at least one input and at least one output; at least one packet builder having at least one output and at least one input operably connected to the at least one output of the master scheduler; and a master processor having at least one output and at least one input operably connected to the output of the at least one packet builder.

In an embodiment, a master scheduler comprises: at least one processor and at least one memory operably connected to the at least one processor, wherein the master scheduler is adapted to execute instructions stored in the at least one memory, the instructions comprising selecting a packet with a highest packet metric from among candidate packets from one carrier of a plurality of carriers, and whereby expedited forwarding flows do not have a higher metric on another carrier.

Further scope of applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention will become more fully understood from the detailed description given here below, the appended claims, and the accompanying drawings in which:

DETAILED DESCRIPTION OF THE PREFERRED EMBODIMENT

Figure 1A:
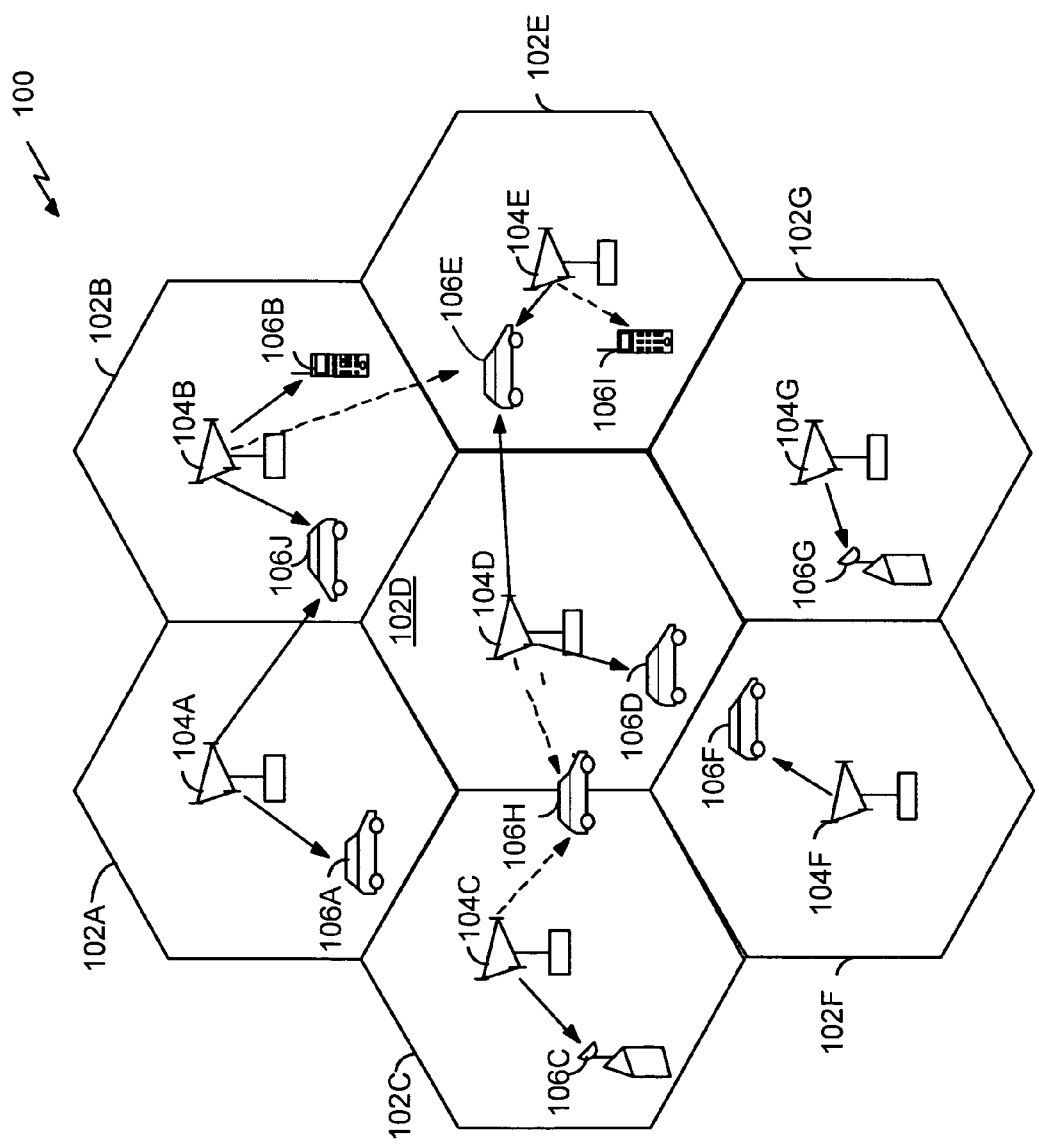
FIG. 1A is a wireless communication system.

The word "illustrative" is used herein to mean "serving as an example, instance, or illustration." Any embodiment described herein as "illustrative" is not necessarily to be construed as preferred or advantageous over other embodiments.

Operation of a communication system supporting services and applications having different Quality of Service (QoS) requirements may be suboptimum and inefficient. For example, VoIP applications have delay requirements. One method emulates voice by providing equal delay constraints for multiple users independent of load and coverage. Such an approach is suboptimal as allocating resources to guarantee equal delay and avoiding optimizations possible to increase system capacity. In one embodiment, system capacity may be increased by providing non-equal delay for various users, where resources are allocated as a function of load and coverage.

The following discussion relates to a scheduling method for the Forward Link (FL) of a system supporting 1xEV-DO operation, e.g., as specified in "cdma2000 High Rate Packet Data Air Interface Specification," 3GPP2 C.S0024-A, Version 2.0, July 2005 (referred to as "1xEV-DO Rev. A specification" or "IS-856 Rev. A specification" herein), "cdma2000 High Rate Packet Data Air Interface Specification," 3GPP2 C.S0024-0, Version 4.0, October 2002 (referred to as "1xEV-DO Rel. 0 specification" or "IS-856 Rel. 0 specification" herein), and/or other related specifications. In an embodiment, a scheduling method takes advantage of the various multi-user packets and short packets, to fulfill the QoS requirements of various applications while trying to maximize the FL capacity. The scheduling method also provides mechanisms to prioritize various applications. Such prioritization may be based on the type of application flow, the specific QoS requirements, or other characteristics of the flow. In an embodiment, flows are scheduled for transmission on the FL based on the delay sensitivity of the application. In one aspect, flows are differentiated based on delay sensitivity balanced with throughput sensitivity. While the following discussion considers the scheduling means and methods as implemented in the context of the 1xEV-DO Rev. A specification, the scheduling means and methods are further applicable to alternate systems, in particular, the concepts are applicable to systems wherein users are compatible with a given subset of subtypes, such as specified in the 1xEV-DO Rel. 0 specification, In the following description, terms such as "Rev-A user" or "user compatible with Rev-A" is used to refer to an Access Terminal (AT) supporting the Medium Access Channel (MAC) Layer and Physical Layer protocol subtypes such as defined in the 1xEV-DO Rev. A specification. In particular, a Rev-A user supports the Enhanced Forward Traffic Channel MAC Protocol. Terms such as "Rel-0 users" are used to refer to ATs supporting the MAC Layer and Physical Layer protocol subtypes defined in the 1xEV-DO Rel. 0 specification, but may not support the newer subtypes such as defined in the 1xEV-DO Rev. A specification.

In a wireless communication system employing a Code Division Multiple Access, CDMA, scheme, one scheduling method assigns each Access Terminal (AT) all code channels at designated time intervals on a time multiplexed basis. A central communication node, such as a Base Station (BS) implements a unique carrier frequency or channel code associated with the subscriber to enable exclusive communication with the subscriber. Time Division Multiple Access (TDMA) schemes may also be implemented in landline systems using physical contact relay switching or packet switching. A CDMA system may be designed to support one or more standards such as: (1) the "TIA/EIA/IS-95-B Mobile Station-Base Station Compatibility Standard for Dual-Mode Wideband Spread Spectrum Cellular System," referred to herein as the IS-95 standard; (2) the standard offered by a consortium named "3rd Generation Partnership Project," referred to herein as 3GPP, and embodied in a set of documents including Document Nos. 3G TS 25.211, 3G TS 25.212, 3G TS 25.213, 3G TS 25.214, and 3G TS 25.302, referred to herein as the W-CDMA standard; (3) the standard offered by a consortium named "3rd Generation Partnership Project 2" referred to herein as 3GPP2, and TR-45.5 referred to herein as the cdma2000 standard, formerly called IS-2000 MC, (4) some other wireless standards, and/or a combination thereof.

The CDMA system allows for voice and data communications between users over a terrestrial link. In a CDMA system, communications between users are conducted through one or more BSs. In wireless communication systems, forward link refers to the channel through which signals travel from a BS to an AT, and reverse link refers to the channel through which signals travel from an AT to a BS. By transmitting data on a reverse link to a BS, a first user on one AT communicates with a second user on a second AT. The BS receives the data from the first AT and routes the data to a BS serving the second AT. In any case, the BS serving the second AT sends the data on the forward link. Instead of communicating with a second AT, an AT may also communicate with a terrestrial Internet through a connection with a serving BS. In wireless communications such as those conforming to the IS-95 standard, forward link and reverse link signals are transmitted within disjoint frequency bands.

FIG. 1A illustrates an embodiment of a communications system 100 supporting a number of users and is capable of implementing at least some aspects and embodiments disclosed herein. Any of a variety of algorithms and methods may be used to schedule transmissions in system 100. System 100 provides communication for a number of cells 102A through 102G, each of which is serviced by a corresponding BS 104A through 104G, respectively. Increasing demand for wireless data transmission and the expansion of services available via wireless communication technology have led to the development of specific data services. One such service is referred to as High Data Rate (HDR). An exemplary HDR service is proposed in "EIA/TIA-IS856 cdma2000 High Rate Packet Data Air Interface Specification," referred to as "the HDR specification." HDR service is generally an overlay to a voice communication system that provides an efficient method of transmitting packets of data in a wireless communication system. As the amount of data transmitted and the number of transmissions increases, the limited bandwidth available for radio transmissions becomes a scarce resource.

Figure 1B:
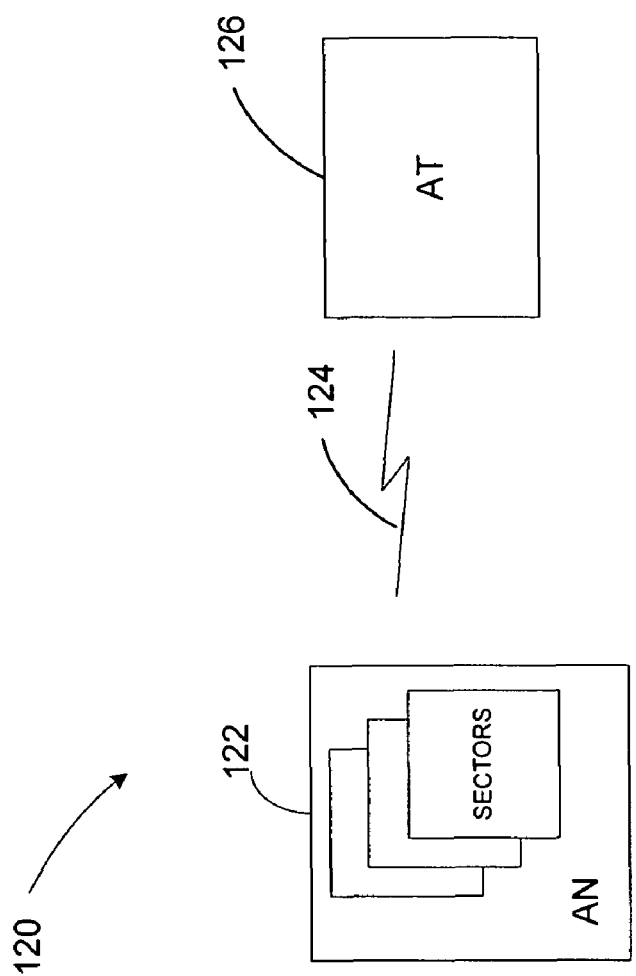
FIG. 1B is a wireless communication system supporting high data rate transmissions.

FIG. 1B illustrates an architecture reference model for a communication system 120 having an Access Network (AN) 122 communicating with an AT 126 via an air interface 124. In one embodiment, the system 10 is a CDMA system having an HDR overlay system, such as specified in the HDR standard, IS-856 Rel. 0 or IS-856 Rev. A specification. The AN 122 communicates with AT 126, as well as any other ATs within system 120 (not explicitly shown), by way of the air interface 124. The AN 122 may include multiple sectors, wherein each sector provides at least one Channel. A Channel is defined as the set of communication links for transmissions between the AN 122 and the ATs within a given frequency assignment. A Channel may include a Forward Link (FL) for transmissions from the AN 122 to AT 126 and a Reverse Link (RL) for transmissions from the AT 126 to AN 122.

For data transmissions, the AN 122 receives a data request from the AT 126. The data request specifies the data rate at which the data is to be sent, the length of the data packet transmitted, and the sector from which the data is to be sent. The AT 126 determines the data rate based on the quality of the Channel between the AN 122 and AT 126. In one embodiment, the quality of the Channel is determined by the carrier-to-interference ratio (C/I). Alternate embodiments may use other metrics corresponding to the quality of the Channel. The AT 126 provides requests for data transmissions by sending a Data Rate Control (DRC) message via a specific channel referred to as the DRC channel. The DRC message includes a data rate portion and a sector portion. The data rate portion indicates the requested data rate for the AN 122 to send the data, and the sector portion indicates the sector from which the AN 122 is to send the data. Both data rate and sector information are typically required to process a data transmission. The data rate portion is referred to as a DRC value, and the sector portion is referred to as a DRC cover. The DRC value is a message sent to the AN 122 via the air interface 124. In an embodiment, each DRC value corresponds to a data rate (e.g., in kbits/sec) having an associated packet length according to a predetermined DRC value assignment. The assignment includes a DRC value specifying a null data rate. In practice, the null data rate indicates to the AN 122 that the AT 126 is not able to receive data. In one situation, for example, the quality of the Channel is insufficient for the AT 126 to receive data accurately.

In operation, the AT 126 continuously monitors the quality of the Channel to calculate a data rate at which the AT 126 is able to receive a next data packet transmission. The AT 126 then generates a corresponding DRC value; the DRC value is transmitted to the AN 122 to request a data transmission. Note that typically data transmissions are partitioned into packets. The time required to transmit a packet of data is a function of the data rate applied.

The DRC signal also provides the information which the channel scheduler uses to determine the instantaneous rate for consuming information (or receiving transmitted data) for each of the ATs associated with each queue. According to an embodiment, a DRC signal transmitted from any AT indicates that the AT is capable of receiving data at any one of multiple effective data rates.

Figure 2:
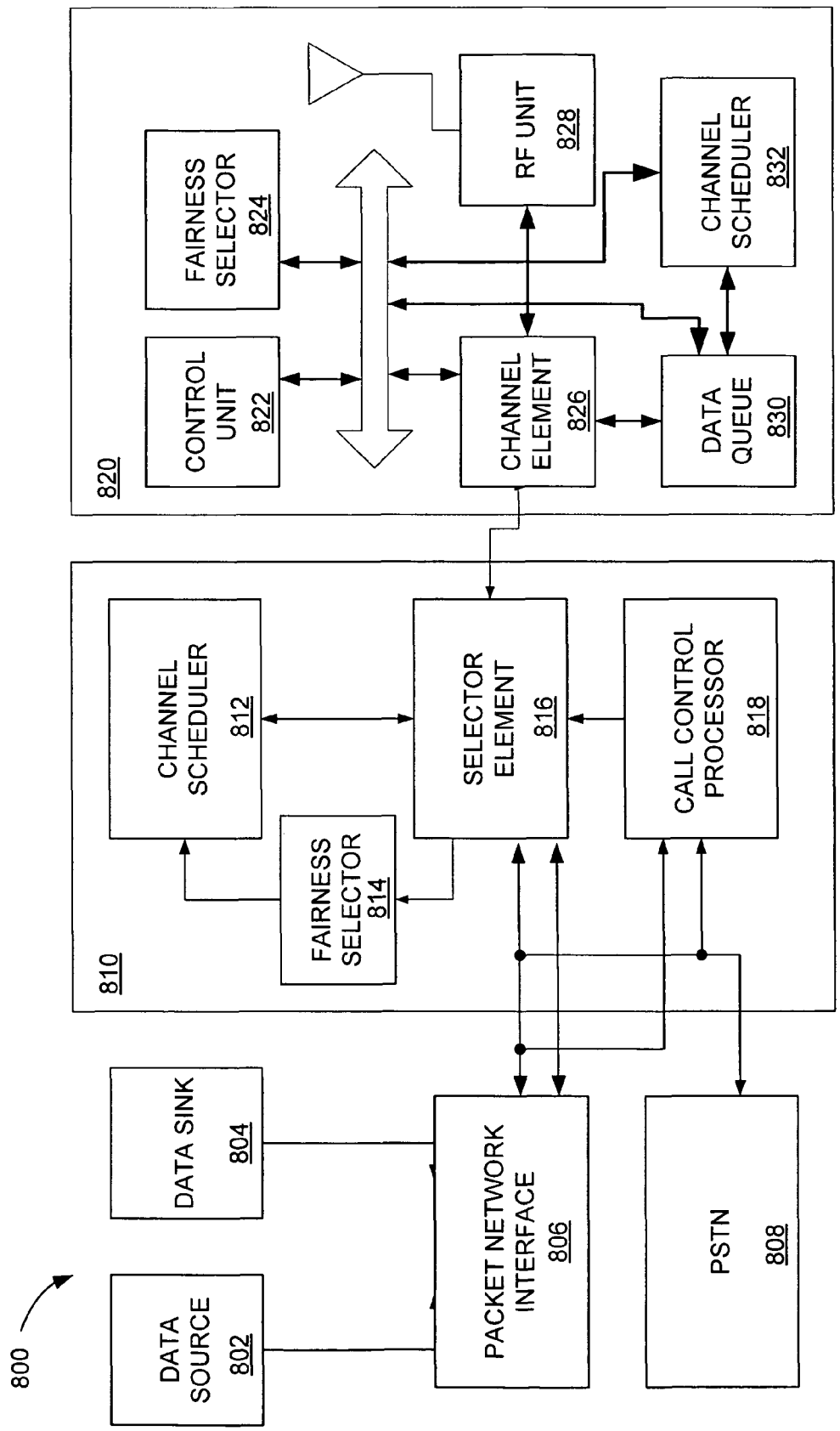
FIG. 2 is a block diagram of a scheduling algorithm for transmissions in a wireless communication system.

One example of a communication system supporting HDR transmissions and adapted for scheduling transmissions to multiple users is illustrated in FIG. 2. FIG. 2 is detailed hereinbelow, wherein specifically, a BS 820 and a Base Station Controller (BSC) 810 interface with a packet network interface 806. BSC 810 includes a channel scheduler 812 for implementing a scheduling method for transmissions in system 800. The channel scheduler 812 determines the length of a service interval during which data is to be transmitted to any particular AT based upon the AT's associated instantaneous rate for receiving data (as indicated in the most recently received DRC signal). The service interval may not be contiguous in time but may occur once every n slot. According to one embodiment, the first portion of a packet is transmitted during a first slot at a first time and the second portion is transmitted 4 slots later at a subsequent time. Also, any subsequent portions of the packet are transmitted in multiple slots having a similar 4 slots spread, e.g., 4 slots apart from each other. According to an embodiment, the instantaneous rate of receiving data Ri determines the service interval length Li associated with a particular data queue.

In addition, the channel scheduler 812 selects the particular data queue for transmission. The associated quantity of data to be transmitted is then retrieved from a data queue 830 and provided to the channel element 826 for transmission to the AT associated with the data queue 830. As discussed below, the channel scheduler 812 selects the queue for providing the data, which is transmitted in a following service interval using information including the weight associated with each of the queues. The weight associated with the transmitted queue is then updated.

BSC 810 interfaces with packet network interface 806, Public Switched Telephone Network (PSTN) 808, and BSs in the communication system (only one BS 820 is shown in FIG. 2 for simplicity). BSC 810 coordinates the communication between ATs in the communication system and other users connected to packet network interface 806 and PSTN 808. PSTN 808 interfaces with users through a standard telephone network (not explicitly shown in FIG. 2).

BSC 810 may contain many selector elements 816, although only one is shown in FIG. 2 for simplicity. Each selector element 816 is assigned to control communication between one or more BSs 820 and one AT (not shown). If selector element 816 has not been assigned to a given AT, call control processor 818 is informed of the need to page the AT. Call control processor 818 then directs BS 820 to page the AT.

Data source 802 contains a quantity of data, which is to be transmitted to a given AT. Data source 802 provides the data to packet network interface 806. Packet network interface 806 receives the data and routes the data to the selector element 816. Selector element 816 then transmits the data to each BS 820 in communication with the target AT. In the exemplary embodiment, each BS 820 maintains a data queue 830, which stores the data to be transmitted to the AT.

The data is transmitted in data packets from data queue 830 to channel element 826. In the exemplary embodiment, on the forward link, a "data packet" refers to a quantity of data which may for example be a maximum of 1024 bits and a quantity of data to be transmitted to a destination AT within a predetermined "time slot" (e.g., approximately 1.667 msec). For each data packet, channel element 826 inserts a number of control fields. In the exemplary embodiment, channel element 826 performs a Cyclic Redundancy Check (CRC) encoding of the data packet and control fields and inserts a set of code tail bits. The data packet, control fields, CRC parity bits, and code tail bits comprise a formatted packet. In the exemplary embodiment, channel element 826 then encodes the formatted packet and interleaves (or reorders) the symbols within the encoded packet. In the exemplary embodiment, the interleaved packet is covered with a Walsh code, and spread with the short PNI and PNQ codes. The spread data is provided to RF unit 828, which quadrature modulates, filters, and amplifies the signal. The forward link signal is transmitted over the air through an antenna to the forward link.

At the AT, the forward link signal is received by an antenna and routed to a receiver. The receiver filters, amplifies, quadrature demodulates, and quantizes the signal. The digitized signal is provided to a Demodulator (DEMOD), where it is despread with the short PNI and PNQ codes and decovered with the Walsh cover. The demodulated data is provided to a decoder which performs the inverse of the signal processing functions done at BS 820, specifically the de-interleaving, decoding, and CRC check functions. The decoded data is provided to a data sink 804.

The hardware, as pointed out above, supports variable rate transmissions of data, messaging, voice, video, and other communications over the forward link. The rate of data transmitted from the data queue 830 varies to accommodate changes in signal strength and the noise environment at the AT. Each AT preferably transmits a DRC signal to an associated BS 820 at each time slot. The DRC signal provides information to the BS 820, which includes the identity of the AT and the rate at which the AT is to receive data from its associated data queue. Accordingly, circuitry at the AT measures the signal strength and estimates the noise environment at the AT to determine the rate information to be transmitted in the DRC signal.

The DRC signal transmitted by each AT travels through a reverse link channel and is received at BS 820 through a receive antenna coupled to RF unit 828. In the exemplary embodiment, the DRC information is demodulated in channel element 826 and provided to a channel scheduler 812 located in the BSC 810 or to a channel scheduler 832 located in the BS 820. In one embodiment, the channel scheduler 832 may be located in the BS 820. In an alternate embodiment, the channel scheduler 812 may be located in the BSC 810, and connects to selector elements 816 within the BSC controller 810.

Transmission scheduling in a circuit-switched system may involve a proportional fair algorithm, wherein a priority function is defined for each user. An example of a proportional fair algorithm is presented hereinbelow. The priority function may take into consideration the requested data rate for a given user, typically a function of forward link channel quality to the user, and the throughput for the user. Capacity is thus balanced by first serving those users having high requested data rates compared to throughput.

Transmission scheduling in a packet-switched system, according to one embodiment, balances capacity with user delay. Application flows are transmitted as datagrams, which are independent, self-contained messages sent over a network. The datagram arrival, arrival time, and content are not generally guaranteed. Datagrams associated with a same application flow may be transmitted by different routes to a same user. The datagrams are reassembled at the receiver. The end-to-end delay in a packet-switched system is not fixed, and therefore, the scheduler may use this difference in delay and adjust the delay for the various users to increase capacity. For example, the scheduler may decrease the delay experienced by users requesting data having low delay bounds and/or delay variation limits. Such applications include (but are not limited to) VoIP, video, etc. Transmissions may have specific QoS requirement(s). A VoIP type communication, for example, requires the packets arrive having a defined latency, or within an allowable delay period. Therefore, it may be desirable to prioritize those communications or applications having a lower latency requirement or other Grade of Service (GoS) specification(s). Multimedia conferencing, video streaming, web browsing, and File Transfer Protocol (FTP) transfers each have specific GoS requirements.

To implement a priority classification scheme, each flow is assigned a priority function. In an embodiment, a Priority Function (PF) for a packet-switched scheduler may then be given as:

$$PF = f(\text{delay}) \quad (1)$$

wherein f( ) is a function, and the PF is then determined based on the delay requirement of a given user or a given application for a user. The PF is calculated for each datagram in each queue; the various PFs are compared to identify the higher priority flow instances. Packet-switched communications allow scheduling to incorporate adaptive delay management, as the end-to-end delay of a given communication is not fixed. This is in contrast to a circuit-switched communication where the end-to-end delay is fixed.

Note that the following discussion considers a cdma2000 system supporting High Rate Packet Data (HRPD) services such as described in the IS-856 specifications. This system is used as an example. Embodiments disclosed herein are applicable to other systems wherein users are selected for service according to a scheduling method.

In an HRPD system, the air interface may support up to four parallel application streams. The first stream carries signaling information, and the other three may be used to carry applications with different QoS requirements or other applications.

As discussed above, CDMA2000 (or cdma2000) represents a family of ITU-approved, IMT-2000 (3G) standards and includes CDMA2000 1X and CDMA2000 1xEV-DO technologies. They provide increased network capacity to meet growing demand for wireless services and high-speed data services. CDMA2000 1X was the world's first 3G technology commercially deployed (October 2000). CDMA2000 1xEV-DO was recognized as an IMT-2000 technology at the Stockholm Conference in 2001. Optimized for packet data services, CDMA2000 1xEV-DO provides a peak data rate of 2.4 Mbps within one 1.25 MHz CDMA carrier. It leverages the existing suite of Internet Protocols (IP), and hence supports all popular operating systems and software applications. 1xEV-DO offers an "always on" user experience, so that users are free to send and receive information from the Internet and their corporate intranets, any time, anywhere. In addition, 1xEV-DO is a solution that allows any bursty data application to run on any device.

With single users, 100% of the serving time may be dedicated to one user. Multi-user diversity gain is achieved through packet scheduling by serving users. One feature of the 1xEV-DO forward link is that it enables the use of scheduling methods that make use of multi-user diversity to increase data throughput. Under multi-user diversity, a scheduler can take advantage of the variations in channel conditions by scheduling transmissions to mobiles (or ATs) during time slots and/or on particular frequency carriers when the mobile is experiencing high signal levels.

However, there are problems with using many of the scheduling schemes that exist in the prior art. Optimal scheduling across a large number of sub-carriers with a large number of users is computationally impractical. In the prior art, forward link schedulers were single carrier schedulers that resided on a single entity. The present method and apparatus use a distributed FL scheduler to transmit packets. In addition, it extends the EV-DO Rev. A single-carrier to multi-carrier applications.

The following glossary is provided for clarity in understanding one embodiment presented hereinbelow. The following glossary is not intended to be exhaustive and is not intended to limit the present invention thereto, but rather is provided for clarity and understanding with respect to one embodiment of a communication system supporting an adaptive weighted scheduling algorithm.

GLOSSARY

Access Network (AN)—the network equipment providing data connectivity between a cellular network and a packet switched data network (typically the Internet) and the ATs. An AN in an HRPD system is equivalent to a base station in a cellular communication system.

Access Terminal (AT)—a device providing data connectivity to a user. An AT in an HRPD system corresponds to a mobile station in a cellular communication system. An AT may be connected to a computing device such as a laptop personal computer or it may be a self-contained data device such as a Personal Digital Assistant (PDA). An AT may have various names, such as access unit, access node, subscriber unit, mobile station, mobile device, mobile unit, mobile phone, mobile, remote station, remote terminal, remote unit, user device, user equipment, handheld device, etc.

Application flow—the designated transmission path from source to AT for a given application stream. Each application flow is identified by a source, destination, traffic profile and quality of service profile.

Application stream—a data communication corresponding to an application. Most applications streams have designated quality of service requirements.

Automatic Repeat Request (ARQ)—a mechanism whereby the transmitter initiates a retransmission of data based on occurrence or non-occurrence of an event.

Average data rate—average input data rate over time for a given application flow.

Burstiness ($\sigma$)—measure of the burstiness or density and relation in time of packets in an application flow.

Best Effort (BE)—Application flows that in general have a relatively large volume of data to a receive over the air, but the nature of the traffic is such that relatively large delays may be tolerated, but the data loss rate should be extremely small.

Data Rate Control (DRC)—a mechanism whereby an AT transmits a requested data rate to the AN.

Deficit Bits (defbits)—number of bits corresponding to the deficit packets.

DelayBound—specified time (delay bound) allowed for transmission of a packet of data from AN to AT.

Expedited Forwarding (EF)—application flows typically having small amounts of traffic that arrive from the Internet to the AN, however the nature of the traffic is such that the data packets should be delivered to the user within a certain relatively small DelayBound, with reasonable data loss rate.

Forward Link (FL)—transmission air link from AN to AT.

Head Of Line (HOL) packet—first packet in a queue.

High Rate Packet Data (HRPD)—a data service transmitting packet data communications at a high data rate. Also referred to as High Data Rate (HDR), and specified in the IS-856 specifications.

Jitter—time variation between received successive packets.

Jitter bound—bound on the jitter for a given application flow.

Motion Pictures Experts Group (MPEG)—protocol for transmission of multimedia materials.

Proportional Fair (PF) algorithm—a scheduling algorithm wherein data communications are scheduled according to a selection factor calculated for each AT as a ratio of a requested data rate to throughput.

Quality of Service (QoS)—requirements relating to transmission of a packet data communication, including but not limited to, delay, required rate, and jitter.

Reverse Link (RL)—transmission air link from AT to AN.

Transmission queue—Transmission queue storing application flows for a given BTS.

Many wireless communications make use of IP to take advantage of different Per Hop Behavior (PHB) and different routings for processing packet data. Generally, the Internet is made up of a multitude of networks built from various link layer technologies which rely on IP to interoperate. IP offers a connectionless network layer service which is subject to packet loss and delay which increase with the network load. The basic IP delivery model is referred to as BE. However, some applications may require a better service than the simple BE service. For example, multimedia applications may specify a fixed bandwidth, a low delay and little jitter. Another priority type is a forwarding behaviors referred to as Assured Forwarding (AF) which guarantees a throughput level.

There are various aspects in QoS management. Some considerations of QoS management are bandwidth allocation, and guaranteed bandwidth over shared media also known as broadcast networks, e.g., an Ethernet network or a wireless Local Area Network (LAN). While there is growing demand to include wireless capabilities in laptop computers and other computing devices, wireless networks are bandwidth limited and thus capacity conservation and optimization becomes a consideration.

Figure 3:
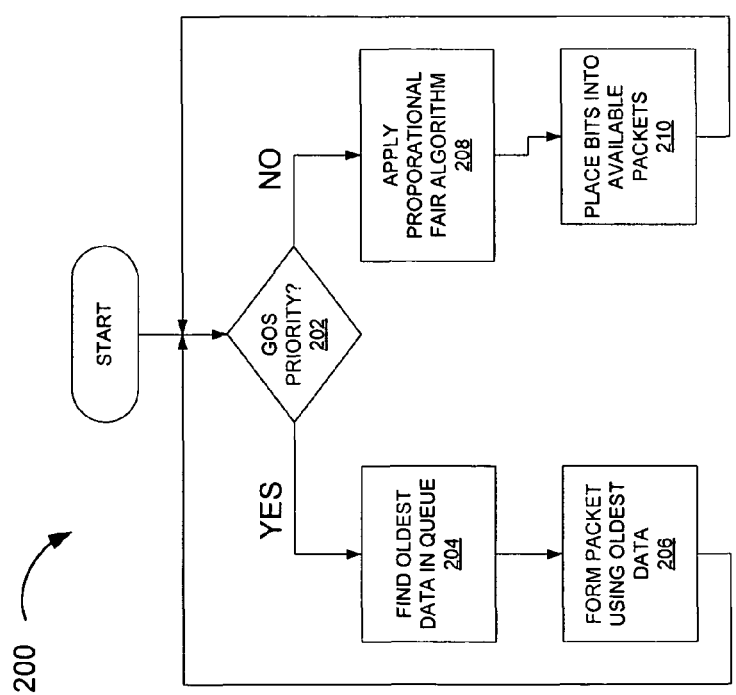
FIG. 3 is a flow diagram of an Access Network (AN) in a wireless communication system.

FIG. 3 illustrates a scheduling method which prioritizes transmissions based on GoS or QoS requirements. At the AN, data for transmission is stored in a memory storage unit adapted to store the data queues corresponding to incoming application flows. A queue is stored for each instance of an application flow.

Flows and Queues

A flow refers to a data stream destined to a user. The source of a flow may be one or more user applications, such as, but not limited to, file downloads (ftp), web surfing (http), online gaming, VoIP, or a data stream generated by a test application used to test a 1xEV-DO system. A flow may also be generated by a 1xEV-DO system itself, such as the signaling flows, to keep a 1xEV-DO system working and the user session maintained properly. Each flow may have a set of quality assurance (QoS) requirements, such as target throughput and a delay bound.

A user may have multiple, concurrent flows with different QoS requirements. Each flow may be generated either by one application, such as VoIP, ftp, signaling, or it may be generated by multiple applications that are aggregated into a single flow by a BSC. If the BSC aggregates flows in this manner, it is assumed that the aggregated flow appears to the scheduler as a single flow with well-defined QoS requirements. The scheduler may not be able to tell apart the data generated by different applications in an aggregated flow.

Each flow has at least one queue that holds the data for the first time transmission (referred to as the FTx queue of the flow) and may have additional queues for retransmissions, such as the radio link protocol (RLP) retransmission queue (RTx queue of the flow) and/or the MAC layer retransmission queue (delayed ARQ queue or DARQ queue).

In an embodiment, an application flow is divided into instances, wherein each instance is an octet of data. Every octet in each queue has a well-defined timestamp, by which the scheduler may determine the current delay incurred by the octet. Also, the timestamps are assigned to bursts of data such as (encapsulated) datagrams, implying that each octet of the data burst has the same timestamp. Individual datagrams may carry multiple application level frames, which may have been generated by an application at different times. It is assumed that the application frame timestamps are not known to the scheduler. This assumption is appropriate, since the complete datagram needs to be successfully received by a user before any of the application frames carried by the datagram can be parsed by the receiving end application.

Therefore, an application flow may have, and often will have, multiple queues associated therewith. Each queue then has an associated QoS and/or GoS priority type defined transmission and reception requirements. For example, the priority type may be based on an end-to-end delay requirement or on some other quality criteria. Note, a given transmission may fall into one of multiple GoS priority types. For example, some services allow packets of data to be transmitted individually and then reunited at the receiver at a later time without loss of continuity, e.g., BE priority type. In contrast, applications designed to give the user a real-time experience, such as VoIP, have a higher priority type and are referred to as EF priority type. The EF priority type includes applications having limits on delay bound and delay variation. In the present example, the scheduler prioritizes EF communications. The QoS or GoS priority type may also be referred to as a QoS class. In addition, each queue has a sensitivity associated therewith. For example, an EF application flow is typically delay sensitive, meaning transmission of the EF application flow has delay requirements which are to be met. In many cases, if the delay requirements are not met the data is discarded and not transmitted. In contrast, a BE application flow is typically throughput sensitive, meaning transmission of the BE application flow has target throughput requirements, but does not necessarily have the strict delay requirements of an EF application flow.

FIG. 3 illustrates a scheduling method 200 implementing adaptive delay management according to one embodiment. Within the AN, a scheduler implements a scheduling method providing high rate packet data transmissions to multiple users. The scheduler checks the data queue to determine the GoS type for data. If any of the data is of a given GoS priority type, e.g., priority type defining more specific requirements than BE, at decision diamond 202, the process continues to step 204 to find an oldest data of a highest priority type in the queue. As used herein a higher priority type refers to a GoS priority type defined by a stricter specification. For example, one priority type may specify a delay bound, while another may specify a jitter bound. In this case, the priority type specifying the delay bound is considered a higher priority and is thus considered first.

According to the present embodiment, the scheduler first orders the bits into packets for transmission based on delay requirements. Once high priority data is scheduled, another method may be applied to schedule remaining packets.

For example, when EF data is in the queue, the scheduler begins forming packets for transmission using the EF data. The EF data is selected based on the age of the data in the queue, step 204. In one embodiment, as data is put into the queue, at which time the data receives a time stamp. The scheduler finds the EF data having the earliest time stamp and puts this into a packet first. The scheduler then continues putting EF data into packets according to age in the queue, step 206. Once all of the EF data has been placed into packets for transmission, the scheduler then applies another method for the rest of the data. In the present embodiment, the scheduler applies a proportional fair method to the rest of the data, which may be BE data, step 208. The BE data is then put into packets according to the proportional fair method, step 210.

Note, as the channel condition increases, users request data at higher rates, which has the effect of lowering the delay bound. Therefore, even when the scheduler prioritizes EF data, delay bound may be a function of the channel condition.

For transmission of BE data, the scheduler selects the packet to maximize throughput. Throughput is generally calculated as:

$$\text{Throughput} = (\text{bits per packet})/(\text{slots per packet}) \quad (2)$$

According to one embodiment, the PF may be given as:

$$PF = f(\text{packet age}) * g(\text{channel condition}) * h(\text{cell loading}) \quad (3)$$

which considers the packet age as well as the channel condition and loading of the cell in scheduling transmissions. Such a calculation may be used for scheduling EF data or BE data.

Referring again to FIG. 2, in one embodiment, channel scheduler 832 receives information from data queue 830 indicating the amount of data queued up for each AT, also called queue size. Channel scheduler 832 then performs scheduling based on DRC information and queue size for each AT serviced by BS 820. If queue size is required for a scheduling method used in an alternate embodiment, channel scheduler 812 may receive queue size information from selector element 816.

During the transmission of a packet to one or more users, the users transmit an ACK signal after each time slot containing a portion of the transmitted packet. The ACK signal transmitted by each user travels through a reverse link channel and is received at BS 820 through a receive antenna coupled to RF unit 828. In the exemplary embodiment, the ACK information is demodulated in channel element 826 and provided to a channel scheduler 812 located in the BSC 810 or to a channel scheduler 832 located in the BS 820. In an embodiment, the channel scheduler 832 is located in the BS 820. In an alternate embodiment, the channel scheduler 812 is located in the BSC 810, and connects to selector elements 816 within the BSC 810.

Embodiments of the present invention are applicable to other hardware architectures, which may support variable rate transmissions. For example, embodiments of the present invention may be readily extended to cover variable rate transmissions on the reverse link. In an embodiment, instead of determining the rate of receiving data at the BS 820 based upon a DRC signal from ATs, the BS 820 measures the strength of the signal received from the ATs and estimates the noise environment to determine a rate of receiving data from the AT. The BS 820 then transmits to each associated AT the rate at which data is to be transmitted in the reverse link from the AT. The BS 820 may then schedule transmissions on the reverse link based upon the different data rates on the reverse link in a manner similar to that described herein for the forward link.

Also, a BS 820 of the embodiment discussed above transmits to a selected one, or selected ones, of the ATs to the exclusion of the remaining ATs associated with the BS 820 using a CDMA scheme. At any particular time, the BS 820 transmits to the selected one, or selected ones, of the ATs by using a code, which is assigned to the receiving BS 820. However, the present invention is also applicable to other systems employing different TDMA methods for providing data to select BS(s) 820, to the exclusion of the other BSs 820, for allocating transmission resources optimally.

The channel scheduler 812 schedules the variable rate transmissions on the forward link. The channel scheduler 812 receives the queue size, which is indicative of the amount of data to transmit to an AT, and messages from ATs. The channel scheduler 812 preferably schedules data transmissions to achieve the system goal of maximum data throughput while conforming to a fairness constraint.

As shown in FIG. 1A, ATs are dispersed throughout the communication system and may be in communication with zero or one BS on the forward link. In the exemplary embodiment, the channel scheduler 812 coordinates the forward link data transmissions over the entire communication system.

According to an embodiment, the channel scheduler 812 of FIG. 2 is implemented in a computer system, which includes a processor, Random Access Memory (RAM) and a program memory for storing instructions to be executed by the processor (not shown). The processor, RAM and program memory may be dedicated to the functions of the channel scheduler 812. In other embodiments, the processor, RAM and program memory may be part of a shared computing resource for performing additional functions at the BSC 810. In the exemplary embodiment, a generalized scheduler is applied to the system 800 illustrated in FIG. 2 and is detailed hereinbelow. Those modules within the BSC 810 and BS 820 used to implement a priority function for scheduling data transmissions are discussed after establishing the specifics of the generalized scheduler.

Given the growing demand for wireless data applications, the demand for very efficient wireless data communication systems has increased significantly. The IS-95 standard is capable of transmitting traffic data and voice data over the forward and reverse links. In accordance with the IS-95 standard, the traffic data or voice data is partitioned into code channel frames that are 20 milliseconds wide with data rates as high as 14.4 Kbps. In an IS-95 system, each subscriber station is allocated at least one of a limited number of orthogonal forward link channels. While the communication between a BS and a subscriber station is ongoing, the forward link channel remains allocated to the subscriber station. When data services are provided in an IS-95 system, a forward link channel remains allocated to a subscriber station even during times when there is no forward link data to be sent to the subscriber station.

A significant difference between voice services and data services is the fact that the former imposes stringent and fixed delay requirements. Typically, the overall one-way delay for speech frames is specified to be less than 100 milliseconds. In contrast, the data delay may become a variable parameter used to optimize the efficiency of the data communication system.

Another significant difference between voice services and data services is that the former requires a fixed and common GoS for all users. Typically, for digital systems providing voice services, this translates into a fixed and equal transmission rate for all users and a maximum tolerable value for the error rates of the speech frames. In contrast, for data services, the GoS may be different from one user to another user and may be a parameter optimized to increase the overall efficiency of the data communication system. The GoS of a data communication system is typically defined as the total delay incurred in the transfer of a predetermined amount of data, hereinafter referred to as a data packet.

Yet another significant difference between voice services and data services is that the former requires a reliable communication link which, in the exemplary CDMA communication system, is provided by soft handoff. Soft handoff results in redundant transmissions from two or more BSs to improve reliability. However, this additional reliability is not required for data transmission because the data packets received in error may be retransmitted. For data services, the transmit power used to support soft handoff may be more efficiently used for transmitting additional data.

Transmission delay required to transfer a data packet and the average throughput rate are two attributes used to define the quality and effectiveness of a data communication system. Transmission delay does not have the same impact in data communication as it does for voice communication, but it is a metric for measuring the quality of the data communication system. The average throughput rate is a measure of the efficiency of the data transmission capability of the communication system. There is a need in the art for communication systems that provide improved data throughput while simultaneously providing a GoS that is appropriate for the types of service being provided over a wireless channel.

The need for a generalized scheduler is based on the requirements and targets of data transmission in a wireless system. For data transmissions, throughput is defined in terms of the delays incurred in the transmission of packets of data rather than in terms of individual bits or bytes. A data packet, such as an IP datagram, is an indivisible unit as, in most cases, receipt of only a portion of a packet does not contain sufficient information for the user to decode and use the entire packet. The end user receives the packet of data, performs a CRC on the packet of data, and processes the data. Therefore, the user is most concerned with the arrival time of the last bit of a packet and is not as concerned with the delay of individual bits in the data packet. This allows considerable flexibility in rate allocations to different users over time scales smaller than the transmission time of a data packet. Furthermore, in a Transmission Control Protocol (TCP) type connection, some variation of packets delays is acceptable, as long as the variation is not so unpredictable that it causes TCP retransmissions needlessly.

Another feature of the wireless channel is the variability of the channel itself. In an HDR type system, this variability results in variations of the requested rate over a period of time. To maximize use of the channel, the scheduler is designed to serve high rate users, i.e., users requesting the highest data rates. This means that occasionally, the users may not be served for periods of time when their requested rates are lower. The overall throughput may be maximized when the scheduler does not serve low rate users for long periods of time. However, the scheduler needs to balance this against the desire for packet delays and delay variations to be relatively consistent as explained hereinabove.

Another aspect considers the fairness to multiple users in a system. To accomplish a fair scheduling method, the scheduler distributes the overall throughput among different users. Different bases of fairness (or allowable unfairness) are used by different systems to affect the needs and desires of the individual systems. The concept of fairness is a key concept in many scheduling algorithms. Fairness provides different amounts of flexibility in serving different users and hence has an impact on the overall throughput of a sector.

According to one embodiment, a method and apparatus for scheduling transmissions in a communication system with application to multiple classes of users incorporates a generalized scheduler. The generalized scheduler accommodates a variety of different scheduling priorities. Different classes of users each having specific transmission requirements are serviced by a generalized scheduler, which maintains a high throughput over all users.

In the design of a forward link scheduler, three major QoS classes are considered:

BE—this class refers to flows that can typically afford relatively high end-to-end delays, but use very low Bit Error Rate (BER). Although there is no minimum throughput requirement, the size of the data to be transmitted can be high. Examples of flows that can be considered BE include file downloads (ftp) and web surfing (http).

AF—this class contains flows that are, in general, similar to the BE flows in that they can afford somewhat large delays; however, they differ from the BE flows in that there is typically a minimum average throughput requirement for AF flows. An example of an application that can be considered as an AF flow is the video stream generated by a videoconferencing application.

EF—this class refers to flows that typically (but not necessarily) have a low throughput requirement, but have stringent end-to-end delay requirements. The reliability requirement may not be as strict as for BE flows; it may be acceptable to lose a small fraction of application data (such as 1% to 2%). Examples of such flows are VoIP and online gaming.

As far as the forward link scheduler is concerned, the difference between BE and AF flows is in the minimum throughput requirement, which is zero for BE flows and non-zero for AF flows. Otherwise, there is no other distinction between these two QoS classes.

Within the EF class, there may be flows with different priorities. As an example, applications such as VoIP and the audio part of a videoconferencing application may be considered to have higher priority than the video part of the videoconferencing application. Online gaming may be considered to have lower priority than both the audio and video applications.

In addition to the flows generated by user applications, a 1xEV-DO system may have internally generated flows, such as the signaling flow that is required to keep the 1xEV-DO system running, and the flows generated by test applications used to test the 1xEV-DO system.

In one embodiment, operation of a generalized scheduler implements a priority function of a channel condition metric and a fairness criteria, wherein the priority function is defined as:

$$f(A_i(t), U_i(t)) \quad (4)$$

wherein $A_i(t)$ is referred to as the channel condition metric and $U_i(t)$ is referred to as the user fairness metric. The function $A_i(t)$ specifies the desirability of serving user i at time t based on a current channel condition. The function $U_i(t)$ specifies the desirability of serving user i at time t based on the past history of received service. The priority function f( ) combines the two desirability metrics, $A_i(t)$ and $U_i(t)$, to determine a priority level for each user.

According to one embodiment, a generalized scheduler serves the user with the highest priority function $f(A_i(t), U_i(t))$ within a given class or type of users. In the exemplary embodiment, the value taken by the priority function $f(A_i(t), U_i(t))$ increases as the channel condition function $A_i(t)$ increases and decreases as the fairness function $U_i(t)$ increases. The functions $A_i(t)$ and $U_i(t)$ are determined accordingly. Further, the priority function f( ) is a function of at least one time period over which the channel condition metric and the user fairness metric are measured. In an alternate embodiment, the priority function f( ) may be a time-dependent per-user function. However, for simplicity, a scheduler may use a combiner function common to all users and modify the user fairness metric to reflect the user requirements.

QoS Requirements

Typical QoS requirements may be stated in terms of the following variables:

The DelayBound is a parameter specified to the scheduler for each flow and it refers to the maximum delay, relative to the timestamp of a datagram (or an octet), within which the datagram has to be successfully delivered to the user. Note that this is different from the end-to-end delay bound which would involve delay-budget components other than the forward link delay in a 1xEV-DO system. Once the DelayBound of a datagram is reached, the datagram is taken out of the queue.

The TargetThroughput is another QoS parameter that may be specified to the scheduler, and it refers to the minimum required average throughput for a flow. The averaging of the throughput may be defined via a first-order infinite impulse response (IIR) filter with an appropriate time constant (such as 1 sec).

A third QoS requirement may be the reliability. Typically, the physical layer of a 1xEV-DO system provides 1% Packet Error Rate (PER) which may not be sufficient for applications that require an exceptionally low error rate, such as file downloads. Therefore, in order to further reduce the losses over the air, retransmission mechanisms can be utilized. Typical retransmission mechanisms are RLP retransmissions and MAC layer retransmissions (corresponding to the RTx and DARQ queues, respectively, as discussed earlier). Beyond this, TCP may be used as a transport layer protocol for an application to provide further reliability.

Capacity and Fairness

A forward link scheduler, such as channel scheduler 812, balances maximizing the system capacity while providing fairness across flows and meeting certain priority and QoS requirements of the flows. The concepts of capacity and fairness depend on the QoS requirements of individual flows. For BE flows, capacity may be defined as the total BE throughput transmitted by a sector. For EF flows of a particular type (such as VoIP), capacity may be defined as the number of users that can be supported while meeting their QoS requirements. As an example, one may define the VoIP capacity as the number of VoIP users such that, on the average, 95% of the users receive 98% of the application data frames (or octets) successfully (within the specified DelayBound and free of transmission errors).

The issue of fairness across flows may be handled for the BE and EF QoS classes as follows: Use proportional fairness among BE flows so that as the system load increases, the BE flows suffer even degradation. For EF flows, it is desirable to have an uneven degradation across users as the system load increases (or congestion occurs). The degradation starts with the EF flows that are considered to have the lowest priority. Among the flows corresponding to similar QoS requirements and the same level of priority, the degradation starts with the flows of the users that have the worst channel conditions. With this approach, as the system gets congested, the largest possible number of EF flows may satisfy their QoS requirements. This approach usually results in an approximately inverse relationship between a user's channel condition and the delay statistics of its EF flows. This property is referred to as "Delay Fairness."

A generic class of multi-user schedulers categorizes users receiving service from an AN into at least two broad categories, BE and EF. Other categories of transmissions may be implemented as well, such as AF, etc. As discussed above, BE applications in general have a relatively large volume of data to receive over the air; the nature of the traffic is such that relatively large delays may be tolerated, but the data loss rate should be extremely small. EF application flows typically have small amounts of traffic that arrive from the Internet to the AN, however the nature of the traffic is such that the data packets should be delivered to the user within a certain relatively small DelayBound, with reasonable data loss rate.

In a packet data system such as 1xEV-DO, the scheduler has the flexibility to allow variable delay performance to individual users to maximize the capacity. Here, capacity refers to the throughput for BE users and to the number of served users with acceptable performance in the case of delay sensitive traffic such as VoIP (EF users).

In 1xEV-DO generally, increasing the DelayBound of a user improves utilization of the FL, thus increasing the BE and EF capacity of the system. This capacity increase follows from various factors including, but not limited to, higher packing efficiency and the ability to take advantage of local channel conditions and multi-user diversity gain.

In the case of BE-only traffic, a typical scheduler is the Proportional Fair (PF) scheduler. This scheduler is proportionally fair in the sense that the throughput provided to individual users would be approximately proportional to the user's geometry, i.e., average channel condition. The PF scheduler has been the scheduler of choice for BE-only traffic because of the benefits of throughput to fairness tradeoffs. In addition, the PF algorithm is designed to take advantage of local channel peaks while providing multi-user diversity gain. As used herein, such a PF scheduler will be referred to as the "proportionally fair throughput scheduler."

Note, in the case of BE-only traffic, there is another class of schedulers: the "equal grade of service" scheduler. This scheduler aims at providing equal throughput to all users. For this reason, the system capacity is determined by the weakest users. Although equal grade of service scheduler may be desirable in certain applications, such schedulers do not typically utilize the air link efficiently. These schedulers are referred to herein as "equal throughput schedulers."

The proportionally fair throughput schedulers and the equal throughput schedulers described above are useful in the context of BE-only traffic. For delay sensitive EF traffic, these schedulers may not be as effective due to lack of a mechanism for delay control. The following presents delay-sensitive scheduling means and methods which operate in parallel with the two approaches for BE-only traffic, i.e., proportionally fair throughput and equal throughput schedulers. In the case of delay sensitive traffic, the "proportional" versus "equal" fairness applies not only to the throughput provided to individual users, but also to the "delay" performance provided to individual users. The delay performance may be quantified in terms of average delay or delay tail weight, etc. Note, alternate embodiments may incorporate the BE and EF scheduling into a common method, while meeting the throughput and delay sensitivity requirements, respectively.

In one embodiment, an approximately equal delay performance may be provided to each user. This approach is similar to equal throughput and for the symmetry of terminology, is referred to as the "equal delay scheduler." An equal throughput scheduler attempts to provide equal throughput to all users and therefore, the system capacity may be determined by the users having the weakest coverage. An equal delay scheduler attempts to provide equal delay performance, such as equal mean delay or equal delay tail weight, to all users and therefore, system capacity is similarly determined by the users having the weakest coverage.

In another embodiment, the delay performance provided to a user is proportional to the average geometry of the user. This approach is similar to the proportionally fair throughput scheduler and is referred to as the "proportionally fair delay scheduler." The proportional fair throughput scheduler tries to provide throughput to individual users proportional to their average geometry, thus significantly improving the system capacity compared to an equal throughput scheduler. Similarly, a proportionally fair delay scheduler would provide a delay performance to each individual user proportional to the user's average geometry, thus maximizing the EF capacity.

Figure 4:
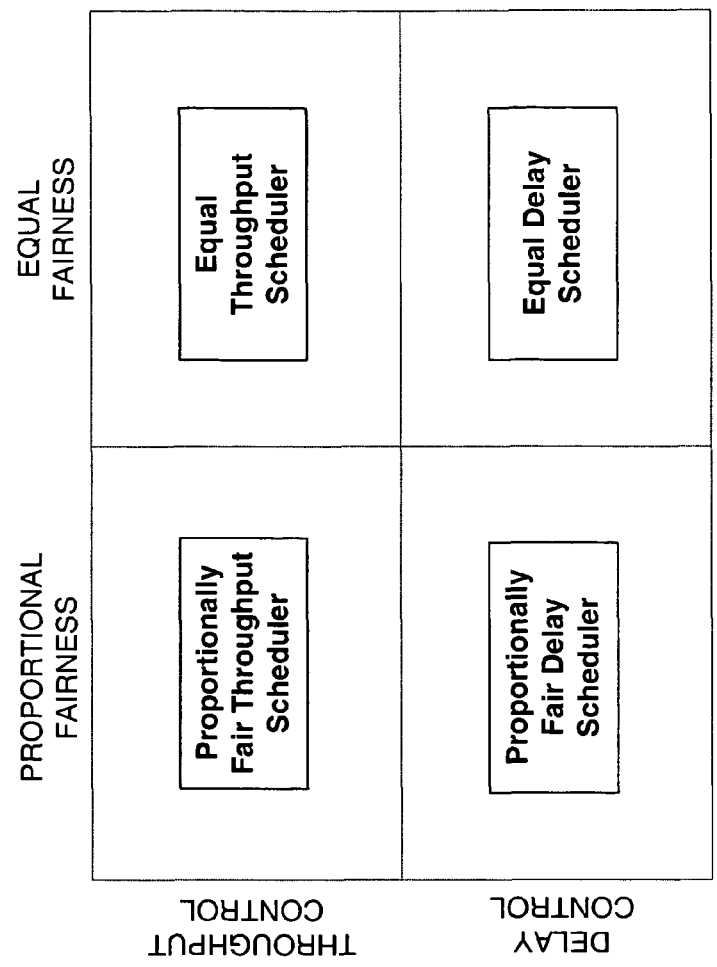
FIG. 4 illustrates categorization of packet data schedulers.

These four categories of packet scheduling are illustrated in FIG. 4. Each category is illustrated with the balance of QoS considerations. Specifically, the PF throughput scheduler balances throughput control with proportional fairness. The equal throughput scheduler balances throughput control with equal fairness. The PF delay scheduler balances delay control with proportional fairness. The equal delay scheduler balances delay control with equal fairness.

While some scheduling methods are useful in circuit-switched systems, others are more applicable for packet data systems, such as 1xEV-DO. The proportionally fair delay scheduling means and methods presented herein may provide an advantage of packet-switched systems over circuit-switched systems.

In addition to improving system capacity, the proportionally fair delay scheduler may also enhance the user experience. For example, users in close proximity to BSs are more likely to receive better delay performance than users far from BSs. This is in contrast to delay performance which is not dependent on the user's proximity to a BS. In addition, for users at high geometry, in close proximity to a BS, the performance may be predictable with a high confidence level; whereas for an equal delay scheduler, the performance may be unpredictable depending on the current load on the system. It is therefore desirable for a scheduler to provide quality of service increases with increases in the geometry of the individual users.

A scheduler that serves both BE and EF users may utilize an appropriate combination of proportionally fair throughput and delay scheduling. Such a scheduler will be referred to as a "proportionally fair throughput/delay scheduler." Note, in one embodiment, proportionally fair throughput/delay scheduling is implicitly based on relative geometries of users served for a single sector. This is referred to as "intra-sector fairness." Another issue to consider in design of a scheduler is the "inter-cell" fairness, which may be described as the average level of service, and may be quantified in terms of throughput provided to BE users and the average delay provided to EF users, etc., provided by different sectors to the users served by those sectors.

To continue the analogy between proportionally fair throughput scheduler and the proportionally fair delay scheduler, note that the throughput provided to individual BE users by a sector that utilizes proportionally fair throughput scheduler decreases as the number of users served by that sector increases. However, the intra-sector fairness is maintained. Similarly, the delay performance provided to individual EF users provided by a sector that utilizes proportionally fair delay scheduler may be allowed to increase as the number of users served by the sector increases.

The proportionally fair throughput/delay scheduler utilizes a decision metric of the following form to select which users to serve at any scheduling decision:

$$\text{DecisionMetric} = f(\text{PacketAge}, \text{ChannelCondition}, \text{SectorLoad}) \quad (5)$$

wherein PacketAge refers to the difference between the current time and an appropriate timestamp defined for each packet waiting in the BS queue, the channel condition refers to the quality of the radio link between the BS and the AT, and the SectorLoad refers to the volume and profile of the total traffic being served by the sector over a short span of time around the current time. The function f( ) depends on the particular implementation of the scheduler. Also, the DecisionMetric may refer to a bit metric, a packet metric, a datagram metric, or any other means to provide the scheduler with a method of transmission instance selection.

The ChannelCondition information may be incorporated into the scheduler in various ways. For example, the proportionally fair throughput scheduler uses the DRC/AvgThroughput which tends to peak during local channel peaks. Another approach may be to use DRC/AvgDRC, but in application may favor users with larger channel fluctuations. Another possibility may be to use a feedback loop to indicate a certain percentile of channel peaks. One such loop 300 is illustrated in FIG. 5.

Figure 5:
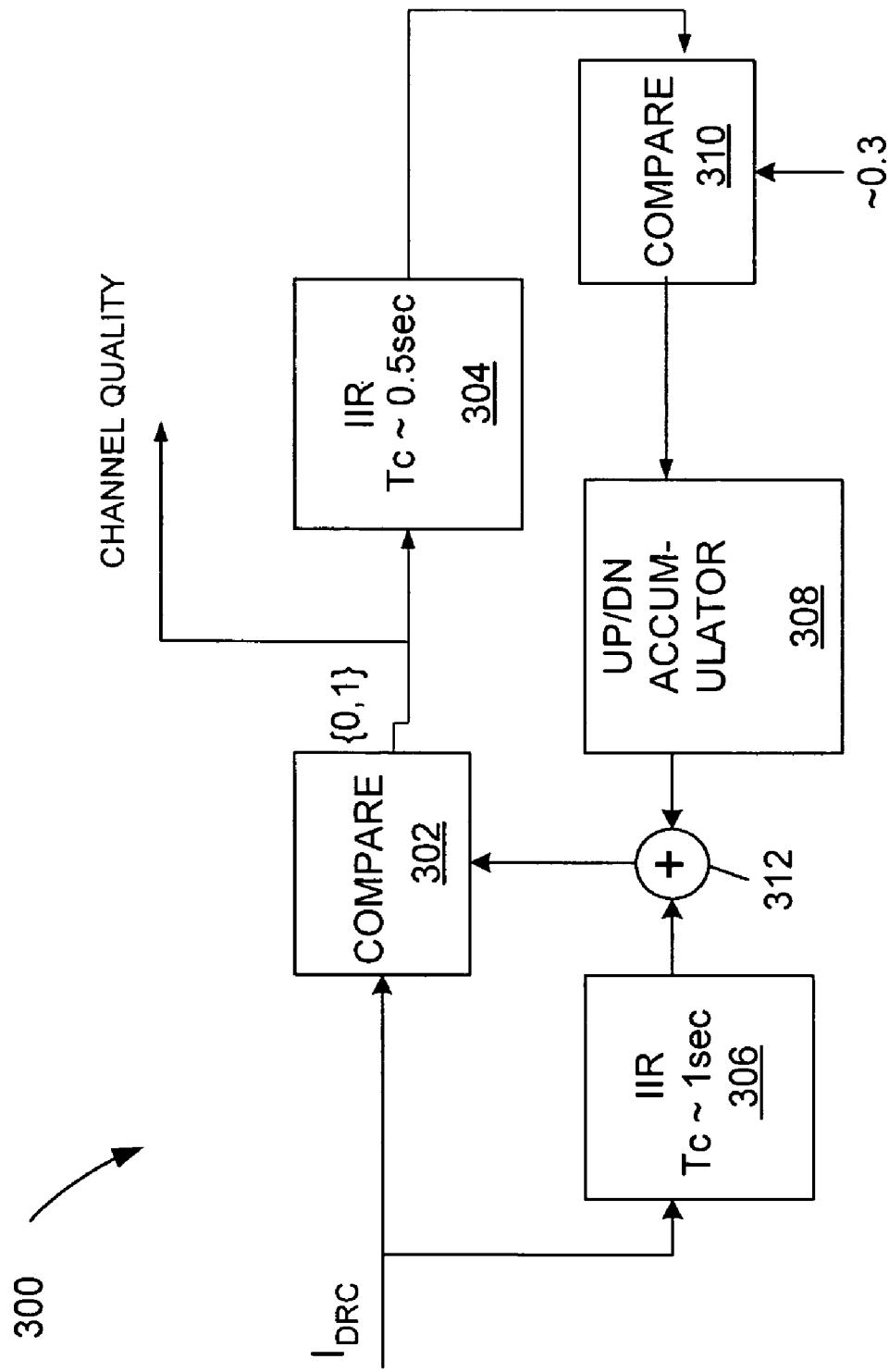
FIG. 5 illustrates a feedback loop for determining channel strength based on received data requests from a user.

One embodiment, as illustrated in FIG. 5, is a loop 300 designed to determine acceptable channel quality with respect to a threshold. The input, $I_{DRC}$, is a function or index of the DRC value, e.g., an increasing function of the data rate associated with the DRC, wherein $I_{DRC}$ increases as the requested data rate increases. The $I_{DRC}$ is provided to compare unit 302 and to an IIR filter 306. In one example, the time constant is set to 1s; however, alternate time constants may be implemented. The filtered output of IIR filter 306 is provided to a summing unit 312, which provides the threshold value to compare unit 302. The compare unit 302 compares the $I_{DRC}$ to the threshold. The result of the comparison indicates whether the current channel quality is acceptable or not. The system determines a target percentage of time when the channel quality may be acceptable. In the present example, the target is set to 30%. The target is variable and may be adjusted during operation. Alternate systems may implement other target values or schemes. The output of compare unit 302 is a binary {1,0}, wherein a "1" indicates acceptable channel quality and a "0" unacceptable (e.g., below threshold).

Continuing with FIG. 5, the output of compare unit 302 is provided to another IIR filter 304, wherein in the present example the time constant is set to 0.5 sec. Alternate time constants could be implemented. From IIR filter 304 the filtered output is provided to a compare unit 310 for comparison with an input value. In the present example the input value is 0.3. If the result of the comparison is above the input value, a signal is provided to up/dn accumulator 308 to increase the threshold for determining channel quality. This indicates the channel quality indicator from compare unit 302 is more than 30%. Else, if the comparison is below the input value, then the signal provided to up/dn accumulator 308 instructs a decrease of the threshold. The output of up/dn accumulator 308 is provided to summing unit 312. Summing unit 312 sums the outputs of up/dn accumulator 308 and IIR filter 306, wherein the input from IIR filter 306 provides a general bias for the threshold to compare unit 302. The result of the summation is provided to compare unit 302. The channel estimate indicator is taken from the output of compare unit 302. In this way, the scheduler maintains the channel estimate indicator or ChannelCondition Information to identify the percentage of good times when channel condition is good (e.g., channel peaks).

The SectorLoad may be incorporated into the scheduler by measuring the amount of BE and EF flows. Finally, the actual decision metric used by the scheduler may not explicitly include the ChannelCondition and SectorLoad measurements. The required DelayBound per user may be adaptively selected by measuring the fraction of EF users that may not meet their delay bounds for a certain fraction of transmitted IP packets.

A parameter used by some schedulers is referred to as the "QoS class index" of a flow, which defines the relative priority for that flow. There are a variety of methods by which the QoS classes may be determined. Within a given QoS class, different flows may have very different traffic types. The QoS class index is an indication to the required priority level by a flow, and may not be an indicator to the statistical behavior of the traffic.

In one embodiment, the QoS class index is a non-negative integer value selected for the scheduler to provide higher priority to flows having higher QoS class indices. Here, QoS class index of 0 corresponds to BE/AF flows; wherein the BE flows are special cases of AF flows where the minimum required throughput value is set to zero. QoS class indices of 1 and higher correspond to EF flows.

Note, higher QoS classes are given higher priority, however, BE data may not necessarily be scheduled for transmission after all EF data waiting in the queues are transmitted. As an example, the scheduler may schedule a multi-user packet to transmit a number of EF bits that are approaching a deadline. In the same transmission instance, the scheduler may also include BE data from users with compatible DRCs, e.g., transmission formats, while not including EF bits from users with incompatible DRCs.

A QoS flow may be approximately characterized by three parameters: (1) distribution of the IP datagram size, (2) distribution of the interarrival time between IP datagrams, and (3) delay bound relative to the time-stamp of the IP datagram after which the contents of the datagram becomes useless.

For BE/AF flows, the delay bound is much less stringent than EF flows, so it may not be considered for BE/AF flows. For EF flows having a same delay bound but differing in distribution of the IP datagram size and inter-arrival time, the scheduler is designed to behave almost linearly. For example, a given flow having the same delay bound and packet size distribution as a VoIP flow, but having half the inter-arrival time distribution may approximately behave the same as two VoIP flows. Similarly, a flow having the same delay bound and inter-arrival time distribution, but twice the datagram size distribution as a VoIP flow, may also approximately behave as two VoIP flows to the scheduler. Non-integer multiples of packet size and inter-arrival time may be easily envisioned to be aggregations of a basic "unit" flow type.

The delay bound, however, has a different effect on the scheduler than the datagram size and interarrival time distributions. The scheduler treats flows with lower delay bounds with higher priority. In some sense, setting the delay bound of a flow to a lower value is a soft way of increasing its QoS class index.

As discussed previously hereinabove, scheduling of transmissions is related to admission control, wherein admission control determines when a user or flow is accepted for processing and scheduling then determines when and how such flows will be transmitted. In other words, admission control determines which data will be eligible for inclusion in a transmission instance, and scheduling then determines the specific data, formats and order of the transmission instances. Therefore, scheduler operation may impact the admission control scheme used in a given system.

According to one embodiment, as system load increases, typically the BE/AF flows are scheduled such that each suffers degradation fairly. For EF flows, however, degradation is typically uneven. More specifically, lower QoS classes are degraded first in an attempt to maintain higher QoS classes functioning properly. Within a given EF QoS class, and ignoring the differences in delay bound settings, users with lower geometries are degraded to keep as many users as possible receiving the desired performance. This approach is taken to maximize the number of EF users supported. For homogeneous EF flows, the EF users are degraded unevenly starting with the lowest geometry users and propagating to higher geometry users. This approach has several consequences which are treated outside the scheduler, and more specifically, by admission control processing. Some of these consequences are illustrated in the following examples.

Figure 6:
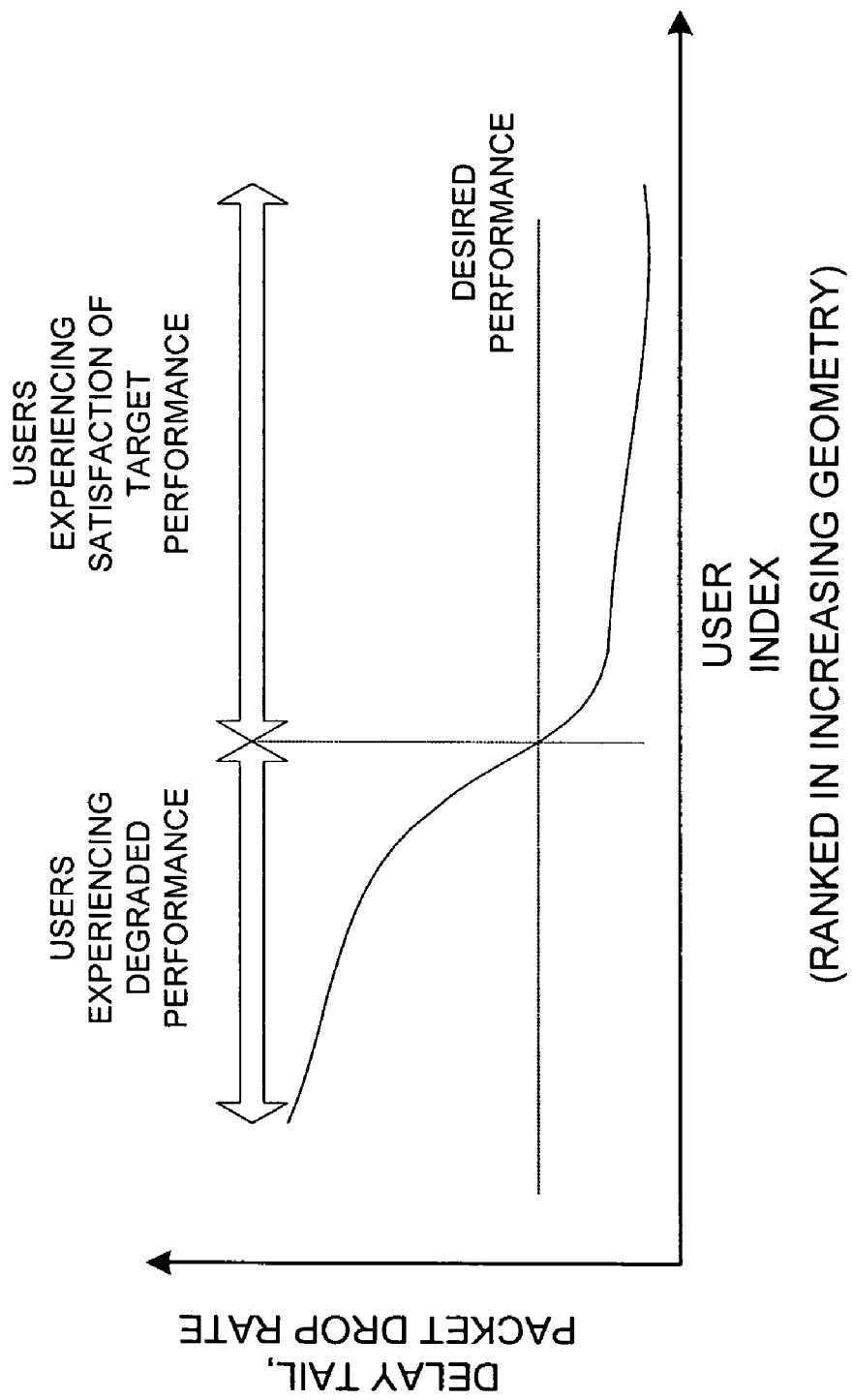
FIG. 6 illustrates behavior of a scheduler in the presence of Expedited Forwarding (EF)-only users with a single traffic type.

This functionality of the scheduler is illustrated in FIG. 6, wherein flows are shown in sorted order according to geometry, with geometry increasing to the right. Given the current system load, the scheduler gives lower priority to lower geometry users to maximize the number of QoS flows receiving a desired QoS. The level of low geometry users propagates to the right with increasing congestion. The scheduler degrades the service received by such users by giving them lower priority. However, it is not responsible of completely taking out a flow, which would typically be the function of admission control and other performance monitoring blocks.

Consider a situation wherein all users have a single flow and have the same QoS class, such as a VoIP flow, and the highest geometry user asks for a very high throughput EF flow. The scheduler may allocate all FL slots to the highest geometry user, even if this means no transmissions to other users. Generally, a decision of admission for the flow is handled by admission control processing, which considers the current loading of the system. When admission control admits the flow, the scheduler performs any basic functionality and allocates all FL slots to that user. Note, degrading lower geometry users first does not necessarily mean that the scheduler maximizes the number of EF users having acceptable receive performance. The scheduler may maximize such number if all users have a same QoS parameter(s) and a same traffic type (e.g., VoIP only).

If a low geometry user whose service is degraded by the scheduler due to mild congestion is asking for a very low throughput (e.g., 1 byte every second), the scheduler may not give the requested or desired throughput to this user even though this would not effect the FL performance. Again, it is the responsibility of the admission control to anticipate scheduler operation with respect to this user given the current system load. In this case, the admission control may force the scheduler to provide service to this user by increasing its QoS class index.

For the following discussion, consider homogeneous EF traffic as a scenario wherein all users are EF users with a same traffic model. The scheduler first creates a list of candidate transmission instances for a set of single-user and multi-user transmission formats. Single user formats are stuffed with bits from the corresponding users' queues. Multi-user formats are stuffed with bits from the queues of users having compatible DRCs.

The scheduler then assigns a packet metric to each of the candidate instances and selects the candidate transmission instance corresponding to the largest packet metric. The packet metric may be a "throughput polynomial," wherein a comparison operation is defined as the "lexical" comparison providing a well defined maximization.

Consider the packet metric for the special case wherein all users are EF users and each user has one EF flow of the same type (e.g., a VoIP-only system) and a multi-user transmission format, wherein to create a multi-user transmission instance for this format, bits are stuffed from the queues of the users with compatible DRCs. Among these users, bits are selected based on the time-stamp of the corresponding IP datagrams on a first-in, first-out basis. The delay bounds are assumed to be the same for this example. Among the bits having the same timestamps, selection follows the order in the IP packet, and among different users, selection is performed in a manner so as to minimize the number of users having data in the packet.

The payload polynomial of a transmission instance may then be given as:

$$p(z) = B_D z^{-D} + B_{D-1} z^{-D+1} + \ldots + B_1 z^{-1} + B_0 \quad (6)$$

wherein $B_n$ represents the number of bits included in the candidate transmission instance incurring a delay of n slots. The value of D may be equal to the delay bound as bits may be taken out of the queue when such bits have been in the queue for a time period exceeding the delay bound, and thus incur more than D slots of delay.

Figure 7:
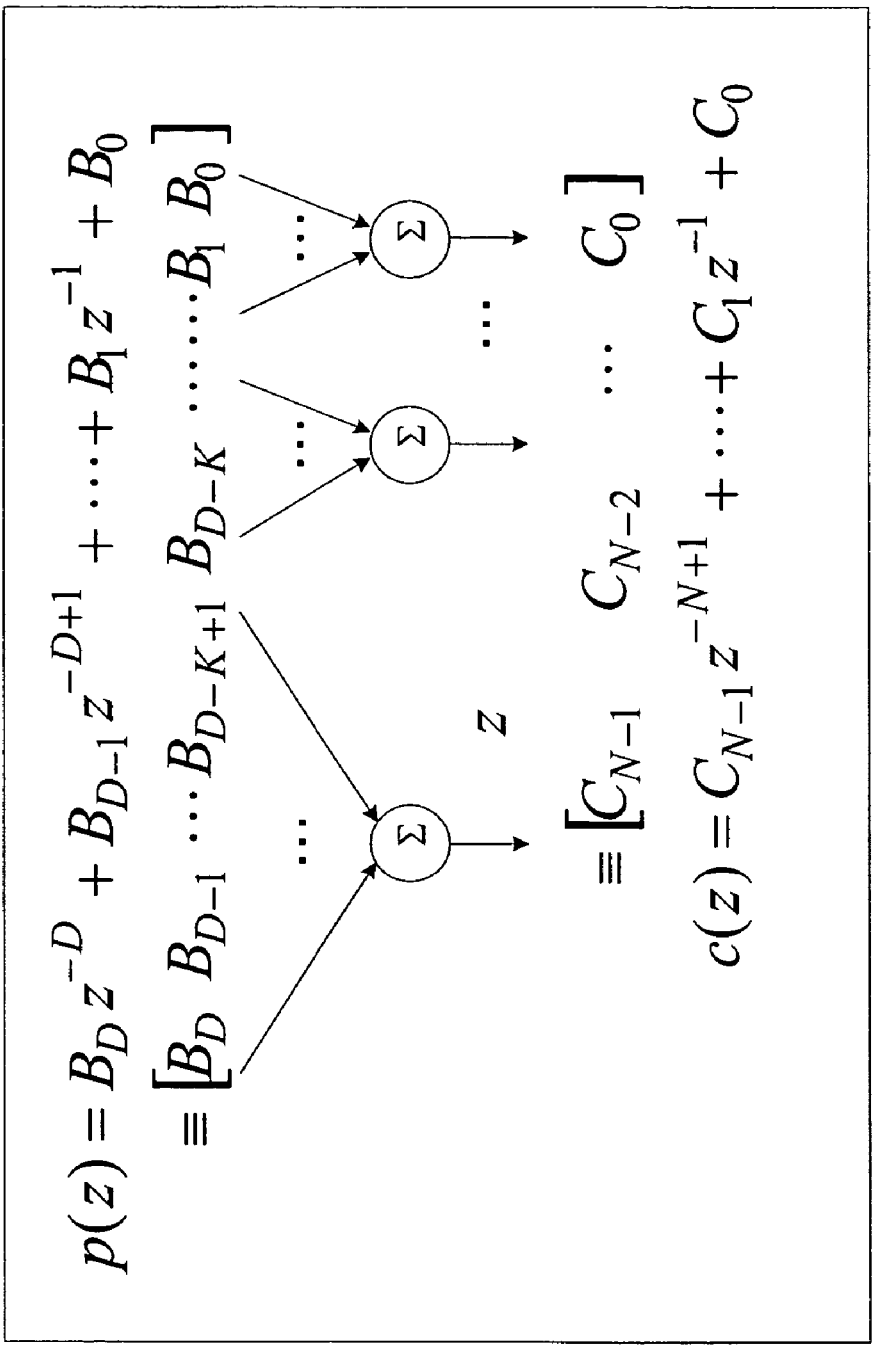
FIG. 7 illustrates calculation of condensed payload polynomial $c(z)$ from the payload polynomial $p(z)$.

The throughput polynomial is obtained by filtering and subsampling the payload polynomial. One method is to segment the coefficient vector of the payload polynomial into N groups and then sum the coefficients within each group to obtain a condensed representation of the payload polynomial. The throughput polynomial is then obtained by dividing the condensed payload polynomial by the expected number of slots for the candidate transmission instance to be decoded by all users of interest. The procedure is illustrated in FIG. 7, wherein the top row is the payload polynomial p(x), and the bottom row is c(z) which is the condensed representation of the payload polynomial. The variable z is a transmission instance index.

The throughput polynomial is then given as:

$$T(z) = c(z)/N_g \quad (7)$$

wherein $N_g$ is a "generic" span for the transmission format under consideration and the method of its calculation is discussed hereinbelow. The resulting throughput polynomial is then used as the packet metric in the selection of a candidate transmission instance 35 among a set of various other alternatives, each similarly obtained.

Note, the above described packet metric suggests a trade-off between latency enforcement and throughput. If N−1 were selected to be equal to D, that is, if c(x)=p(x), then the packet metric would enforce transmission of the bits incurring the largest delay first. Subsequently, bits incurring the next largest delay would be considered in selection of a candidate transmission instance. This is a result of the "lexical" comparison used in comparing the packet metrics (i.e., throughput polynomials). In this way, the comparison begins by identifying the highest order of each polynomial. If one polynomial is of a higher order, then that polynomial is defined as the larger polynomial. If both have a same order, then the coefficients are compared starting with the highest order; when a higher coefficient is found in one polynomial, that polynomial is defined as the larger polynomial.

Segmentation of the coefficients of p(x) to obtain c(x), implicitly ignores differences in the incurred delay corresponding to the bits within each segment. In return, there is a maximizing of the throughput which now has more flexibility. The most flexibility in maximizing throughput would be obtained if all coefficients of p(x) were combined in a single segment (e.g., c(z) of order zero).

In one example, two segments (e.g., c(z) of order one) provides a compromise. The largest order term has the greatest impact. When there is a tie among various candidate instances, the terms of c(z) would be considered. Therefore, it may not be necessary to segment the coefficients of p(z) into more than two segments. This results in a single parameter to optimize, which is denoted by $\alpha$ and call "the delay fraction." In summary, with two segments, c(z)=(hi2)z−1+(hi), where "hi2" and "hi" are the number of bits in each segment, respectively. More specifically, hi2 is the number of bits included in the candidate transmission instance incurring a delay larger than $\alpha$ times the delay bound and "hi" is the number of bits incurring a smaller delay.

For the case of users having all EF traffic, but with different traffic models (e.g., different delay bounds), the argument is modified. Bits with smaller delay bounds are to be part of the hi2 segment sooner than the bits with larger delay bounds. A natural way to accomplish this is to use $\beta$ times the delay, as opposed to "delay" alone, in stuffing bits into the candidate transmission instances and in determining when bits are to become a part of the hi2 gear.

In general, $\beta$ is designed to be proportional to one over the delay bound. A result of this is that EF bits with lower delay bounds will tend to have priority over EF bits with larger delay bounds.

Figure 8:
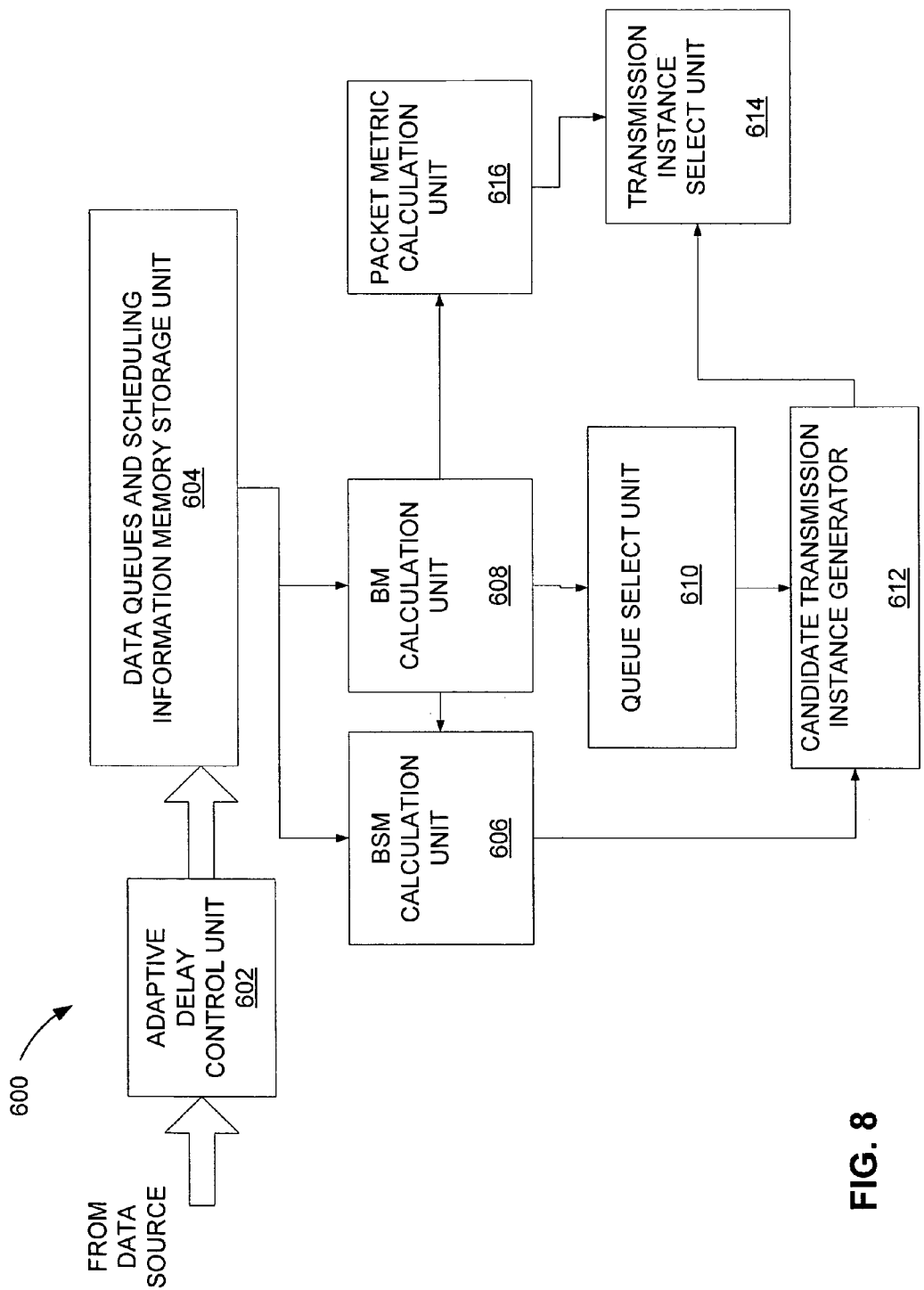
FIG. 8 illustrates a scheduler according to one embodiment.

FIG. 8 illustrates a scheduler according to one embodiment. Scheduler 600 includes an adaptive delay control unit 602 coupled to a memory storage unit 604 adapted for storing and maintaining queue information. Memory storage unit 604 also stores information relating to each queue, including delay and/or throughput sensitivity, priority class, such as EF, BE, etc., and other information which may be designed into the scheduler, such as other QoS information. The queue data and information stored in memory storage unit 604 is provided to bit metric calculation unit 608 and bit stuffing metric calculation unit 606. These units generate a bit metric and a bit stuffing metric, respectively. The calculated bit metric is provided to the bit metric calculation unit 608, the packet metric calculation unit 616, and the queue select unit 610. The bit stuffing metric and the selected queues are provided to candidate transmission instance generator 612. The packet metric from packet metric calculation unit 616 and the set of candidate transmission instances 35 generated by generator 612 are provided to transmission instance select unit 614. In one embodiment, the transmission instance select unit 614 can be a candidate packet generator 25.

Figure 9:
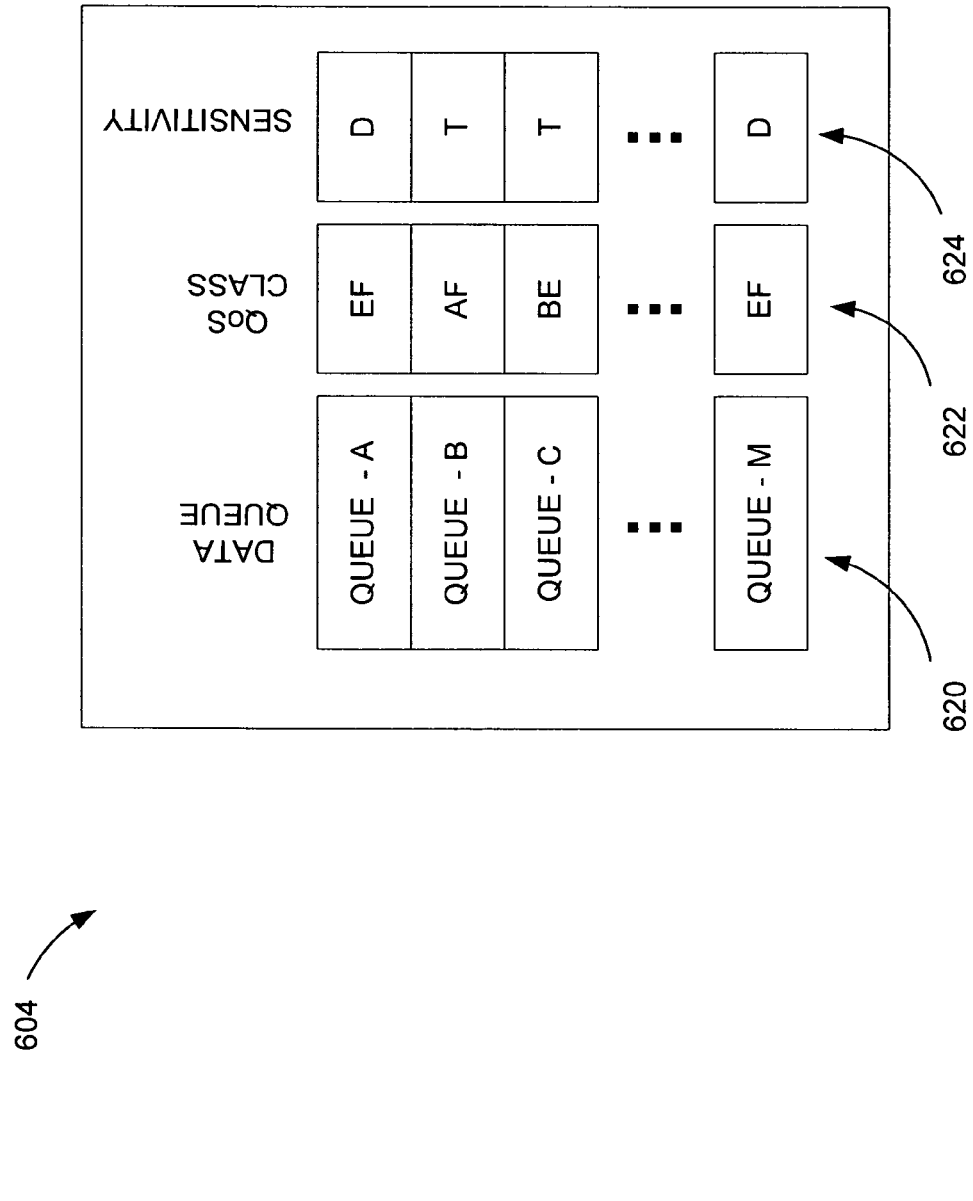
FIG. 9 illustrates a portion of the scheduler of FIG. 8 according to one embodiment.

FIG. 9 details the memory storage unit 604 as storing multiple queues having pending data. The queue data is stored per flow as queue data 620. For each queue 620 there is a corresponding QoS class or priority class 622 and a sensitivity designator 624.

Figure 10:
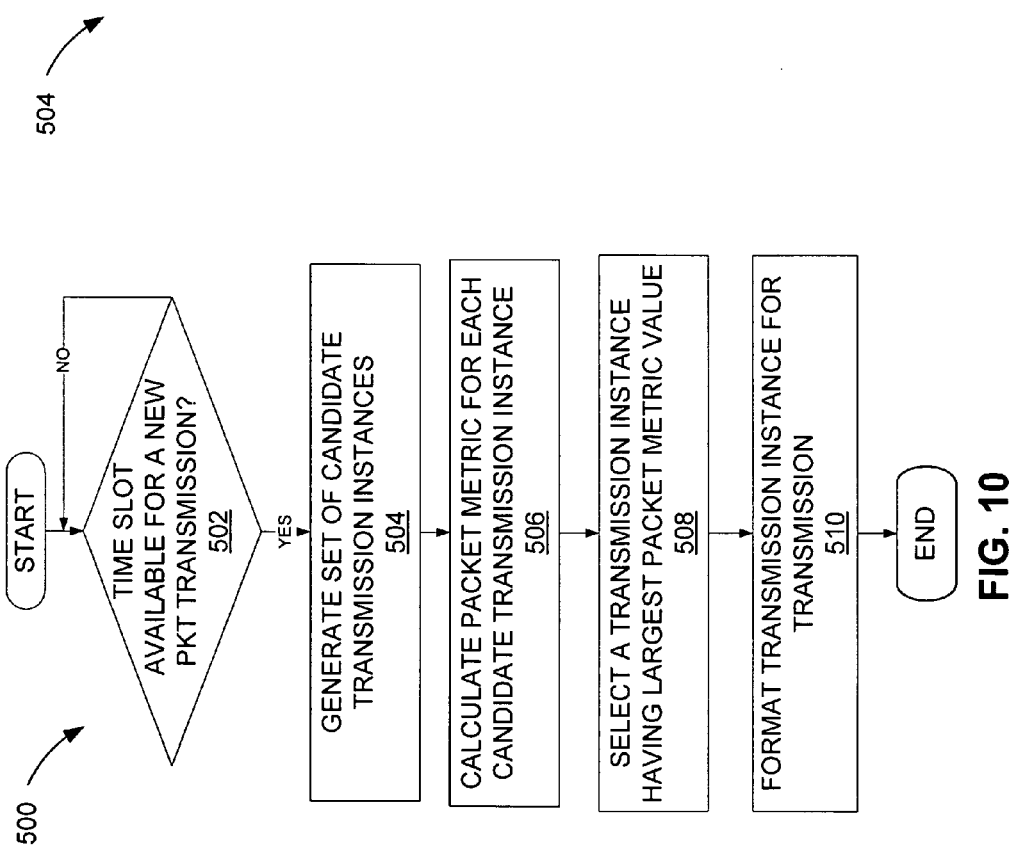
FIG. 10 illustrates a scheduling algorithm for implementing adaptive delay management of transmissions.

FIG. 10 is a flow chart illustrating the scheduling method according to one embodiment in which a single carrier scheduler 23 is used. The method 500 first determines at decision diamond 502 if the FL is busy, i.e., if the time slot is available for a new packet transmission. If the slot is available for a new packet transmission, the single carrier scheduler 23 generates a list of candidate transmission instances 35 based on a subset of defined and derived transmission formats at step 504. The packet metric corresponding to each candidate transmission instance 35 is calculated at step 506. At step 508, the single carrier scheduler 23 selects a transmission instance 35 having a greatest value for the packet metric. At step 510 the transmission instance 35 is formatted for transmission.

Figure 11:
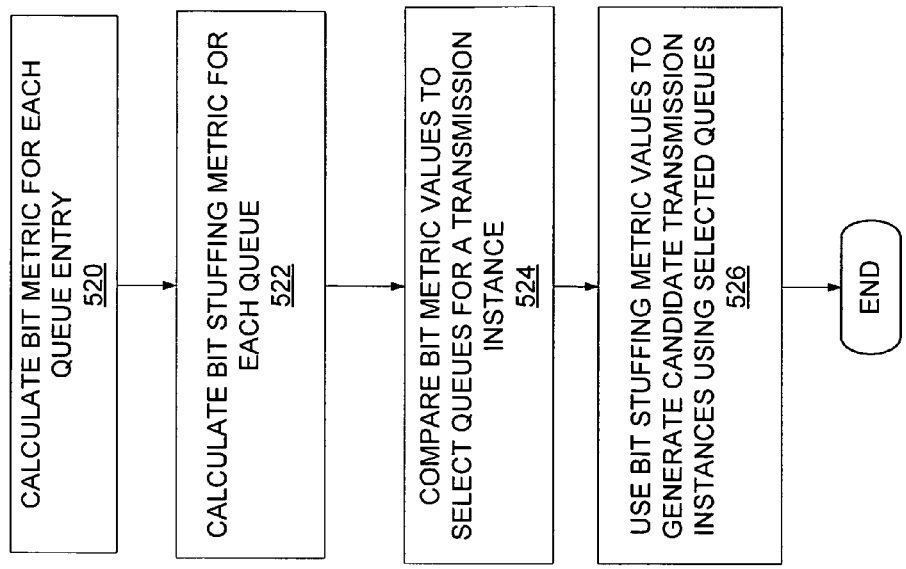
FIG. 11 illustrates a portion of the scheduling algorithm of FIG. 10 according to one embodiment.

FIG. 11 illustrates one embodiment for generating a set of candidate transmission instances 35 and implementing step 504 in method 500. At step 520, the single carrier scheduler 23 calculates a bit metric for each queue entry. At step 522, the single carrier scheduler 23 calculates a bit stuffing metric for each queue. The bit metric values are compared to select a set of queues for a transmission instance, step 524. The bit stuffing metric is used to generate candidate transmission instances 35 using the set of queues, step 526. Examples of methods and means for such calculations and comparisons are provided hereinbelow.

Note, in one embodiment, a candidate transmission instance 35 with a single-user format is generated for each user that has pending data. The transmission format is set to the canonical format corresponding to that user's DRC. For users from which NULL DRC have been received, a candidate transmission instance 35 is created only if the user has pending "EF" data. For BE/AF users, NULL DRCs are not served since these users try to maintain low drop rates at the RLP layer.

A candidate transmission instance 35 with a multi-user format is generated for each defined and derived "canonical" multi-user format. A flag may be used to allow derived formats in this stage.

Note, the set of candidate transmission instances 35 generated in step 506 are based on "canonical" formats. That is, short packets are not included in this step. The purpose is to help bias the single carrier scheduler 23 towards higher geometry users and to avoid low geometry users from abusing short packets and thus reducing FL throughput. The short packets are used in a packing efficiency maximization step (as illustrated in FIG. 12) when the selected candidate transmission instance 35 has a payload which fits into a short packet.

Figure 12:
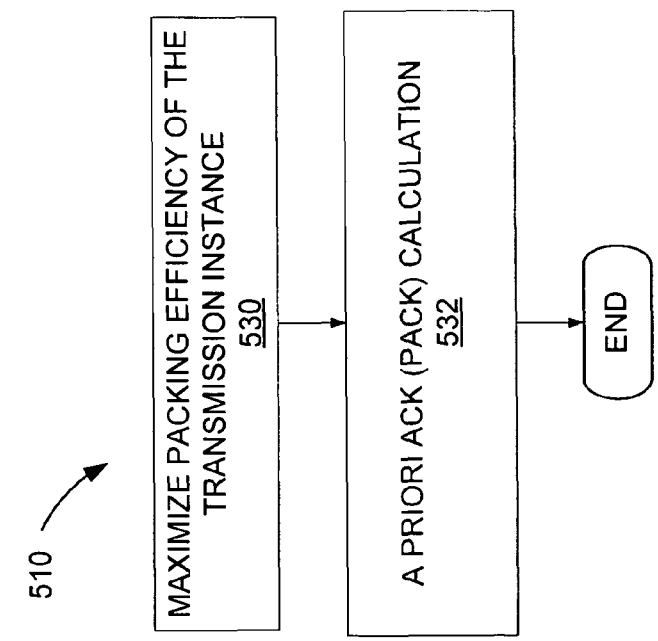
FIG. 12 illustrates a portion of the scheduling algorithm of FIG. 10 according to one embodiment.

A packing efficiency maximization step 530 may be performed consistent with FIG. 12. In this step, the selected candidate transmission instance 35 may go through a change of transmission format according to the following rules.

(1) If the selected candidate transmission instance 35 contains a single user's data, the re-selected format is allowed to be either a single-user format compatible with the user's DRC or a multi-user format.

(2) If the selected candidate transmission format contains two or more user's data, the re-selected format may only be another multi-user format. In either case, the smallest format capable to carry the payload is selected. This post-conversion is further controlled by flags that may avoid conversions to some multi-user formats.

Figure 13:
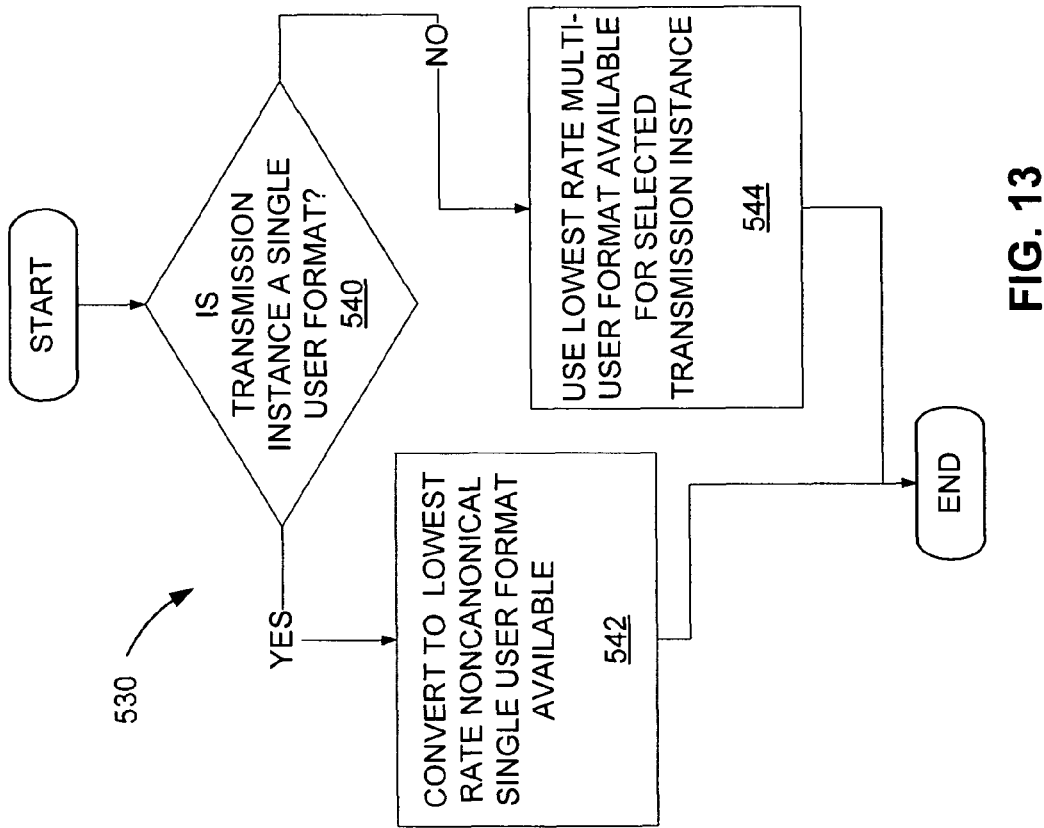
FIG. 13 illustrates a portion of the scheduling algorithm of FIG. 10 according to one embodiment.

In one embodiment, the step 510 of formatting the transmission instance 35 further includes a step 530 where the single carrier scheduler 23 maximizes a packing efficiency of the transmission instance 35, and a step 532 wherein the single carrier scheduler 23 performs an a priori ACK calculation, see FIG. 12. Additionally, step 530 may include the method as illustrated in FIG. 13. The transmission instance 35 is first evaluated to determine if a single user format is used, decision diamond 540. If a single user format is used, convert to the lowest rate noncanonical single user format available 542. Otherwise, use the lowest rate multi-user format available for selected transmission instance 544.

In one embodiment, the single carrier scheduler 23 determines the maximum span corresponding to the DRCs of the users for which the selected transmission instance 35 will be carrying data bits. The single carrier scheduler 23 counts the designated number of transmission slots. If there are any users which have not yet acknowledged correct receipt of the transmitted information, i.e., transmitted an ACK message, and if there is pending data in any of the queues, the AN terminates the transmission.

An alternate embodiment includes specific means and methods for completing the method 500 illustrated in FIG. 10, including, but not limited to, bit stuffing to create each candidate transmission instance 35 and calculation of a packet metric.

Packet metric calculations are performed in step 508, while bit stuffing is part of formatting the transmission instance 35 of step 508. In general, a single-user transmission instance may be stuffed with bits from one or more flows of the same user. A multi-user instance with a "defined" format, such as one defined as in Table 1, may be stuffed with bits from one or more users, wherein such users have transmitted DRCs compatible with the multi-user format. A multi-user instance with a "derived" format may be stuffed with bits from one or more users which transmitted DRCs compatible with the multi-user format and which satisfy the additional requirement of "soft compatibility." A DRC is considered soft compatible to a derived multi-user format if the expected number of slots to decode the corresponding "defined" format is less than or equal to the span of the derived format. The expected number of slots may be obtained by comparing the Signal-to-Interference-and-Noise Ratio (SINR) required for the received DRC to the SINR required to decode the derived format successfully (e.g., under Average White Gaussian Noise (AWGN) conditions). Alternately, the expected number of slots may be determined by comparing the requested rate to the effective data rate of the derived format.

The following description assumes QoS classes including: i) BE/AF; and one class of EF. The method allows extension to multiple EF classes as well. According to the present embodiment, each bit pending in the queue is assigned a bit metric which is given as a polynomial of the form:

$$b_i(z)=[hi2]z^{-2}+[hi]z^{-1}+[lo] \quad (8)$$

wherein i is an index of the bit, and only one of the three coefficients {hi2, hi, lo} is allowed to be non-zero. Note, although the description is given as bit-level, typically all bits in an IP datagram have the same metric and the packet metric calculations may not necessarily involve bit-level accumulations.

Let $\delta$ be the current delay associated with a bit from an EF flow. Set the following definitions for hi2 and hi:

$$hi2=\beta\delta+\mu, \text{ if } \delta>\alpha\text{DelayBound} \quad (9)$$

and $$hi=\beta\delta+\mu, \text{ if } \delta\leq\alpha\text{DelayBound}, \quad (10)$$

wherein $\beta$ is a parameter associated with the EF flow and is inversely related to the delay bound; wherein $\mu$ is a large number; and wherein $\alpha$ is a fixed scalar (e.g., 0.25), and is independent of the EF flow type.
For a BE/AF flow, set lo as follows:

$$lo = \frac{1}{AvgThroughput - TrgtThroughput}, \quad (11)$$

wherein AvgThroughput is the average throughput of the corresponding user and TrgtThroughput is the minimum desired throughput for that user. For a BE user, TrgtThroughput is set to zero. The packet metric (e.g., throughput polynomial) is then obtained as follows:

$$PacketMetric=AccumulatedBitMetric/Ng, \quad (12)$$

wherein Ng is the generic span of the defined or derived candidate transmission instance 35 under consideration and the accumulated bit metric (AccumulatedBitMetric) is the sum of the bit metrics corresponding to all bits included (or stuffed) in the candidate instance. The value Ng may be set to the nominal span of the defined or derived type. Alternatively, it may be set to one, in which case the packet metric will be equal to the accumulated bit metric. In this case, the scheduler will function to maximize payload per transmission instance rather than throughput per transmission instance. This may have the undesirable effect of creating DRC insensitivity, thus causing degraded performance wherein such degradation may not follow the behavior illustrated in FIG. 6. Another approach is to set Ng to a "pseudo-span" which may be set to one for 1 and 2 slot high rate packets, set to two for 4 slot packets, etc., thus distinguishing high rate packets based on payload, while low rate formats are discouraged by setting Ng to larger values.

The following properties provide a bias toward high geometry users to the scheduler:
(1) If a DRC is compatible with a multi-user format, it is also compatible with all multi-user formats of lower nominal data rate; and
(2) The scheduler uses the "throughput" polynomial as a selection device.

One design uses a large value $\mu$ term in the definition of the hi and hi2 coefficients for bit metrics. The bits are stuffed in order according to the value of $\beta\delta$ since $\mu$ is common to all bits. The packet metric is calculated as if the corresponding entry of the bit metric is changed to one, thus resulting in a packet metric proportional to the throughput polynomial. This eliminates the effect of $\beta\delta$ in the packet metric for packet metric calculation.

Note, as described above, the scheduler applies a fixed DelayBound to all users. Typically, users experiencing good coverage require only a fraction of the DelayBound. As the number of users increases, the degradation starts first at the weakest users, whereas users at high geometries may not be strongly effected by the load.

One embodiment adaptively sets the delay bound and related parameters (e.g., a) by measuring the fraction of good EF users. The DelayBound used by the scheduler may be iteratively increased or decreased to maintain the fraction of good users at a desirable level. A simple first-order loop with a lower bound for DelayBound is implemented in one embodiment.

In the scheduler described hereinabove, the method defining the bit metric for BE/AF users uses the following calculation:

$$\text{Bit metric}=1/[\text{AvgThroughput}-\text{TargetThroughput}]. \quad (13)$$

Other bit metric definitions may be implemented for different systems, operational goals, and design.

Transmission Formats and Instances

The FL transmission formats compatible with each DRC index are also listed in Table 1 for two sets of protocol subtypes defined in the 1xEV-DO Rel. 0 and Rev. A specifications, respectively, including proposed changes in recent contributions to Rev-A defining compatible multi-user formats for DRC indices of 0x0, 0x1, and 0x2. A transmission format, as in the Rev. A specification, is represented by the triplet (PacketSize, Span, PreambleLength). "PacketSize" is the number of bits the transmission format carries including CRC and tail. It is the physical layer payload size in bits. "Span" is the nominal (e.g., maximum) number of slots which a transmission instance would take up on the forward link. It is the maximum number of slots that may be transmitted for a packet of that format. The "PreambleLength" is the total number of preamble chips. It is the preamble duration in chips.

As in the 1xEV-DO Rev. A specification, "canonical" transmission formats for each DRC are indicated in bold. Note, the 1xEV-DO Rel. 0 specification defines only single-user transmission formats, whereas certain subtypes in the 1xEV-DO Rev. A specification define both single-user and multi-user formats. In addition, multiple transmission formats may be defined for each DRC index in 1xEV-DO Rev. A. An AT tries to receive packets at each of these formats. The multi-user formats are distinguished by their unique MAC indices, i.e., the preamble for each multi-user format uses a distinct Walsh cover. The single-user formats all use the MAC index assigned to a user.

TABLE 1

Transmission Formats for 1xEV-DO Rel. 0 and Rev. A

| DRC Index | Rate (Kbps) | Rev0 Transmission Format | RevA Single User Transmission Formats | RevA Multi-User Transmission Formats |
|---|---|---|---|---|
| 0x0 | 0.0 | None | (128, 16, 1024), (256, 16, 1024), (512, 16, 1024), (1024, 16, 1024) | (128, 4, 256), (256, 4, 256), (512, 4, 256), (1024, 4, 256) |
| 0x1 | 38.4 | (1024, 16, 1024) | (128, 16, 1024), (256, 16, 1024), | (128, 4, 256), (256, 4, 256), |

TABLE 1-continued

Transmission Formats for 1xEV-DO Rel. 0 and Rev. A

| DRC Index | Rate (Kbps) | Rev0 Transmission Format | RevA Single User Transmission Formats | RevA Multi-User Transmission Formats |
|---|---|---|---|---|
| 0x2 | 76.8 | (1024, 8, 512) | (512, 16, 1024), (1024, 16, 1024) (128, 8, 512), (256, 8, 512), (512, 8, 512), (1024, 8, 512) | (512, 4, 256), (1024, 4, 256) (128, 4, 256), (256, 4, 256), (512, 4, 256), (1024, 4, 256) |
| 0x3 | 153.6 | (1024, 4, 256) | (128, 4, 256), (256, 4, 256), (512, 4, 256), (1024, 4, 256) | (128, 4, 256), (256, 4, 256), (512, 4, 256), (1024, 4, 256) |
| 0x4 | 307.2 | (1024, 2, 128) | (128, 2, 128), (256, 2, 128), (512, 2, 128), (1024, 2, 128) | (128, 4, 256), (256, 4, 256), (512, 4, 256), (1024, 4, 256) |
| 0x5 | 307.2 | (2048, 4, 128) | (512, 4, 128), (1024, 4, 128), (2048, 4, 128) | (128, 4, 256), (256, 4, 256), (512, 4, 256), (1024, 4, 256), (2048, 4, 128) |
| 0x6 | 614.4 | (1024, 1, 64) | (128, 1, 64), (256, 1, 64), (512, 1, 64), (1024, 1, 64) | (128, 4, 256), (256, 4, 256), (512, 4, 256), (1024, 4, 256) |
| 0x7 | 614.4 | (2048, 2, 64) | (512, 2, 64), (1024, 2, 64), (2048, 2, 64) | (128, 4, 256), (256, 4, 256), (512, 4, 256), (1024, 4, 256), (2048, 4, 128) |
| 0x8 | 921.6 | (3072, 2, 64) | (1024, 2, 64), (3072, 2, 64) | (128, 4, 256), (256, 4, 256), (512, 4, 256), (1024, 4, 256), (2048, 4, 128), (3072, 2, 64) |
| 0x9 | 1228.8 | (2048, 1, 64) | (512, 1, 64), (1024, 1, 64), (2048, 1, 64) | (128, 4, 256), (256, 4, 256), (512, 4, 256), (1024, 4, 256), (2048, 4, 128) |
| 0xA | 1228.8 | (4096, 2, 64) | (4096, 2, 64) | (128, 4, 256), (256, 4, 256), (512, 4, 256), (1024, 4, 256), (2048, 4, 128), (3072, 2, 64), (4096, 2, 64) |
| 0xB | 1843.2 | (3072, 1, 64) | (1024, 1, 64), (3072, 1, 64) | (128, 4, 256), (256, 4, 256), (512, 4, 256), (1024, 4, 256), (2048, 4, 128), (3072, 2, 64) |
| 0xC | 2457.6 | (4096, 1, 64) | (4096, 1, 64) | (128, 4, 256), (256, 4, 256), (512, 4, 256), (1024, 4, 256), (2048, 4, 128), (3072, 2, 64), (4096, 2, 64) |
| 0xD | 1536.0 | None | (5120, 2, 64) | (128, 4, 256), (256, 4, 256), (512, 4, 256), (1024, 4, 256), (2048, 4, 128), (3072, 2, 64), (4096, 2, 64), (5120, 2, 64) |
| 0xE | 3072.0 | None | (5120, 1, 64) | (128, 4, 256), (256, 4, 256), (512, 4, 256), (1024, 4, 256), (2048, 4, 128), (3072, 2, 64), (4096, 2, 64), (5120, 2, 64) |

As a reminder, a transmission instance refers to a transmission format with a particular set of bits from one or more queues selected to be transported by it. A candidate transmission instance 35 refers to a transmission instance to be evaluated by a scheduler algorithm for possible transmission. The multi-user transmission formats (1024,4,256), (2048,4,128), (3072,2,64), (4096,2,64), and (5120,2,64) are referred to as the canonical multi-user transmission formats. The multi-user transmission formats (128,4,256), (256,4,256), and (512,4,256) are referred to as "non-canonical multi-user formats." The derived transmission formats are obtained simply by setting the span of the corresponding defined format to smaller values than the nominal value, as if obtained from the defined formats by early termination. In summary, transmission formats and instances may be canonical or non-canonical; single-user or multi-user; and defined or derived. The term "nominal number of slots" will be used to refer to the maximum number of slots for a defined transmission format and the redefined maximum number of slots for a derived transmission format.

The following description of the scheduling means and methods considers an octet-based scheduling, in which the octets pending in various queues may be served in any amount (in units of octets). Typically, each flow will be stored as at least one queue of data. Therefore, each queue has specific QoS requirements associated therewith. The data is stored in each queue in octets. Scheduling may be performed wherein less than a full octet of data is put into a transmission instance or physical layer packet for transmission on the FL.

Note, certain applications may require frame-based scheduling, in which the (encapsulated) datagrams of the flow are to be served without fragmentation within physical layer packets. The octet-based scheduling means and methods may also be extended to frame-based scheduling.

Note also, admission control is closely related to scheduling, wherein admission control serves to admit/reject incoming flows based on the current system load and by predicting whether the incoming flow may be satisfactorily served (e.g., QoS targets met) without causing unacceptable degradation to the already admitted flows.

In a system supporting IS-856, link adaptation is used to determine the FL transmission data rate for each user. Each AT transmits a data request indicating a maximum data rate at which the AT may receive data. The data request is referred to as a DRC message. The DRC message format uses a variety of DRC indices, each specifying a transmission format. The AT sends the DRC message on a DRC channel. For each valid DRC index, except the NULL DRC in IS-856 Rel-0, there is one or more single-user and zero or more multi-user transmission formats which may be served on the FL to carry data to a user. Table 1 details the DRC indices as defined in IS-856. Additionally, Table 1 further includes the compatible transmission formats for each DRC index.

In the 1xEV-DO Rev. A specification, for each DRC index, one of the compatible single-user transmission formats is defined to be the canonical format for that DRC. Note, as used herein, the DRC corresponds to the specific format requested by the AT and identified by the DRC index. Generally, if an AT successfully decodes a packet transmitted using the canonical format corresponding to a given DRC, then such AT would also likely successfully decode a packet transmitted with any of the compatible noncanonical single-user formats or any of the compatible multi-user formats. This is with the exception of DRC indices: 0x0; 0x1; and 0x2. Note, as some multi-user formats compatible with a given DRC may have larger preamble lengths compared to the canonical format, these may not necessarily result in a data processing gain.

For any DRC, excluding all formats compatible with the DRC index 0x0 and the multi-user formats compatible with the DRC indices of 0x1 and 0x2, the payload size of a non-canonical format is typically less than or equal to that of the canonical format. Additionally, the span of a noncanonical format is typically larger than or equal to the span of the canonical format. If a user from which a DRC index of 0x0 (e.g., NULL rate request) has been received is served at any format, there is in general no guarantee of reliable reception of the packet. Also, for DRC indices of 0x1 and 0x2, the compatible multi-user transmission formats may not ensure sufficiently reliable reception, since the payload size and span of these formats do not satisfy this property.

In addition, service to users from which NULL DRC (0x0) is received may be limited to certain conditions. These conditions may be designed into the system.

A useful property of the DRC compatibility rules for multi-user transmission formats is that if a given DRC is compatible with a given multi-user format, then the same DRC is compatible with all multi-user formats of lower data rates.

A transmission instance refers to the combination of a transmission format and the identities of data octets that can be carried by a packet of that format (such as the set of MAC indices of the users to whom the packet is to carry data octets and a set of pointers to the corresponding queues indicating exactly which octets are to be carried in the packet).

The candidate packet generator 25 (discussed below) generates a set of hypothetical transmission instances 35, and then selects one of these instances for transmission on the FL. Thus, one from a number of candidate packets will be selected for transmission. The term used herein to refer to any of these hypothetical transmission instances is a "candidate transmission instance 35."

Scheduler Metrics

The following is a definition of the three types of metrics used by a forward link scheduler (an embodiment of which is illustrated in FIG. 16 below). These metric types are i) Bit stuffing, ii) Bit and iii) Packet. These metric types are used to select queues which are eligible for incorporation into a current transmission instance. To briefly summarize, the bit stuffing metrics determine the order in which octets (or bits) that are pending in various queues are included in a given candidate transmission instance 35.

With packet metrics, once a candidate transmission instance 35 is created, a packet metric is calculated for that candidate 35, which is then used to select a winning transmission instance from a set of similarly created candidate transmission instances 35. That is, the candidate packet generator 25 will select it from a set of similarly created candidate transmission instances 35 as the packet to be presented to the master scheduler 10. The packet metric of a candidate transmission instance 35 is determined by simply summing up the bit metrics of all octets included in the candidate transmission instance 35 and dividing the sum by the span of the transmission format of the candidate transmission instance 35:

$$PacketMetric[k] = \frac{1}{Span[k]} \sum_{i \in P[k]} BitMetric[i], \quad (14)$$

where k represents an index to a particular candidate transmission instance 35 within a set of alternatives, Span[k] represents the span defined for the corresponding transmission format, P[k] represents the set of octets that are included in the candidate transmission instance 35, and BitMetric[i] represents the bit metric of the ith octet included in the candidate instance 35.

Therefore, the packet metric can be interpreted as an estimate of the "instantaneous throughput of the bit metric" if the candidate transmission instance 35 were actually served on the FL.

In general, if the bit stuffing metric of an octet i is larger than that of another octet j (where octets may be from different queues), then the bit metric of the octet i may be set larger than or equal to that of octet j. Similarly, if the bit metric of an octet i is larger than that of another octet j, then the bit stuffing metric of the octet i should be set larger than or equal to that of octet j, i.e.:

BitMetric[i]>BitMetric[j] ⇒ BitStuffingMetric[i]≧BitStuffingMetric[j]

BitStuffingMetric[i]>BitStuffingMetric[j] ⇒ BitMetric[i]≧BitMetric[j]

This general method ensures that an octet mat is stuffed into a candidate transmission instance 35 contributes to the packet metric at least by the same amount as another octet that is stuffed later.

General Structure of Metrics

All three types of metrics described in the previous section can be represented in polynominal form as follows:

$$Metric=[MC0]+[MC1]x+[MC2]x^2+[MC3]x^3+[MC4]x^4+[MC5]x^5+[MC6]x^6+[MC7]x^7, \quad (15)$$

where Metric can be any of the three metric types and MC0, . . . , MC7 represent metric coefficients as will be described shortly.

The operations of the addition of two metrics and multiplication (or division) of a metric by a scalar are defined as in usual polynomial algebra: when two metrics are summed, the corresponding coefficients of the two polynomials are summed. When a metric is multiplied (or divided) by a scalar, each of the coefficients are multiplied (or divided) by the same scalar. This enables calculating the packet metrics using bit metrics via Eq. (13).

The comparison operators ">, >=, ==, <=, <" are defined in the lexical sense, e.g., when two metrics are compared, first the coefficients of the highest degree terms are compared. If equal, then the coefficients of the next highest degree terms are compared, etc. Two metrics are equal, if all of the corresponding coefficients of the two polynomial representations are equal. The comparison operations are used for comparing bit stuffing metrics as well as for comparing packet metrics.

Bit Metrics and Bit Stuffing Metrics

In this section, the meaning, usage, and implementation of the bit metrics and bit stuffing metrics will be discussed. For bit metrics and bit stuffing metrics, only one term of the corresponding polynomial representations are allowed to be nonzero at any given time. The degree of the nonzero term is the same for the bit metric and the bit stuffing metric for a given octet. The degree of this nonzero term, which will usually be referred to by the corresponding coefficient's name and MC0, . . . , MC7 will be called the Priority State of the bit (stuffing) metric (or the corresponding octet). The definition of the comparison operation implies that the MC0 term corresponds to the lowest priority octets, and the MC7 term corresponds to the highest priority octets.

The priority state of a bit (stuffing) metric for an octet i is determined by the current delay incurred by the octet given as:

$$CurrentDelay[i] = CurrentTime - TimeStamp[i] \quad (16)$$

and by using an ordered set of thresholds known as the Priority Thresholds defined for the flow to which the octet belongs. In Eq. (16), the TimeStamp[i] is an appropriately defined timestamp for octet i. Each interval defined by the priority thresholds is mapped to a priority state. The priority thresholds and the mapping of the thus defined intervals to priority states can be specified to the candidate packet generator 25 for each flow separately. The CurrentDelay[i] of the octet is compared to these ordered sets of thresholds to determine the interval into which it falls. This, in turn, defines the priority state of the bit (stuffing) metric.

The above operation defines M priority thresholds and M+1 priority states for each flow. The value of M is set to 2 in a software embodiment. Therefore, for each flow, two priority thresholds and three priority states are defined. These thresholds and states may typically remain unchanged during the lifetime of the flow (although they can be changed on the fly via an appropriate DSP-Driver command).

For throughput sensitive traffic flows the bit metric is set to:

$$TS_{BM} = \frac{GoSFactor \cdot Thrghpt2DelayConvFactorBM}{\max(\varepsilon, AvgThroughput - TargetThroughput)} \quad (17)$$

and bit stuffing metric is set to:

$$TS_{BSM} = \frac{GoSFactor \cdot Thrghpt2DelayConvFactorBSM}{\max(\varepsilon, AvgThroughput - TargetThroughput)} \quad (18)$$

where the GoSFactor is a per-flow based defined parameter used to provide various levels of grade of service across flows.

The AvgThroughput is the filtered (averaged) total throughput of the flow, including the FTx, RTx, and DARQ queues of the flow. A first-order IIR filter with a time constant, such as 600 slots (1 sec) is used for averaging. The TargetThroughput is a per-flow-based defined parameter. The Thrghpt2DelayConvFactorBM is a per-flow-based defined parameter. The Thrghpt2DelayConvFactorBSM is a per-flow-based defined parameter. The $\varepsilon$ represents a very small positive number.

For throughput sensitive traffic flows, the bit metric is calculated as described next.

For the bit stuffing metric of delay sensitive flows, the polynomial coefficient for the priority state is set as follows:

$$DS_{BSM} = AccelerationFactor * CurrentDelay + AccelerationOffset \quad (19)$$

where the AccelerationFactor is a per-flow defined parameter. Its main purpose is to normalize the DelayBound which may be different for different flows. As an example, consider two different online games. Due to the different characteristics of the two applications, they may have different DelayBound settings specified to the scheduler, however, this does not mean that one game has higher priority than the other. It may be desirable that the single carrier scheduler 23 treats both applications with equal priority. Assume that the first game has 300 ms of delay bound and the second game has 150 ms of delay bound. Then, at any time there will not be any octets belonging to the second game that are older than 150 ms (since the scheduler discards them). However, there may be octets belonging to the first game that may be older than 150 ms. Without the AccelerationFactor, this would result in the octets of the first game gaining priority over octets of the second game. By setting the AccelerationFactor of each application inversely proportional to the respective DelayBound settings, one can normalize this undesired affect.

The AccelerationOffset is a per-flow-based defined parameter. Its value may be set to an integer multiple of the largest value that the first term on the right-hand side of Eq. (7) is allowed to take on (this largest value is independent of the flows and is determined by the software implementation). It may provide a means for soft prioritization of flows. As an example, among two flows, one with an AccelerationOffset of zero and the other with a positive AccelerationOffset, the latter flow's octets will be included in any candidate transmission instance 35 before any octets of the former flow (assuming both flows are DRC compatible with the transmission format of the given candidate instance 35).

The concept of soft prioritization above is in contrast to strict prioritization, which may be accomplished by setting the priority states of the two flows' bit stuffing metrics differently. For the bit metric, the polynomial coefficient for the priority state is set to a constant value as follows:

$$DS_{BSM} = DSBitMetricValue \quad (20)$$

where the DSBitMetricValue is a per-flow defined parameter. Its purpose is twofold: First and most importantly, it can be used for soft prioritization. Second, if two applications that are considered of equal priority have different average incoming throughput (from Internet to the queue), the DSBitMetricValue for each flow can be set inversely related to the flow's typical throughput, to avoid the application with the higher throughput gaining priority merely by having more data to efficiently fill FL packets.

Each traffic flow is classified into throughput sensitive class or delay sensitive class based on FlowClass parameter. Then bit metric MCX (where X is an element of $\{0, \ldots, 7\}$) is defined as follows:

$$MCX = \begin{cases} TS_{BM}, & \text{if } FlowClass = ThrputSensitive \\ DS_{BM}, & \text{if } FlowClass = DelaySensitive \end{cases}$$

Similarly, bit stuffing metric is defined as:

$$MCX = \begin{cases} TS_{BSM}, & \text{if } FlowClass = ThrputSensitive \\ DS_{BSM}, & \text{if } FlowClass = DelaySensitive \end{cases}$$

In the ongoing software embodiment, the bit stuffing metrics are represented by 16 bit quantities that may be denoted as [B15 ... B0]. The three most significant bits determine the priority state (e.g., "000" maps to MC0 and "111" maps to MC7). The remaining 13 least significant bits hold the coefficient value itself. With this representation, comparison operations between bit stuffing metrics can be directly performed between these 16 bit quantities.

The bit metrics are not explicitly represented in the software implementation. The reason is that all needed information can be derived from the bit stuffing metric. The priority state of a bit metric is the same as that of the bit stuffing metric.

Packet Metrics

The packet metric of a candidate transmission instance 35 is calculated by using Eq. (1). Note that even though only one term of the bit metric of an octet can be nonzero, in general, all coefficients of the resulting packet metric may be nonzero.

Implementation Simplifications

The foregoing discussion of bit (stuffing) metrics considered the general case where each octet in each queue is assigned an individual bit (stuffing) metric, which is recalculated every slot. Alternate embodiments reduce the complexity of such calculations. Assuming that the queues are ordered by timestamp by virtue of other mechanisms, it makes sense to calculate one bit (stuffing) metric per flow based on the oldest timestamp among the head-of-the-queue octets of all queues of the flow. This bit (stuffing) metric may then be used for currently pending octets of the flow. This simplification assumes the bit (stuffing) metric to be a monotonically increasing function of the CurrentDelay of an octet. Otherwise, there is a risk that the head-of-the-queue octet may prevent consecutive octets from being served. With this simplification, the bit stuffing metric may also be referred to as a flow metric.

In addition, any head-of-the-queue octet that may be pending in the RTx queue of a flow is likely to be older than any head-of-the-queue octets that may be pending in the FTx and DARQ queues. Similarly, any head-of-the-queue octet that may be pending in the DARQ queue is likely to be older than the head-of-the-queue octet of the FTx queue. For this reason, rather than finding the oldest timestamp among these three queues, it is possible to use a fixed order of RTx, DARQ, and then FTx queues to find the first nonempty queue for determining the timestamp to be used in bit (stuffing) metric computation for the flow. The queues of the flow should also be served in the order of RTx, DARQ, and then FTx.

Single Carrier Scheduler

The single carrier scheduler 23 is executed whenever the FL is available for a new transmission. However, some implementation issues may cause some of the computations to be performed at every slot, including nonavailable slots. The reason for this is that by the time the AN determines that the FL is available for a new transmission, there is usually not much time left to carry out all the calculations involved in the single carrier scheduler 23 to determine a transmission instance 35.

Figure 15:
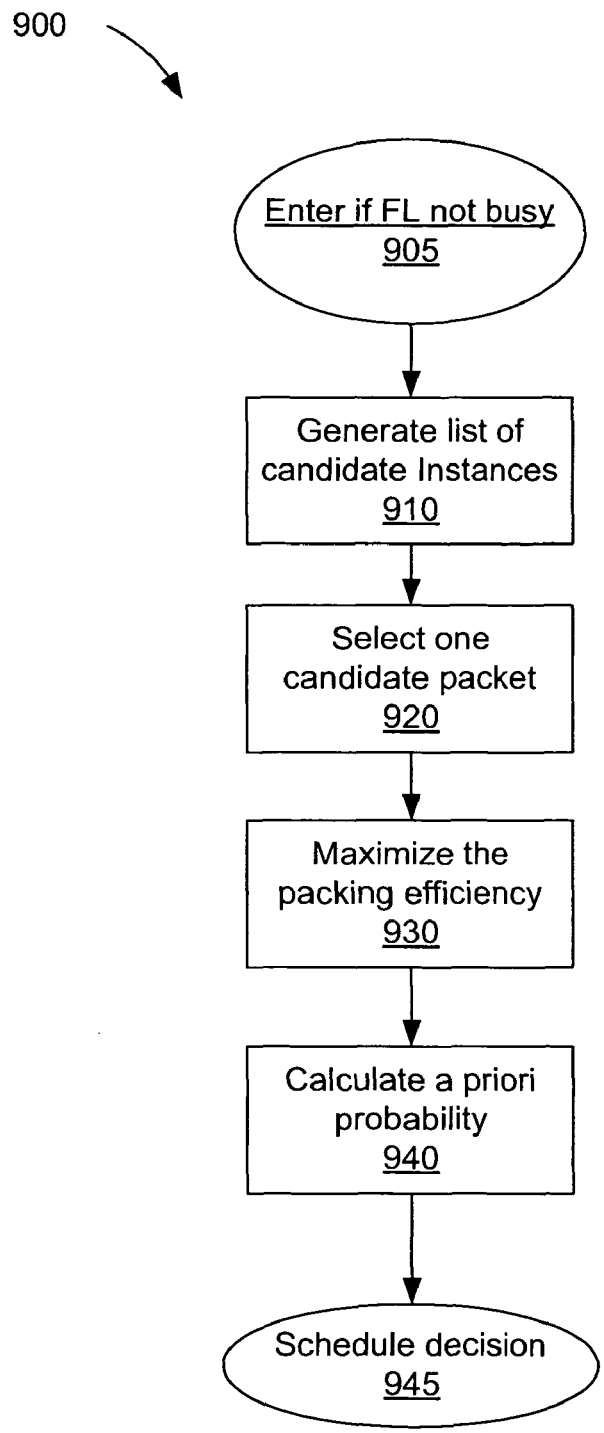
FIG. 15 illustrates a flowchart of a process executed by a single carrier scheduler.
Figure 16A:
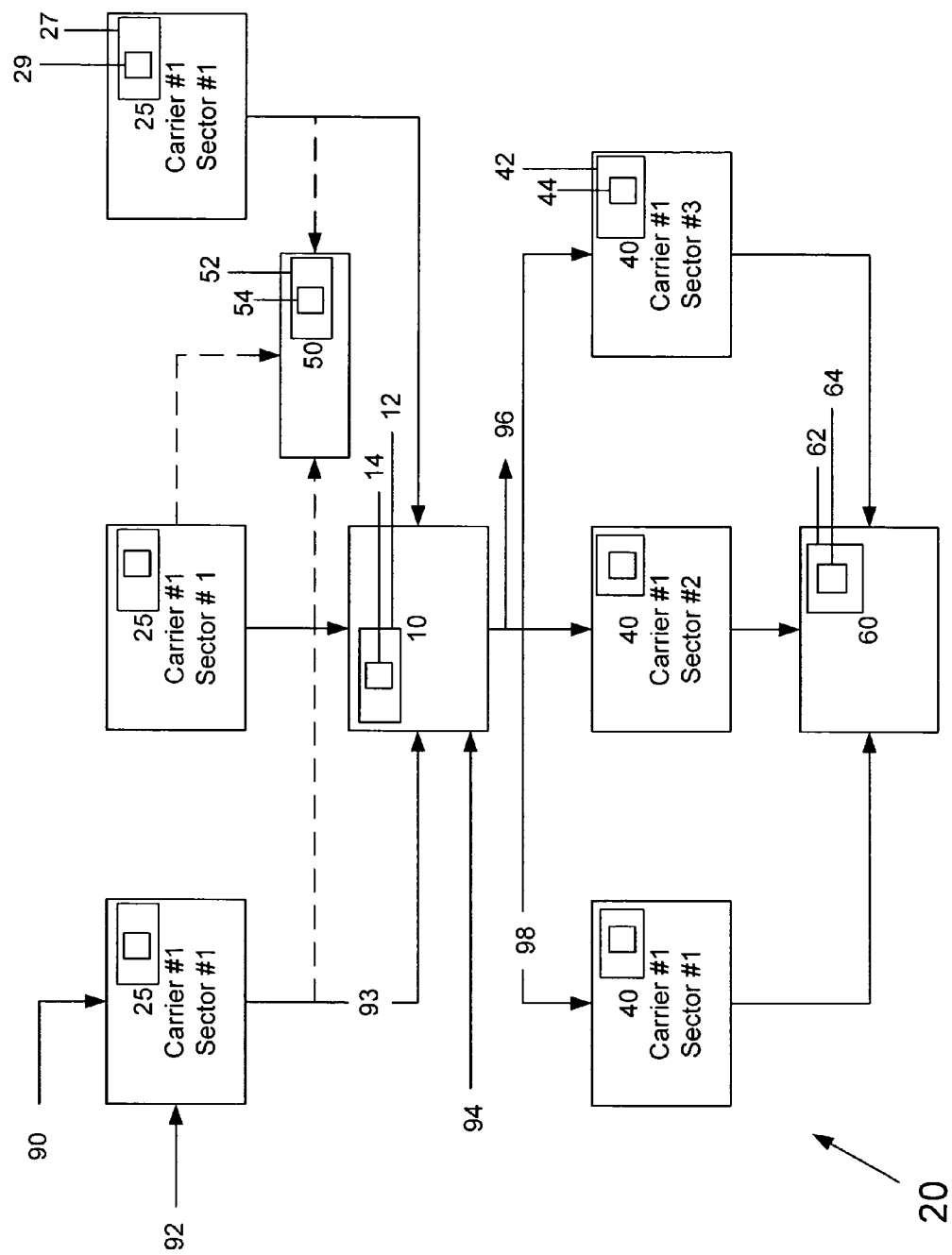
FIG. 16A illustrates an embodiment of a forward link scheduler.

The following steps shown in flowchart 900 of FIG. 15 may be executed by the single carrier scheduler 23, which may reside in the candidate packet generator 25 (e.g., in the form of software instructions 29 stored in memory 27) as shown in FIG. 16A which illustrates a logic block diagram of a forward link scheduler 20. Step 910 generates a set of candidate packet transmission instances. Step 920 selects one candidate packet among the set. Step 930 maximizes the packing efficiency. Step 940 calculate a priori probability (e.g., calculating a priori probability of an AT having successfully decoded a packet 920). Each of the above steps will be discussed in the following four sections respectively.

Generating a Set of Candidate Packet Transmission Instances (910)

The first step taken by the candidate packet generator 25 when executing the single carrier scheduler method is to generate a list of candidate packet transmission instances (35) 910 (also shown as step 504 in FIGS. 10 and 11). More specifically, the following candidate transmission instances 35 are generated: A candidate single-user transmission instance 35 with a single-user format is generated for each user (that is not currently prohibited from service by the protocol subtype for any reason, such as a continuation issue) that has pending data. Furthermore, the received DRC from the user is non-NULL; otherwise, the user has negotiated a MAC layer protocol that allows one or more transmission formats to be served upon a NULL DRC. If a candidate packet transmission instance 35 is created for a user from which a NULL DRC has been received, the candidate transmission instance 35 carries data belonging to a flow with a finite DelayBound and from the FTx queue of the flow. The transmission format of the candidate transmission instance 35 is the canonical format corresponding to the user's DRC as detailed in Table 1.

In one embodiment, a multi-user candidate transmission instance 35 may be generated for each of the five multi-user transmission formats: (1024,4,256), (2048,4,128), (3072,2,64), (4096,2,64), and (5120,2,64). Only those users that requested 153.6 Kbps or higher are served in multi-user formats. In addition, the DRC of a user is compatible with the format of the candidate packet transmission instance 35. Furthermore, a multi-user candidate transmission instance 35 satisfies one or both of the following conditions; otherwise it is discarded from further consideration; it carries the data of two or more users, or at least one user's data whose DRC was erased. A candidate packet transmission instance 35 in any of the above two groups is generated by stuffing bits from one or more flows, wherein:

1) Single-user formats are stuffed with bits from the same user's flows.
2) Multi-user formats are stuffed with bits from the flows of users with compatible DRCs.

The bit stuffing is performed in the descending order of bit stuffing metrics. As mentioned above, because of computational requirements only one bit stuffing metric per flow is computed, which is then used for all currently pending octets in all queues of the flow. In this case, the bit stuffing metric helps to determine which flows will be served first, however, it may not determine how the octets of a given flow is served. The assumption is that the octets pending in a flow's queues (especially, the first-time transmitted (FTx) queue, but not necessarily the RTx/DARQ queues) appear in the order of timestamp, and the octets of a flow are served in the order they appear in the queues.

As mentioned earlier, each flow may have multiple queues, one queue for first-time transmitted data (FTx), and other queues for retransmissions (RTx queue for RLP retransmissions and/or a DARQ queue for MAC layer retransmissions). If a flow has nonempty retransmission (RTx) and/or DARQ queues, the bit stuffing metric for the flow may be calculated based on the oldest of the head-of-the-queue timestamps among any of the nonempty FTx/RTx/DARQ queues. Only one bit stuffing metric is calculated for all queues of a flow. Bit stuffing from a given flow may also be performed based on the ascending order of head-of-the-queue timestamps among the FTx/RTx/DARQ queues.

The above described timestamp-based ordering of the queues of a flow may be approximated as a fixed order of RTx/DARQ/FTx queues.

In generating candidate packet transmission instances 35, noncanonical single-user formats and short multi-user formats that carry less than 1024 bits are not considered. These formats will be considered in the packing efficiency maximization step 930 of the scheduler 23. Some of the reasons they are not considered are as follows: i) reduction of complexity, ii) to pack as much data as possible per packet, iii) to avoid users with weak channel conditions, and iv) a lot of data to gain relative priority by filling short packets efficiently.

Another reason for not considering noncanonical and short packets in this stage involves avoiding certain quantization effects that may arise in frame-based scheduling.

In creating multi-user candidate transmission instances 35, it is possible to take further precautions to alleviate potentially adverse effects of the continuation problem. One such method is to avoid serving a multi-user packet on the same interlace with a previously started and ended multi-user packet for a certain number of slots (counted on the given interlace) following the start of the first multi-user packet. This number of slots can be set to the minimum of the spans of the two multi-user packets or possibly to the span of the first multi-user packet. This approach helps enable users to quickly become eligible to be served in a new multi-user packet, thus avoiding long runs of ineligibility.

Select One Candidate Packet Among the Set (920)

After the list of single-user and multi-user candidate packet transmission instances 35 is created as described above, the next step is to select one of these candidate packets 35 (assuming the above generated list contains at least one candidate transmission instance 35) step 910 (also shown as step 508 in FIG. 10). This is done by computing the packet metric for each of the candidates 35 in the list, and selecting the candidate packet 35 with the largest packet metric as the winning candidate 35. If ties occur, it is desirable to prefer single-user formats over multi-user formats. Also, it is desirable to pick higher-rate multi-user formats over lower-rate multi-user formats.

Maximize the Packing Efficiency (930)

In this step, the transmission format of the winning candidate transmission instance 35 is reconsidered (and possibly changed) to maximize its packing efficiency (thus providing ARQ gains) without changing the set of data octets selected to be carried by it, step 930 (also shown as step 510 in FIG. 10). Completion of this step may provide ARQ gains.

If the winning candidate transmission instance 35 is of a single-user format, then the format may be converted to the lowest rate noncanonical single-user format compatible with the served user's DRC that can carry the selected data octets. (Also shown as step 542 in FIG. 13). It is also possible to change the format of a single-user transmission instance 35 to a multi-user format. If the winning candidate transmission instance in the selection step of the scheduler is of multi-user format, then convert the (1024,4,256) format to any of these three formats ({128,256,512},4,256) (the lowest rate format that can carry the selected data octets is used). It is noted that the adaptive rate control mechanism inside the AT may be adapted to support single user packets.

Calculate A Priori Probability (940)

In this step (also shown as step 532 in FIG. 12), the single carrier scheduler 23 may determine a maximum number of slots (less than the nominal span of the selected transmission instance 35) beyond which it will not transmit the transmission instance 35 even though it may not detect ACKs from all users served in the transmission instance 35. This step is optional. It may be turned off so that the AN terminates the packet transmission after detecting an ACK from all users served in the packet, or after transmitting the full span of the packet. One method of implementing this step is to set the maximum number of slots of the transmission instance to:

$$\text{MaximumSpan} = \min(\text{Scheduled}Tx\text{FormatSpan}, \max\nolimits_{ieServedUsers}(DRC\text{Span}[i])) \quad (21)$$

where the ScheduledTxFormatSpan is the span of the scheduled transmission format, and the DRCSpan[i] is the span of the canonical transmission format corresponding to the decoded DRC from the ith served user in the packet.

Several of the parameters utilized by the scheduler have been discussed hereinabove. Here is presented the parameters provided to the scheduler at the DSP-Driver interface. Global parameters refer to those parameters which apply to all flows, and Flow parameters refers to those parameters specified for each flow separately:

1. Global Parameters:
   a. FlowTPutFilterTimeConst—defines the time constant of the first-order IIR filter used to generate the average throughput, AvgThroughput, variable that is kept for each flow. The filter is iterated once every slot. The input to the filter is the number of octets served from queues of the given flow in a packet that starts in that slot. The filter is updated with zero input in slots in which no new packet transmission starts.
   b. Thrghpt2 DelayConvFactorBM—Conversion factor for throughput sensitive metric to delay sensitive metric for bit metric calculation.
   c. Thrghpt2 DelayConvFactorBSM—Conversion factor for throughput sensitive metric to delay sensitive metric for bit stuffing metric calculation.
   d. FlowClass—Describes if the flow is throughput sensitive type or delay sensitive type.
   e. FlowEligibleForDRCErasureMapping—to be used by DRC erasure mapping method.
   f. ErasureMapDelayThreshold—to be used by DRC erasure mapping method.
2. Flow Parameters
   a. UserId, FlowId—provide a means for indexing and determining the owner of each flow.
   b. QoSMetricState, PriorityThold[2]—these describe the priority state of the bit (stuffing) metric as a function of the current delay. The elements of the PriorityThold[ ] array are structures that contain the variables DelayThold and QoSMetricState. When CurrentDelay of a flow is less than PriorityThold[0].DelayThold, the priority state is set to QoSMetricState. If CurrentDelay is greater than PriorityThold[0].DelayThold, but less than PriorityThold[1].DelayThold, then the priority state is set to PriorityThold[0].QoSMetricState. If the CurrentDelay is larger than PriorityThold[1].DelayThold, then the priority state is set to PriorityThold[1].QoSMetricState. The QoSMetricState variables take on values {0, . . . , 7} corresponding to the priority states of {MC0, . . . , MC7} respectively.
   c. AccelerationFactor
   d. AccelerationOffset
   e. DelayBound—0 represents infinity (e.g., do not discard an octet before serving it): otherwise, it represents the amount of delay, relative to the timestamp of a given octet, after which the octet is discarded from a queue.
   f. TargetThroughput—A parameter used in the bit (stuffing) metric of throughput sensitive flows.
   g. FlowAggregateIndex—flows with FlowAggregateIndex set to 0 are not aggregated by the scheduler. Otherwise, flows with the same (nonzero) value of the FlowAggregateIndex are aggregated at the scheduler. The scope of the FlowAggregateIndex is limited to a user, e.g., the same index may be reused for flows of another user without confusion.
   h. IntraFlowPriority—contributing flows in an aggregated flow (by the scheduler) are served in the order of IntraFlowPriority. Among the contributing flows with the same IntraFlowPriority, the order is determined by the timestamp of the contributing flow.
   i. GoSFactor—used to provide levels of grade of service among flows.

j. DSBitMetricValue—value of the bit metric coefficient in priority states in MCX.

Note, in the DSP-Driver interface, flows may not be specified as BE, AF, EF, or by any other high-level descriptor. Rather, the DSP-Driver interface uses a uniform and low-level description for all flows. At higher level, such as at the BSC, specific high-level descriptors of flows, such as QoS requirements and BE/EF/AF categorizations, are to be mapped to the basic parameters defined in the DSP-Driver interface for each flow. Such mapping tables are generated for conceivable flow types by sufficient simulation and testing.

The following are examples illustrating the use of various parameters. For BE flows, the following parameters may be used:
  a. QoSMetricState=0 (MC0)
  b. PriorityThold[ ].QoSMetricState={any, any}
  c. PriorityThold[ ].DelayThold={0, 0} (Infinite)
  d. DelayBound=0 (Infinite)
  e. TargetThroughput=0
  f. FlowAggregateIndex=1 (aggregate all BE flows of a user).
  g. Thrghpt2DelayConvFactorBM=16
  h. Thrghpt2DelayConvFactorBSM=128
  i. FlowClass=ThrputSensitive
  j. FlowEligibleForDRCErasureMapping=0
  k. ErasureMapDelayThreshold=0 {infinite}

For AF flows, the following parameters may be used:
  a. QoSMetricState=0 (MC0)
  b. PriorityThold[ ].QOSMetricState={any, any}
  c. PriorityThold[ ].DelayThold={0, 0} (Infinite)
  d. DelayBound=0 (Infinite)
  e. TargetThroughput=A positive value
  f. FlowAggregateIndex=0 (no aggregation)
  g. Thrghpt2 DelayConvFactorBM=16
  h. Thrghpt2 DelayConvFactorBSM=128
  i. FlowClass=ThrputSensitive
  j. FlowEligibleForDRCErasureMapping=0
  k. ErasureMapDelayThreshold=0 {infinite}

For EF Flows, the following parameters may be used:
  a. QoSMetricState=0 (MC0)
  b. PriorityThold[ ].QOSMetricState={2, 3}
  c. PriorityThold[ ].DelayThold={0.25*DelayBound, 0.5*DelayBound}
  d. DelayBound=Application dependent
  e. TargetThroughput=0
  f. FlowAggregateIndex=0 (no aggregation)
  g. Thrghpt2DelayConvFactorBM=1
  h. Thrghpt2DelayConvFactorBSM=1
  i. FlowClass=DelaySensitive
  j. FlowEligibleForDRCErasureMapping=1
  k. ErasureMapDelayThreshold=0.25*DelayBound A Signaling Flow is provided as follows:
  a. QoSMetricState=7 (MC7, highest priority)
  b. PriorityThold[ ].QOSMetricState={7, 7}
  c. PriorityThold[ ].DelayThold={0, 0} (Infinite)
  d. DelayBound=0 (Infinite)
  e. TargetThroughput=0
  f. AggregateIndex=0 (no aggregation)
  g. Thrghpt2 DelayConvFactorBM=1
  h. Thrghpt2 DelayConvFactorBSM=1
  i. FlowClass=DelaySensitive
  j. FlowEligibleForDRCErasureMapping=1
  k. ErasureMapDelayThreshold=0.25*DelayBound The BE/AF flows may be prioritized by using an appropriate combination of the following parameters:
  1. MC0, . . . , MC7 states allow strict prioritization.
  2. GoSFactor for soft prioritization.
  3. TargetThroughput typically, for AF flows that require some minimum throughput.

The EF flows may be further prioritized by using an appropriate combination of the following parameters:
  1. MC0, . . . , MC7 states allow strict prioritization.
  2. AccelerationOffset provides prioritization during bit stuffing among octets of the same priority state, but does not directly affect the final packet selection (since this latter step uses bit metrics to calculate the packet metric, which does not depend on the AccelerationOffset). When two flows belonging to the same user or two different users are competing to be included in the same candidate transmission instance, the flow with the larger AccelerationOffset receives priority.
  3. DSBitMetricValue affects the bit metrics so it has a direct effect on the packet metric. This parameter may also be used for soft prioritization. Currently, this parameter is not implemented.

The DSP-Driver interface provides a flexible method of aggregating flows at the scheduler. Note, the aggregations performed by the scheduler are different from the aggregations that may be done by the BSC. When the BSC aggregates a set of flows, this aggregate appears as a single flow to the scheduler, and the scheduler receives a single set of parameters for the flow. The scheduler cannot tell the contributing flows apart. When aggregation is done at the scheduler, the scheduler will naturally know the contributing flows.

The AvgThroughput variable includes the total throughput of the aggregate. Certain parameters, such as the DelayBound, specified for contributing flows of an aggregate are set to the same value on the DSP-Driver interface. The list of variables to be set equal for all contributing flows are:
  a. UserID
  b. AggregateIndex
  c. QoSMetricState
  d. PriorityThold[2]
  e. AccelerationFactor
  f. AccelerationOffset
  g. DelayBound
  h. TargetThroughput
  i. GoSFactor
  j. DSBitMetricValue A parameters which may be set differently is IntraFlowPriority and a parameter which is to be set differently is FlowID.

In an embodiment, an aggregated flow is assigned a single bit (stuffing) metric. This metric is based on the oldest timestamp among contributing flows of an aggregated flow. The timestamp of a contributing flow is calculated based on the head-of-the-queue timestamps of its FTx/RTx/DARQ queues. When a flow is selected for bit stuffing, however, the order in which contributing flows are served is determined primarily by the IntraFlowPriority parameters assigned to each of the contributing flows, and secondarily by the timestamps of the contributing flows. By setting the IntraFlowPriority parameters to the same value, the selection order of contributing flows may be made strictly based on their timestamps. The IntraFlowPriority parameter is mostly intended for BE flows.

As discussed hereinabove, each flow has an FTx queue, and may have RTx and/or DARQ queues. In the software implementation, a single bit stuffing metric is calculated for each flow. This metric applies to octets in the FTx queue, as well as octets in the RTx and DARQ queues. If a flow is selected to be served, individual queues are also served in the order determined.

One software embodiment provides the ability to increase the priority of a flow if the RTx and/or DARQ queues are nonempty. This is accomplished by simply modifying the MetricTS value given in Eq. (21) as:

$$Metric_{TS} = \frac{GoSFactor * RetransmissionPriorityFactor}{\max(\varepsilon, AvgThroughput - TargetThroughput)} \quad (22)$$

The factor RetransmissionPriorityFactor takes on the value of 1 if both the RTx and DARQ queues are empty. It takes on another value if the RTx queue is empty but the DARQ queue contains data. And, yet another value if the RTx queue is nonempty.

In the 1xEV-DO Rev. A specification, certain protocol subtypes define the NULL DRC to be compatible with a set of single-user and multi-user transmission formats. Also, in the 1xEV-DO Rel.0 specification, configuration attributes are defined for certain protocol subtypes that enable the AN to serve a user from which a NULL DRC is received with a (1024,16,1024) single-user transmission format.

In either case, the scheduler may create a candidate transmission instance containing data for a user from which a NULL DRC is received. This is referred to as NULL-to-Rate conversion. The scheduler imposes the following conditions on NULL-to-Rate conversions:

a. Serves flows with finite DelayBound
 b. RTx/DARQ queues may not be served

Other than these conditions, the scheduler does not distinguish whether the received DRC from the user was 0x0, (i.e., NULL DRC), or 0x1, (i.e., 38.4 Kbps), both of which are defined to be compatible with the same transmission formats in certain protocol subtypes in the 1xEV-DO Rev. A specification. Again, reference is made to Table 1 for specific protocol subtype definitions.

When a NULL DRC is received from a user, there is no guarantee that the served packet will be successfully decoded by the user. An improvement involves monitoring if users having sent a NULL DRC and which were then served in a packet are successfully decoded. Depending on the success statistics, the conversion may be turned on/off for the flow. One embodiment ranks the candidate transmission instances 35 created for users that sent a NULL DRC lower than the candidate transmission instances 35 created for users that sent DRC of 0x1.

Certain approximations may be made in a software implementation to facilitate the creation of the candidate multi-user instances that contain data for throughput sensitive flows.

With respect to scheduler timing, the timeline within a slot is divided into two parts; the first part is the noncritical segment, and the latter part is the critical segment. The DRC values of the users become available during the critical segment. However, the critical segment may not provide enough processor cycles to carry out computations involved in the scheduler under worst-case loading. Therefore, some of these calculations are to be delegated to the noncritical segment. Since the DRC values of some users may not be known during the noncritical segment, the software implementation uses the DRC values of the previous slot to build candidate transmission instances 35 and to select the winning candidate. It is possible the DRC values of some users may change, and the winning candidate may become invalid during the critical segment. To overcome this problem, more than one strong candidate is selected during the noncritical segment. When the actual DRC values are received in the critical segment, this reduced set of candidates are reevaluated. The reduced set of candidate instances may contain:

a. A small number of (e.g., five) single-user candidates.
 b. One multi-user candidate (if any created) with a few spare users that may be served in that candidate if some of the users served in the candidate become incompatible.

In the 1xEV-DO Rel. 0 specification, an AN does not schedule packets to an AT when DRC information is erased. When an AN is serving multiple ATs with non-delay-sensitive applications, e.g., BE traffic, relatively large DRC erasure rates may be tolerated (e.g., when due to multi-user diversity) without loss of system capacity. When the DRC erasure rate is excessively high, the DRC lock bit would be set to zero by the AN, and then the AT may choose to hand off to another sector or switch to fixed rate mode. However, the DRC lock bit generation method has a built-in delay, which is at least partially due to filtering, to prevent unnecessary handoffs. Thus, relatively long run lengths of DRC erasures may still occur on the reverse link. For delay-sensitive applications, e.g., EF traffic, these erasures may result in unacceptable amounts of service outage. A DRC erasure mapping method seeks to minimize service outages on the FL.

Figure 14:
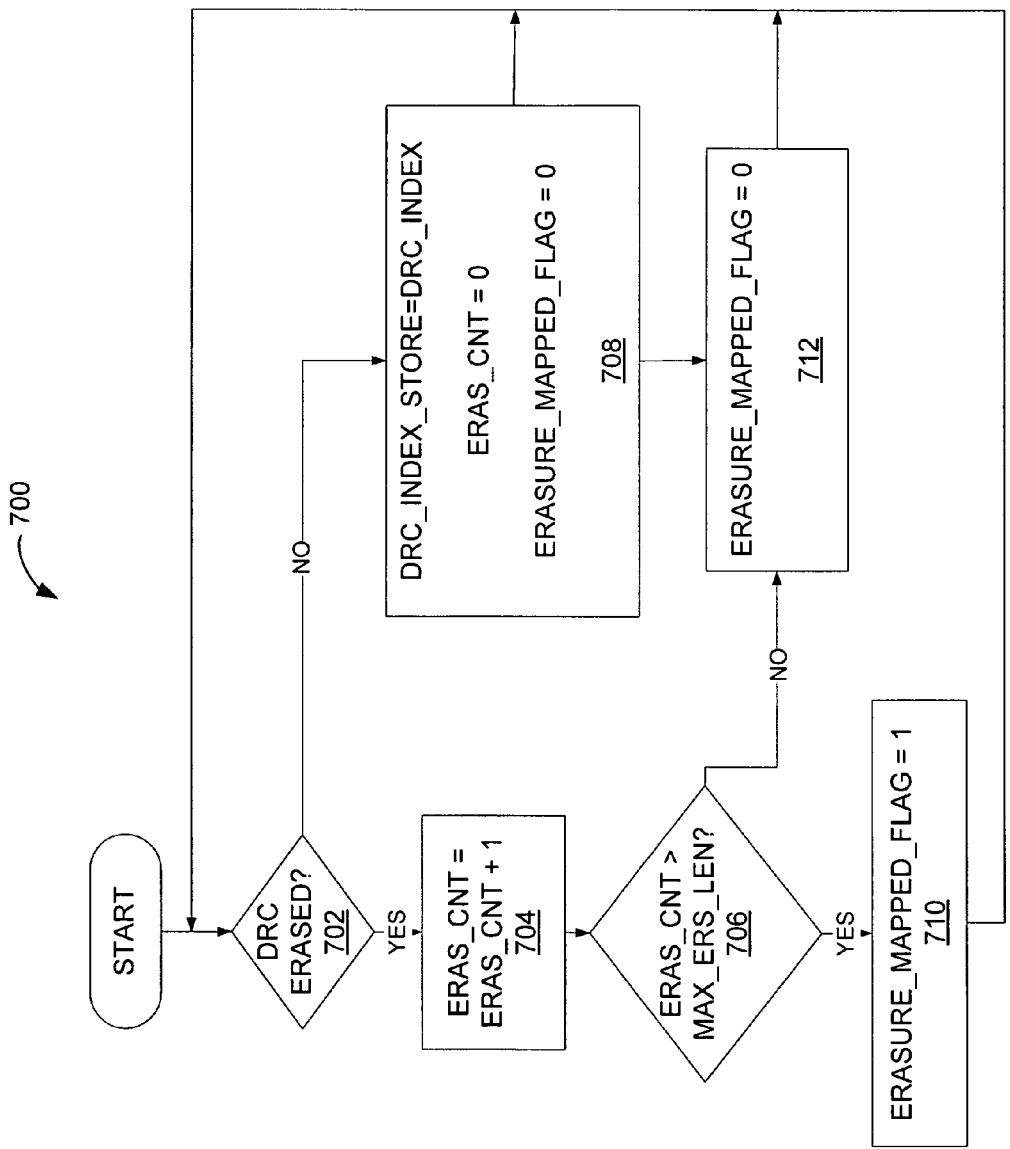
FIG. 14 is a flowchart of a Data Rate Control (DRC) erasure mapping method.

The baseline method is described in two steps. The first step explains the decision on DRC erasure mapping. The second step describes the modifications to the FL scheduler of 1xEV-DO Rev. A. FIG. 14 illustrates an embodiment of a DRC erasure mapping method, which may be run by the AN at every time-slot interval for each AT in variable rate mode. For each AT, the method is run at each sector of a cell which has an active queue, which is set up by the BSC, for that user. For simplicity the method is described to run at each slot interval, but parameters may be updated only at every DRC_Length interval.

The main output of the method is the Erasure_Mapped_flag, which indicates to the scheduler that the DRC erasure mapping is performed and limited FL scheduling may be performed for the AT.

The DRC_index_store is used for storing the latest valid, e.g., successfully decoded DRC index. Eras_Count is used for computing the run length of DRC erasures. DRC erasure mapping is performed only if erasure run length is greater than Max_Ers_Len. This threshold ensures the DRC erasure mapping is performed only when service outage probability is relatively high. Packets, however, may be scheduled to an AT when the corresponding FL packet delay is high. Thus, Max_Ers_Len may not be too high. For EF flows (e.g., VoIP) reasonable settings for Max_Ers_Len may be in the range of 0 to 16 slots.

As illustrated in FIG. 14, the method 700 first checks if the DRC is erased at decision diamond 702. If the DRC is erased, the Eras_Cnt is incremented at step 704. The Eras_Cnt is then compared to a maximum value, Max_Ers_Len at step 706. If Eras_Cnt is greater than Max_Ers_Len, the Erasure_Mapped_flag is set to 1; else, Erasure_Mapped_flag is cleared, e.g., set to 0 at step 712. If the DRC is not erased at decision diamond 702, the Erasure_Mapped_flag is set to 0, the Eras_Cnt is set to 0, and the DRC_Index_Store is set to DRC_Index at step 708. Processing continues to step 712, wherein Erasure_Mapped_flag is set to 0.

The FL schedulers described hereinabove may be modified to work with the DRC erasure mapping method. For each distinct data flow of each AT, flow is eligible for limited FL scheduling if:

(ErasureMappedFlag==1 && FlowEligible-
    ForDRCErasMapping==1&&
    HeadofQueueDelay≧ErasureMapDelayThreshold)  (23)

wherein FlowEligibleForDRCErasMapping is a parameter that indicates the eligibility of each traffic flow for DRC erasure mapping. As default EF flows are assumed eligible for mapping while BE and AF flows are not.

HeadofQueueDelay indicates the "Current_Delay" value for the packet at the front of the FL queue (e.g., the oldest packet in FTx, RTx or DARQ queue). ErasureMapDelayThreshold is the minimum required delay for the particular flow for erasure mapping (which has a similar effect as the "PriorityThold[i].DelayHold"). If a flow is eligible for limited FL scheduling, the following modifications are performed on the FL scheduler:

a. Flow is not eligible as a candidate for single-user transmission instance.
    b. Flow is eligible for multi-user transmission instance with requested DRC index, DRC_index_mapped.

It is possible to dynamically change the DRC_index_mapped as a function of erasure length. This may be achieved by using DRC_index_store and Eras_Count. The default setting for DRC_index may be mapped to 0x3. For the FL scheduler, DRC index 0x3 would correspond to multi-user transmission format (1024,4,256), which may possibly be converted to formats ({128,256,512},4,256). All of these multi-user formats are compatible with all DRC indices, so the AT should be able to decode the mapped DRC as long as it has sufficient SINR (independent of the actual requested DRC index). Alternate algorithms may be more conservative which limits available multi-user transmission formats to lower data rates as Eras_Count increases.

Note, the DARQ option may be turned on for VoIP. Thus, in the event an AT has not decoded the transmitted multi-user packet in the first transmission attempt, DARQ provides the possibility of a second transmission attempt and reduces residual packet error rate. DARQ performance, however, is tied to ACK channel performance which may not be very reliable when DRC is in erasure. The ACK/NAK decision threshold may be optimized for DARQ, possibly depending on the DRC index or DRC mapping state. Another embodiment makes a DARQ transmission attempt compatible with only lower rate multi-user packet formats, e.g., (512,4,1024), or (256,4,1024), in the case of DRC erasure mapping.

Alternate embodiments may provide additional steps and means to the scheduler presented herein. For example, the BE/AF flows may utilize the priority states, which have lower priority than the EF priority states. This may result in a degradation of BE/AF throughput in the presence of EF users, which would most likely use the higher priority states. The BE/AF throughput may be boosted by increasing the priority of the BE/AF flows to higher states under certain conditions.

According to one embodiment, the AvgRequestedRate is the filtered requested rate of a user, wherein K users are configured as BE users in the system. If a user's throughput for its BE flows, AvgThroughput satisfies:

$$AvgThroughput < \frac{\alpha}{K} AvgRequestedRate, \quad (24)$$

then the user's priority state for its BE flows may be boosted to higher priority states. The value of $\alpha$ may be chosen depending on the EF load of the system, e.g., smaller $\alpha$ for higher load. Furthermore, minimum requested rate requirements may be imposed on the users for this promotion. Other methods for improving BE/AF capacity are possible.

The above method also suggests that the priority state of a flow's bit (stuffing) metric may not only be a function of head-of-the-queue delay, but may also be a function of the flow's throughput.

Note, in delay sensitive states, the bit stuffing metric is a function of delay, and it has no mechanism to take advantage of the local channel peaks of a user. Here, the bit stuffing metric value in delay sensitive states may be modified to read:

$$MBS_{DS}=\text{AccelerationFactor}*[\text{CurrentDelay}+\kappa CCI]+ \text{AccelerationOffset} \quad (25)$$

wherein the Channel Condition Indicator (CCI) takes on values from the set $\{0,1\}$ or the interval $[0,1]$, which may be generated separately, such that when it takes on higher values, it indicates relatively good channel conditions compared to the user's long-term channel condition. Also, $\kappa$ is the CCI-to-Delay conversion factor. It indicates how much boost in terms of delay the flow will get when the channel condition of the user is good relative to its own channel statistics.

One simple method to generate CCI for the binary $\{0,1\}$ case is given as follows. Let RateIndex be an integer assigned to the DRC values in increasing rate order, wherein the DRC value is not used because it is not monotonically increasing with the data rate. Let AvgRateIndex be the average (filtered) RateIndex of a user. Let CCIThreshold be a parameter (such as 1.2). Then, if RateIndex>CCIThreshold* AvgRateIndex, the value of CCI may be set to unity. Otherwise, it is set to zero. In this example, the CCI indicates a relatively good channel condition if the current RateIndex corresponding to the received DRC is 120% or higher than average quality.

Preemption refers to the abortion of an FL transmission before it is decoded by destination users. Preemption may be used if very high priority data shows up while all four interlaces on the FL are occupied by relatively low-rate users. The approach taken here is to avoid circumstances which may require preemption. One such condition is, as mentioned above, all four interlaces being occupied by low-rate users. To avoid this, simple methods may be utilized. One such method is not to allow more than a fixed number of simultaneous transmissions of formats with 16-slot and 8-slot spans. As an example, this number may be set to 2 or 3.

One embodiment monitors the decoding performance of users that transmit NULL DRC and are served in a packet. Depending on the PER measured over these NULL-to-rate cases, it is possible to turn on/off the NULL-to-rate conversions for each user. Similarly, it is also possible to turn on/off the restrictions on serving RTx/DARQ queues as well as the queues of flows with infinite DelayBound in NULL-to-rate instances, if the collected statistics indicate that the AT is sufficiently reliably decoding these packets.

The bit and bit stuffing metric coefficients for throughput sensitive flows provide proportional fairness in a BE-only system (e.g., TargetThroughput=0 and GoSFactor=1 for all flows) with users having large amounts of data to receive. The form of the metric coefficient may be applied in a similar manner to other schedulers. For this purpose, the metric coefficient for throughput sensitive flows may be expressed as:

$$Metric_{TS} = \frac{1}{f(AvgThroughput)h(AvgRequestedRate)} \quad (26)$$

wherein $f(.)$ and $h(.)$ are generic functions, and AvgRequestedRate is the average requested rate of a user. Setting $f(x)=x$ and $h(x)=x$ yields an approximately equal-GoS scheduler.

The Enhanced Forward Traffic Channel MAC Protocol defined in the 1xEV-DO Rev. A specification imposes a constraint on serving users following a multi-user packet as summarized below. The 1xEV-DO Rev. A specification states that slot t is defined to be a continuation of an earlier slot, s, if the following conditions are met:

c. The access terminal is a potential target of a packet whose transmission begins in slot s.

d. The slot t is in the same FL interlace as the slot s, i.e., t−s=0 (mod 4).

e. s<t<s+4×min[$N_1$, $N_2$, MinimumContinuationSpan], where $N_1$ denotes the Nominal Transmit Duration of the packet whose reception began in slot s and $N_2$ denotes the Span of the DRC index corresponding to the DRC value that is in effect during slot s.

f. Prior to slot t, the AN has not received a positive acknowledgment for the packet whose transmission began in slot s.

If the AT is a potential target of a packet transmitted by a sector starting in slot s, the AN may not transmit a new packet from the same FL data source to the AT in any slot t that is a continuation of slot s.

The above stated restriction imposes constraints on which users may be served following a multi-user packet. As an example, if the AN serves a multi-user packet to a set of users which then early terminates, then the AN may not serve any packets (single-user or multi-user) during the continuation of the served packet to users that were not served in the previous packet but were compatible with its format. In one situation the AN serves a 153.6 Kbps multi-user packet and users with data carried by it decode the packet in less than 4 slots. If the AN immediately serves another 153.6 Kbps multi-user packet on the same interlace, then the users that actually requested 153.6 Kbps or any DRC with a span of 4 slots but were not served in the previous packet, may not be served in the new transmission. Therefore, only those users who requested DRCs with span less than 4 slots, e.g., typically users at better channel conditions, may be served in the new transmission. But this makes it even more likely for the new packet to decode early. This chain may continue until the queues of higher geometry users are drained. In the meanwhile, lower geometry users that are requesting DRCs with 4-slot spans may not be served. The result may be an excessive delay for lower geometry users and a possibly small gain in delay for higher geometry users.

Note, embodiments, aspects and examples provided in the description hereinabove relate to systems supporting a high rate packet data protocol. Such systems are presented for clarity and illustration. Alternate systems may implement the method and means for adaptive delay management and scheduling presented herein.

Forward Link Scheduler 20

Figure 17A:
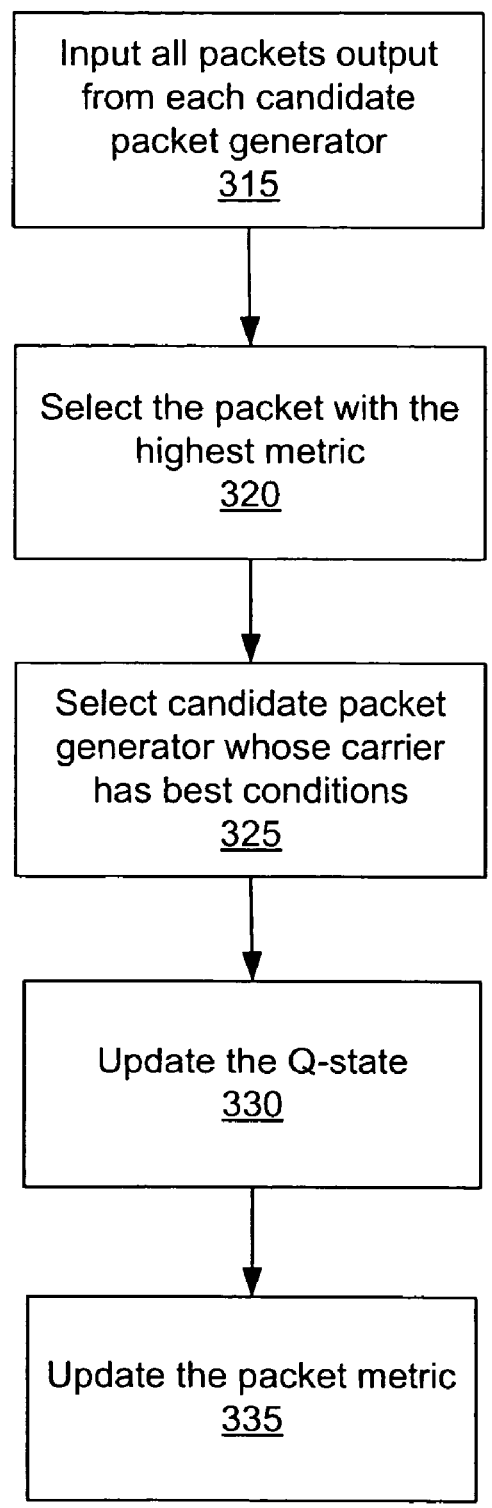
FIG. 17A illustrates a flowchart of a process executed by a forward link scheduler.

FIG. 16A illustrates an embodiment 20 of a forward link scheduler. FIG. 17A illustrates a flowchart of a process executed by a forward link scheduler.

Candidate Packet Generator 25

As shown in FIG. 16A, each carrier in each sector has a candidate packet generator 25 which generates candidate single user packets and multi-user packets executed on the same (or different) forward link digital signal processor. Each candidate packet generator 25 carrier is associated with a particular frequency and particular sector. For example, if there are 3 carriers and 3 sectors, then there will be 9 total candidate packet generators 25, one for each combination of carrier and sector. The candidate packet generator 25 may be a signal processor or any form of processing means. It may also be implemented in hardware. It may use the scheduling method disclosed in the single carrier scheduler 23 described above to select a packet from a user for transmission. Thus, each candidate packet generator 25 assigned to each sector/carrier combination may select a packet for transmission. FIG. 16A shows two inputs to the first candidate packet generator 25: the per flow Q-state for all flows assigned to carrier 92 and sector 90 and all DRCs of ATs with this serving sector and assigned to this carrier 92. However, all of the candidate packet generators 25 receive these inputs.

Because the individual candidate packet generators 25 work independently of each other, it is possible for multiple candidate packet generators 25 to pick a packet from the same user for transmission. However, the master scheduler 10 may prevent more than one candidate packet generator 25 from picking a packet from the same user.

Master Scheduler 10

The master scheduler 10 determines the best packet transmission for each carrier that is input to it from each candidate packet generator 25. In one embodiment, the master scheduler 10 resides on a forward link digital signal processor. The master scheduler 10 receives as input one or more single user packets and/or multi-user packets (with backup options) 93 from the candidate packet generators 25. The master scheduler 10 also receives Q-state (or buffer state information) for all flows in the system 94 as input. The master scheduler 10 determines the best packet transmission for each carrier that is input to it from each candidate packet generator 25 by executing the following steps of the forward link scheduler method shown in the flowchart of FIG. 17A and which reside in the master scheduler 10 in the form of software instructions 14 stored in memory 12 as shown in FIG. 16A. In addition, it outputs a Q-state update 96 and final packet information per sector and carrier 98.

For each sector, s, $1 \leq s \leq n$, where n=total # of sectors, the master scheduler 10 has as input all the packets output from each candidate packet generator 25 (step 315 in FIG. 17A). The candidate packet generator generates candidate packets that can be transmitted on the corresponding carrier. The packet itself may contain data for a single user or for multiple users as in a multi-user packet.

For each carrier i, $1 \leq i \leq k$, where k=total # of carriers, the master scheduler 10 selects the packet with the highest metric from amongst the candidate single user packets (SUPs) and multiple user packets, or multi-user packets, (MUPs) (step 320 in FIG. 17A) such that:

i) there is enough data in the buffer, Q, to achieve a computed packet metric, and ii) EF flows with multi-carrier assignments do not have a higher packet metric on another carrier or sub-carrier. EF flows are such that if served by this carrier, there would be no data in the Q for another carrier to serve. (The highest metric implies that the user either has sufficient data or the user's delay bound is reached).

As stated above, a user may be selected by more than one packet generator 25 for transmission of its data. In fact, a user may receive up to N carriers, each packet generator 25 having one carrier. If a user's data has already been sent over a first carrier by the master scheduler 10, then the master scheduler 10 ensures that the packet it selects from a subsequent candidate packet generator 25 is not from this same user. That is why each candidate packet generator 25 selects packets from more than one user. The reason for using one user per carrier is that EF flows are such that if they are served by one carrier, there would be no data in the Q (or buffer) for another carrier to serve. (EF flows, such as VoIP, have very strict delay constraints such that a large amount of data is not buffered).

The master scheduler 10, when presented with a packet from a user which has been selected by multiple candidate packet generators 25, selects the candidate packet generator 25 with the carrier with the best conditions (step 325 in FIG. 17A).

Next, the master scheduler 10 updates the Q-state, e.g., buffers, for data flows served by carrier i (step 330 in FIG. 17A). This ensures that after the master scheduler 10 serves a user by selecting its packet, any subsequent buffers carrying the same user packet won't be served by the master scheduler 10.

Then, the master scheduler 10 will update the packet metric for candidate packet transmissions from all the remaining carriers j, where i<j≦k (step 335 in FIG. 17A). That is, once a user is served by one candidate packet generator 25 on one carrier, it will not be a candidate on other carriers if the user is out of packets. Thus, packet metrics for candidate packet transmissions from all remaining carriers are updated, whereby a user will not be served by more than one candidate packet generator 25. For example, the metric for the candidate transmission instance 35 for that user served on carrier 1 may be assigned a low value to ensure that the candidate packet generators 25 for carriers 2, 3 and 4 do not serve that user. This determines how carriers 2, 3 and 4 are used given what was done on carrier 1. In other cases the user served on carrier 1 may not be a candidate for service on other carriers as all the data for that user may have been served on carrier 1.

Figure 17B:
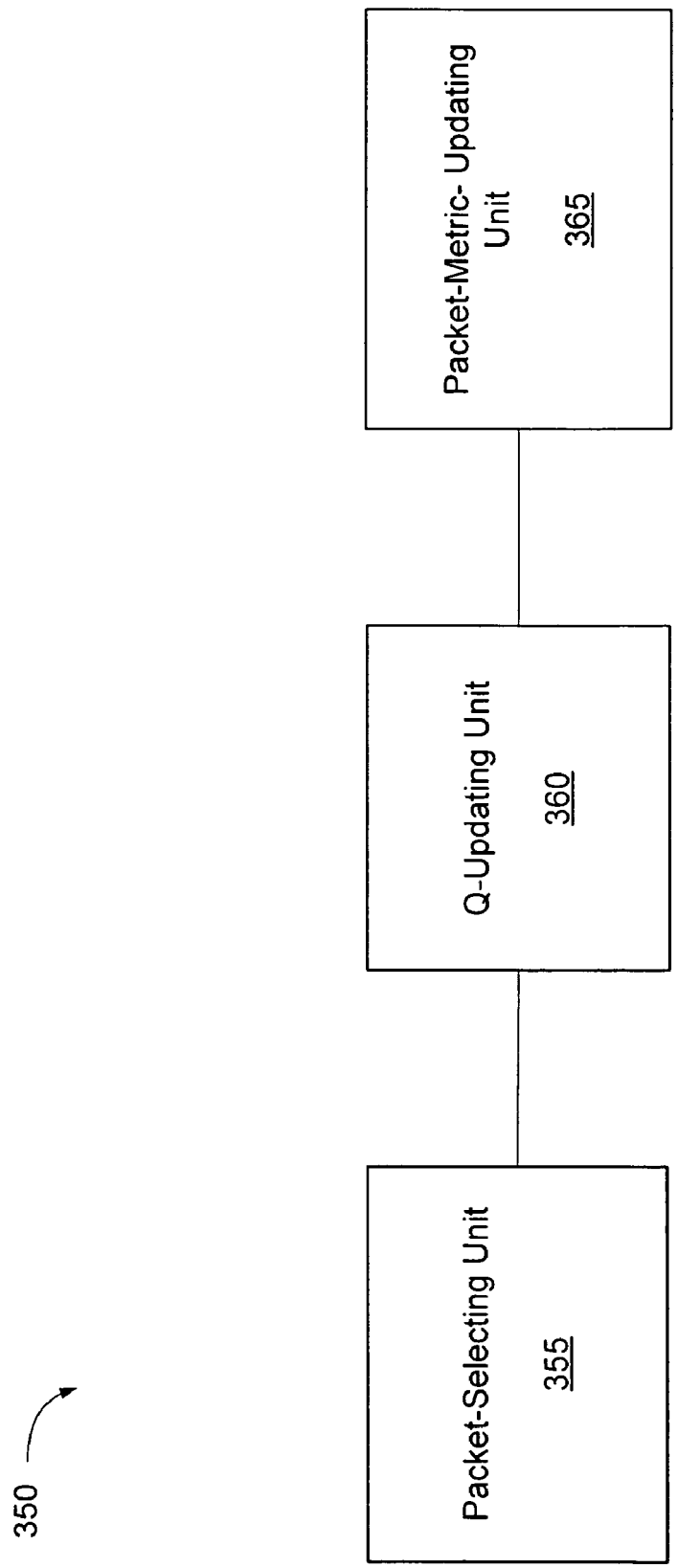
FIG. 17B illustrates an embodiment of a master scheduler.

FIG. 17B illustrates an embodiment of the master scheduler 10 in a block diagram form, comprising an apparatus 350 adapted for scheduling packet transmissions across a plurality of carriers. For each sector and for each carrier i, 1≦i≦k (k=total # of carriers), apparatus 350 comprises: a packet-selecting unit (or module) 355 for selecting a packet with a highest metric, whereby i) there is enough data in the queue to achieve the metric, ii) EF flows with multi-carrier assignment do not have a higher packet metric on another subcarrier, and iii) EF flows such that if served by the present carrier, there is no data in the queue for another carrier to serve; a Q-updating unit 360 for updating the Q-state for served by the present carrier i; and a packet-metric-updating 365 for updating a packet metric for candidate packet transmissions from all remaining carriers j, j>i, j≦k.

Packet Builder 40

Referring back to FIG. 16A. The packet builder 40 generates packets based on a packet format provided by the master scheduler 10. In one embodiment, it converts the format of the packet selected by the master scheduler 10 to that used in EV-DO. Each sector has a packet builder 40 which generates packets based on a packet format provided by the master scheduler 10. The packet builder 40 uses a format acceptable by the modulator on the channel card. The packet is then sent over the EV-DO air interface by the master processor 60 which includes a modulator.

Slave Scheduler 50

The slave scheduler 50 copies what the master scheduler 10 does. In case the master scheduler 10 fails, a shadow routine can take over for the master scheduler 10.

Figure 16B:
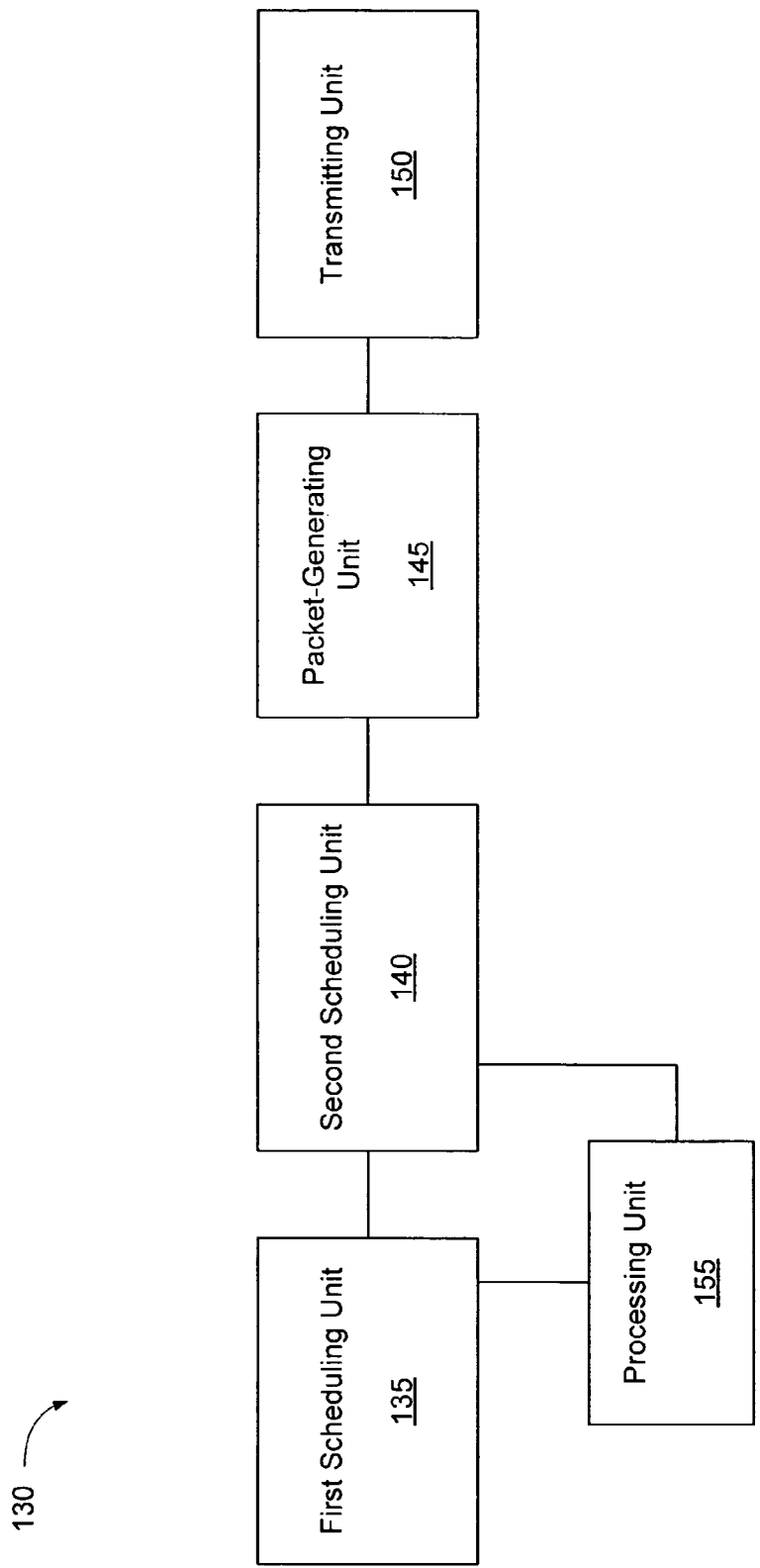
FIG. 16B illustrates an embodiment of the distributed architecture of FIG. 16A.

FIG. 16B illustrates an embodiment 130 of a distributed architecture of FIG. 16A in a block diagram form, comprising an apparatus 130 for scheduling across multiple carriers. Apparatus 130 comprises a first scheduling unit 135 for scheduling candidate packet transmission instances; a second scheduling unit 140 for scheduling packets; a packet-generating unit 145 for generating packets based on a packet format provided by second scheduling unit 140; and a transmitting unit 150 for sending a packet over an air interface. Apparatus 130 may also include a processing unit 155 for executing a shadow routine of scheduling units 135, 140.

Distributed Architecture

Figure 18A:
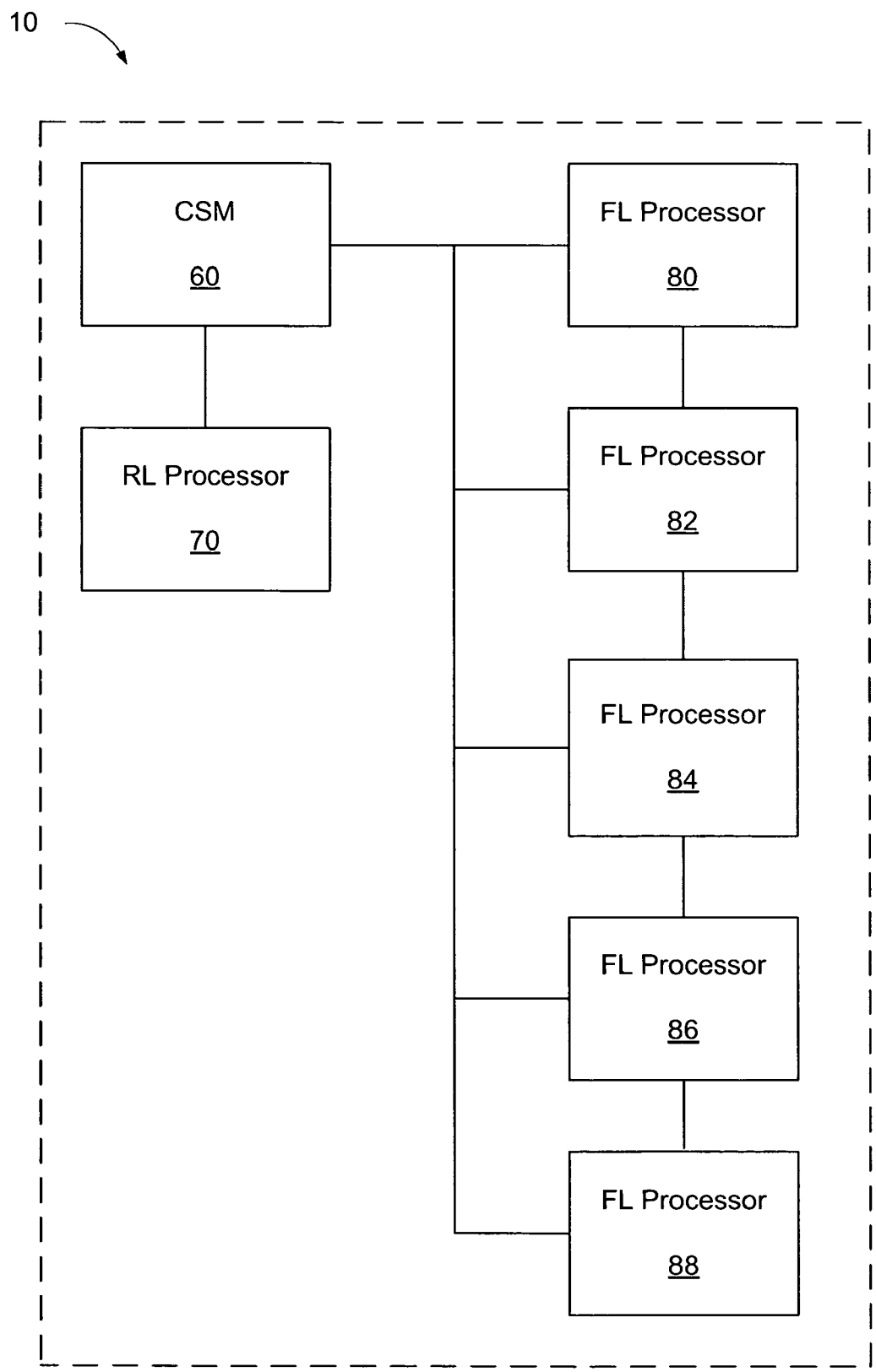
FIG. 18A illustrates an embodiment of a distributed architecture associated with a master scheduler.

FIG. 18A illustrates an embodiment of a distributed architecture associated with the master scheduler 10. The components of the master scheduler 10 may reside on different entities (for example, different Digital Signal Processors (DSPs) or micro engines of a network processor). These components may include cell site modem (CSM) 60, RL digital signal processor 70, FL digital signal processor 80 for sector #1, FL digital signal processor 82 for sector #2, FL digital signal processor 84 for sector #3, FL digital signal processor 86 for sector #4, and FL digital signal processor 88 for sector #5, etc. Thus, the master scheduler 10 is functionality distributed across a plurality of forward link DSPs depending on the selected configuration. One of the reasons for the distributed architecture is that it is unlikely that one processor could handle all the users, sectors and carriers. Second, a distributed architecture yields a very scalable design. The number of processors selected vary with the number of users and carriers. Since all the processors do not fit on one processor, the master scheduler 10 achieves "sub-optimal" multi-user diversity in the frequency domain in the sense that if all the processing was located on one processor, then the selected user would always get the best time slot and the best frequency for transmission because the one processor would run an optimization routine for all users and carriers.

With the distributed architecture of the present method and apparatus, each candidate packet generator 25 runs an optimization routine for all users on its one carrier frequency and sector. It doesn't factor in the other carriers or sectors. The master scheduler 10 only sees the users selected by the candidate packet generators 25. The master scheduler 10 then evaluates the users selected by all the candidate packet generators 25 and tries to use the best carrier and sector for each user.

Figure 18B:
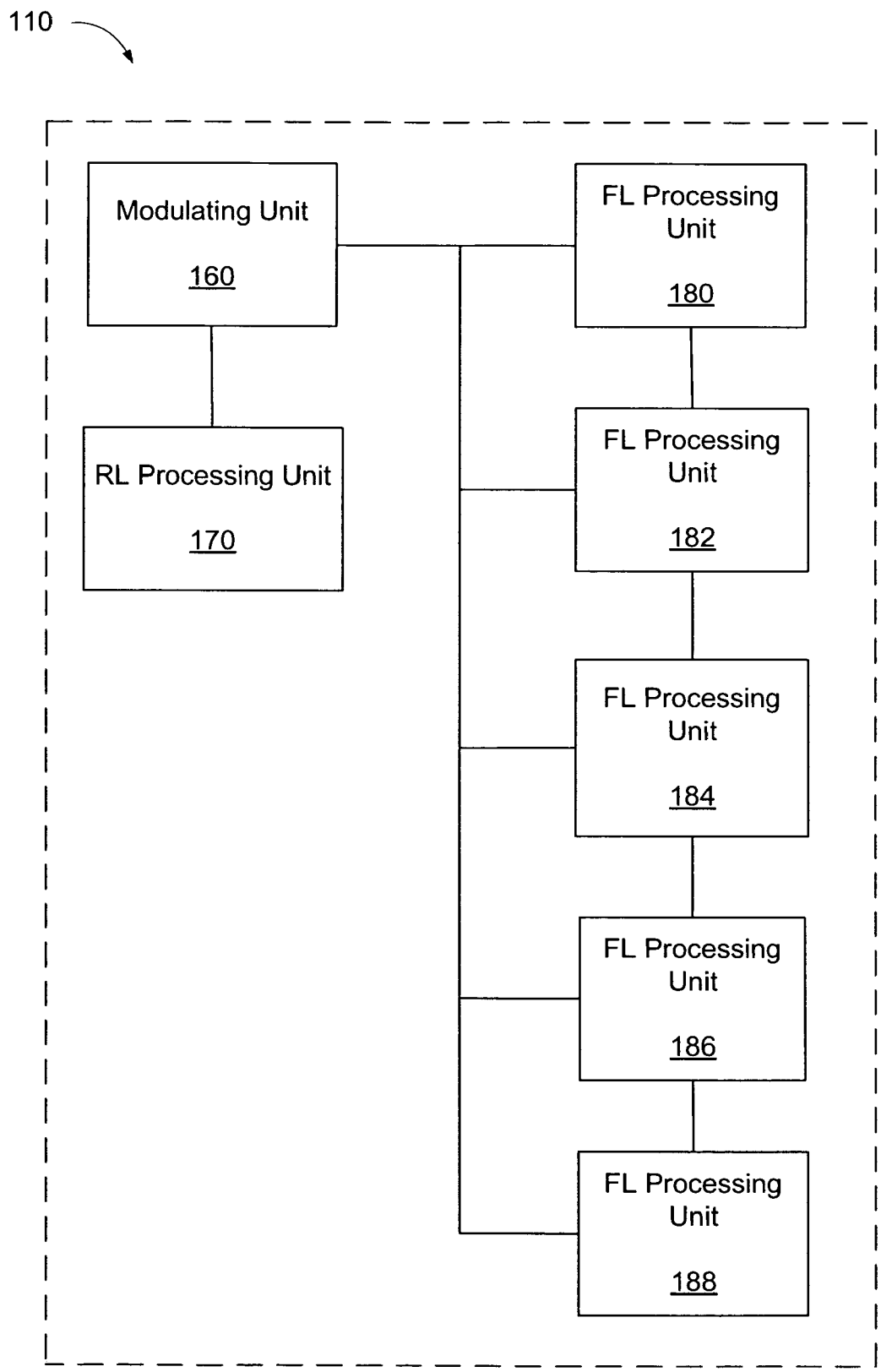
FIG. 18B illustrates a block diagram of the distributed architecture of FIG. 18A.

FIG. 18B discloses an embodiment of the distributed architecture of FIG. 18A in a block diagram form, comprising an apparatus 110 for scheduling packets. Apparatus 110 comprises a plurality of units (or modules) for processing forward links ("FL processing units"), including FL processing units 180, 182, 184, 186 and 188, corresponding to a plurality of sectors; a modulating unit 160 for modulating and demodulating data; and a unit for processing reverse links (or "RL processing unit") 170.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An illustrative storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A forward link scheduler, comprising:
a master scheduler, comprising:
at least one processor, wherein said at least one processor corresponds to at least one sector; and
at least one memory operably connected to said at least one processor, wherein said master scheduler executes instructions stored in said at least one memory, said instructions comprising:
selecting a first carrier of a plurality of carriers for transmission of a plurality of packets of an expedited forwarding flow with multi-carrier assignment, wherein a plurality of candidate packets comprise the plurality of packets of the expedited forwarding flow, wherein a first candidate packet is associated with the first carrier and a second candidate packet is associated with another carrier of the plurality of carriers, wherein at least one of the plurality of packets of the expedited forwarding flow is associated with the first candidate packet and also with the second candidate packet, and wherein the at least one of the plurality of packets of the expedited forwarding flow associated with the first carrier has a highest packet metric of the at least one of the plurality of packets of the expedited forwarding flow selected for the first carrier and any other carrier of the plurality of carriers, wherein a packet metric is calculated as:

$$PacketMetric[k] = \frac{1}{Span[k]} \sum_{i \in P[k]} BitMetric[i]$$

wherein k represents an index to a candidate transmission instance, Span[k] represents a span defined for a corresponding transmission format, P[k] represents a set of octets included in the candidate transmission instance, and BitMetric[i] represents a bit metric of an $i^{th}$ octet included in the candidate transmission instance.

2. The forward link scheduler according to claim 1, wherein said instructions further comprise:
buffering the plurality of packets of said expedited forwarding flow in a queue, whereby there are no packets in said queue for the other carriers of said plurality of carriers to serve.

3. The forward link scheduler according to claim 1, wherein said instructions further comprise:
updating a queue state for flows served by said first carrier.

4. The forward link scheduler according to claim 1, wherein said selecting the first carrier is based upon whether a user has sufficient data according to a transmission criteria or said user's delay bound is reached.

5. The forward link scheduler according to claim 1, wherein said instructions further comprise:
updating a packet metric for candidate packet transmissions for the other carriers of said plurality of carriers.

6. The forward link scheduler according to claim 1, wherein said instructions further comprise:
buffering the plurality of packets of said expedited forwarding flow in a queue, whereby there are no packets in said queue for the other carriers of said plurality of carriers to serve;
updating a queue state for flows served by said first carrier, wherein said selecting the first carrier is based upon whether a user has sufficient data according to a transmission criteria or said user's delay bound is reached; and
updating a packet metric for candidate packet transmissions for the other carriers of said plurality of carriers.

7. The forward link scheduler according to claim 1, further comprising at least one candidate packet generator coupled to said master scheduler, wherein said at least one candidate packet generator comprises a memory, and wherein said at least one candidate packet generator executes instructions stored in said memory, the instructions executed by the at least one candidate packet generator comprising generating a set of candidate packet transmission instances, selecting one candidate packet among a set, and maximizing a packing efficiency.

8. The forward link scheduler according to claim 7, further comprising a slave scheduler coupled to said master scheduler, wherein said slave scheduler comprises a memory, and wherein said slave scheduler executes instructions stored in said memory of the slave scheduler, the instructions executed by the slave scheduler comprising executing a shadow routine of said master scheduler.

9. The forward link scheduler according to claim 8, further comprising at least one master processor having a memory coupled to said master scheduler, and at least one packet builder having a memory coupled to said master scheduler, wherein said at least one master processor executes instructions stored in said memory of the at least one master processor, the instructions executed by the at lest one master processor comprising sending a packet over an air interface, and wherein said at least one packet builder executes instructions stored in said memory of the at least one packet builder, the instructions executed by the at least one packet builder comprising generating packets based on a packet format provided by said master scheduler.

10. A distributed forward link scheduler, comprising:
a plurality of forward link processors, wherein said plurality of forward link processors correspond to a plurality of sectors;
a master scheduler coupled to said plurality of forward link processors comprising:
at least one memory operably connected to at least one of said plurality of forward link processors, wherein said at least one of said plurality of forward link processors executes instructions stored in said at least one memory, said instructions comprising:
selecting a first carrier of a plurality of carriers for transmission of a plurality of packets of an expedited forwarding flow with multi-carrier assignment, wherein a plurality of candidate packets comprise the plurality of packets of the expedited forwarding flow, wherein a first candidate packet is associated with the first carrier and a second candidate packet is associated with another carrier of the plurality of carriers, wherein at least one of the plurality of packets of the expedited forwarding flow is associated with the first candidate packet and also with the second candidate packet, and wherein the at least one of the plurality of packets of the expedited forwarding flow associated with the first carrier has a highest packet metric of the at least one of the plurality of packets of the expedited forwarding flow selected for the first carrier and any other carrier of the plurality of carriers, wherein a packet metric is calculated as:

$$PacketMetric[k] = \frac{1}{Span[k]} \sum_{i \in P[k]} BitMetric[i]$$

wherein k represents an index to a candidate transmission instance, Span[k] represents a span defined for a corresponding transmission format, P[k] represents a set of octets included in the candidate transmission instance, and BitMetric[i] represents a bit metric of an $i^{th}$ octet included in the candidate transmission instance; a cell site modem operably connected to at least one of said plurality of forward link processors; and
a reverse link digital signal processor operably connected to said cell site modem, whereby said master scheduler has a distributed architecture.

11. The distributed forward link scheduler according to claim 10, wherein said instructions further comprise:
buffering the plurality of packets of said expedited forwarding flow in a queue, whereby there are no packets in said queue for the other carriers of said plurality of carriers to serve;
updating a queue state for flows served by said first carrier, wherein said selecting the first carrier is based upon whether a user has sufficient data according to a transmission criteria or said user's delay bound is reached; and
updating a packet metric for candidate packet transmissions for the other carriers of said plurality of carriers.

12. The distributed forward link scheduler according to claim 10, further comprising at least one candidate packet generator coupled to said plurality of forward link processors, wherein said at least one candidate packet generator comprises a memory, and wherein said at least one candidate packet generator executes instructions stored in said memory, the instructions executed by the at least one candidate packet generator comprising generating a set of candidate packet transmission instances, selecting one candidate packet among a set, and maximizing a packing efficiency.

13. The distributed forward link scheduler according to claim 12, further comprising a slave scheduler coupled to said plurality of forward link processors, wherein said slave scheduler comprises a memory, and wherein said slave scheduler executes instructions stored in said memory of the slave scheduler, the instructions executed by the slave scheduler comprising executing a shadow routine of said master scheduler.

14. The distributed forward link scheduler according to claim 13, further comprising at least one master processor having a memory coupled to said plurality of forward link processors, and at least one packet builder having a memory coupled to said plurality of forward link processors, wherein said at least one master processor executes instructions stored in said memory of the at least one master processor, the instructions executed by the at least one master processor comprising sending a packet over an air interface, and wherein said at least one packet builder executes instructions stored in said memory of the at least one packet builder, the instructions executed by the at least one packet builder comprising generating packets based on a packet format provided by said master scheduler.

15. A non-transitory, computer-readable medium embodying instructions executable by a processor to:
select a first carrier of a plurality of carriers for transmission of a plurality of packets of an expedited forwarding flow with multi-carrier assignment, wherein a plurality of candidate packets comprise the plurality of packets of the expedited forwarding flow, wherein a first candidate packet is associated with the first carrier and a second candidate packet is associated with another carrier of the plurality of carriers, wherein at least one of the plurality of packets of the expedited forwarding flow is associated with the first candidate packet and also with the second candidate packet, and wherein the at least one of the plurality of packets of the expedited forwarding flow associated with the first carrier has a highest packet metric of the at least one of the plurality of packets of the expedited forwarding flow selected for the first carrier and any other carrier of the plurality of carriers, wherein a packet metric is calculated as:

$$PacketMetric[k] = \frac{1}{Span[k]} \sum_{i \in P[k]} BitMetric[i]$$

wherein k represents an index to a candidate transmission instance, Span[k] represents a span defined for a corresponding transmission format, P[k] represents a set of octets included in the candidate transmission instance, and BitMetric[i] represents a bit metric of an $i^{th}$ octet included in the candidate transmission instance.

16. The non-transitory, computer-readable medium of claim 15, further comprising instructions to:
   buffer the plurality of packets of said expedited forwarding flow in a queue, whereby there are no packets in said queue for the other carriers of said plurality of carriers to serve.

17. The non-transitory, computer-readable medium of claim 15, further comprising instructions to:
   update a queue state for flows served by said first carrier.

18. The non-transitory, computer-readable medium of claim 15, wherein said selecting the first carrier is based upon whether a user has sufficient data according to a transmission criteria or said user's delay bound is reached.

19. The non-transitory, computer-readable medium of claim 15, further comprising instructions to:
   update a packet metric for candidate packet transmissions for the other carriers of said plurality of carriers.

20. The non-transitory, computer-readable medium of claim 15, further comprising instructions to:
   buffer the plurality of packets of said expedited forwarding flow in a queue, whereby there are no packets in said queue for the other carriers of said plurality of carriers to serve;
   update a queue state for flows served by said first carrier, wherein said selecting the first carrier is based upon whether a user has sufficient data according to a transmission criteria or said user's delay bound is reached; and
   update a packet metric for candidate packet transmissions for the other carriers of said plurality of carriers.

21. A method, implemented in an apparatus, for scheduling packet transmission in a multi-carrier communication system, the method comprising:
   selecting a first carrier of a plurality of carriers for transmission of a plurality of packets of an expedited forwarding flow with multi-carrier assignment, wherein a plurality of candidate packets comprise the plurality of packets of the expedited forwarding flow, wherein a first candidate packet is associated with the first carrier and a second candidate packet is associated with another carrier of the plurality of carriers, wherein at least one of the plurality of packets of the expedited forwarding flow is associated with the first candidate packet and also with the second candidate packet, and wherein the at least one of the plurality of packets of the expedited forwarding flow associated with the first carrier has a highest packet metric of the at least one of the plurality of packets of the expedited forwarding flow selected for the first carrier and any other carrier of the plurality of carriers, wherein a packet metric is calculated as:

$$PacketMetric[k] = \frac{1}{Span[k]} \sum_{i \in P[k]} BitMetric[i]$$

wherein k represents an index to a candidate transmission instance, Span[k] represents a span defined for a corresponding transmission format, P[k] represents a set of octets included in the candidate transmission instance, and BitMetric[i] represents a bit metric of an $i^{th}$ octet included in the candidate transmission instance.

22. The method of claim 21, further comprising:
   buffering the plurality of packets of said expedited forwarding flow in a queue, whereby there are no packets in said queue for the other carriers of said plurality of carriers to serve.

23. The method of claim 21, further comprising:
   updating a queue state for flows served by said first carrier.

24. The method of claim 21, wherein said selecting the first carrier is based upon whether a user has sufficient data according to a transmission criteria or said user's delay bound is reached.

25. The method of claim 21, further comprising:
   updating a packet metric for candidate packet transmissions for the other carriers of said plurality of carriers.

26. The method of claim 21, further comprising:
   buffering the plurality of packets of said expedited forwarding flow in a queue, whereby there are no packets in said queue for the other carriers of said plurality of carriers to serve;
   updating a queue state for flows served by said first carrier, wherein said selecting the first carrier is based upon whether a user has sufficient data according to a transmission criteria or said user's delay bound is reached; and
   updating a packet metric for candidate packet transmissions for the other carriers of said plurality of carriers.

27. An apparatus for scheduling packet transmission across a plurality of carriers, comprising:
   at least one candidate packet generator configured to select a first candidate packet for transmission over a first carrier of the plurality of carriers and a second candidate packet for transmission over another carrier of the plurality of carriers from a plurality of packets, wherein the first and second candidate packets correspond to an expedited forwarding flow; and
   a master scheduler configured to:
      identify the first candidate packet corresponding to the expedited forwarding flow, wherein with first candidate packet has a highest packet metric from among the first candidate packet and any other candidate packets corresponding to the expedited forwarding flow, wherein a packet metric is calculated as:

$$PacketMetric[k] = \frac{1}{Span[k]} \sum_{i \in P[k]} BitMetric[i]$$

wherein k represents an index to a candidate transmission instance, Span[k] represents a span defined for a corresponding transmission format, P[k] represents a set of octets included in the candidate transmission instance, and BitMetric[i] represents a bit metric of an $i^{th}$ octet included in the candidate transmission instance; and
      schedule transmission of the first candidate packet and the other candidate packets corresponding to the expedited forwarding flow over the first carrier only.

28. The apparatus of claim 27, wherein the master scheduler is further configured to:
   buffer packets of said expedited forwarding flow in a queue, whereby there are no packets in said queue for a carrier other than the first carrier to serve.

29. The apparatus of claim 27, wherein the master scheduler is further configured to:
   update a queue state for flows served by said first carrier.

30. The apparatus of claim 27, wherein the master scheduler is further configured to:
   select said first candidate packet with the highest metric, wherein said selecting is based upon whether a user has sufficient data according to a transmission criteria or said user's delay bound is reached.

31. The apparatus of claim 27, wherein the master scheduler is further configured to:
update a packet metric for candidate packets corresponding to the expedited forwarding flow selected for carriers other than the first carrier.

32. A method, implemented in an apparatus, for scheduling packet transmission in a multi-carrier communication system, the method comprising:
selecting a first candidate packet for transmission over a first carrier of a plurality of carriers and a second candidate packet for transmission over another carrier of the plurality of carriers from a plurality of packets, wherein the first and second candidate packets correspond to an expedited forwarding flow;
identifying the first candidate packet corresponding to the expedited forwarding flow, wherein with first candidate packet has a highest packet metric from among the first candidate packet and any other candidate packets corresponding to the expedited forwarding flow, wherein a packet metric is calculated as:

$$PacketMetric[k] = \frac{1}{Span[k]} \sum_{i \in P[k]} BitMetric[i]$$

wherein k represents an index to a candidate transmission instance, Span[k] represents a span defined for a corresponding transmission format, P[k] represents a set of octets included in the candidate transmission instance, and BitMetric[i] represents a bit metric of an $i^{th}$ octet included in the candidate transmission instance; and
scheduling transmission of the first candidate packet and the other candidate packets corresponding to the expedited forwarding flow over the first carrier only.

33. The method of claim 32, further comprising:
buffering packets of said expedited forwarding flow in a queue, whereby there are no packets in said queue for a carrier other than the first carrier to serve.

34. The method of claim 32, further comprising:
updating a queue state for flows served by said first carrier.

35. The method of claim 32, further comprising:
selecting said first candidate packet with the highest metric, wherein said selecting is based upon whether a user has sufficient data according to a transmission criteria or said user's delay bound is reached.

36. The method of claim 32, further comprising:
updating a packet metric for candidate packets corresponding to the expedited forwarding flow selected for carriers other than the first carrier.

37. A non-transitory, computer-readable medium embodying instructions executable by a processor to:
select a first candidate packet for transmission over a first carrier of a plurality of carriers and a second candidate packet for transmission over another carrier of the plurality of carriers from a plurality of packets, wherein the first and second candidate packets correspond to an expedited forwarding flow;
identify the first candidate packet corresponding to the expedited forwarding flow, wherein with first candidate packet has a highest packet metric from among the first candidate packet and any other candidate packets corresponding to the expedited forwarding flow, wherein a packet metric is calculated as:

$$PacketMetric[k] = \frac{1}{Span[k]} \sum_{i \in P[k]} BitMetric[i]$$

wherein k represents an index to a candidate transmission instance, Span[k] represents a span defined for a corresponding transmission format, P[k] represents a set of octets included in the candidate transmission instance, and BitMetric[i] represents a bit metric of an $i^{th}$ octet included in the candidate transmission instance; and
schedule transmission of the first candidate packet and the other candidate packets corresponding to the expedited forwarding flow over the first carrier only.

38. The non-transitory, computer-readable medium of claim 37, further embodying instructions executable by a processor to:
buffer packets of said expedited forwarding flow in a queue, whereby there are no packets in said queue for a carrier other than the first carrier to serve.

39. The non-transitory, computer-readable medium of claim 37, further embodying instructions executable by a processor to:
update a queue state for flows served by said first carrier.

40. The non-transitory, computer-readable medium of claim 37, further embodying instructions executable by a processor to:
select said first candidate packet with the highest metric, wherein said selecting is based upon whether a user has sufficient data according to a transmission criteria or said user's delay bound is reached.

41. The non-transitory, computer-readable medium of claim 37, further embodying instructions executable by a processor to:
update a packet metric for candidate packets corresponding to the expedited forwarding flow selected for carriers other than the first carrier.

* * * * *